United States Patent
Dietz

(10) Patent No.: US 9,932,540 B2
(45) Date of Patent: Apr. 3, 2018

(54) METHOD FOR REFINING LIPID PHASES, AND USE

(71) Applicant: Drei Lilien PVG GmbH & Co. KG, Wiesbaden (DE)

(72) Inventor: Max Dietz, Wiesbaden (DE)

(73) Assignee: Drei Lilien PVG GmbH & Co. KG, Wiesbaden (DE)

(*) Notice: Subject to any disclaimer, the term of this patent is extended or adjusted under 35 U.S.C. 154(b) by 0 days.

(21) Appl. No.: 15/310,827

(22) PCT Filed: May 28, 2015

(86) PCT No.: PCT/EP2015/061920
§ 371 (c)(1),
(2) Date: Nov. 14, 2016

(87) PCT Pub. No.: WO2015/181341
PCT Pub. Date: Dec. 3, 2015

(65) Prior Publication Data
US 2017/0135363 A1  May 18, 2017

(30) Foreign Application Priority Data
May 28, 2014  (DE) .................. 10 2014 107 589

(51) Int. Cl.
*C11B 3/00* (2006.01)
*A23D 9/04* (2006.01)

(52) U.S. Cl.
CPC ............. *C11B 3/001* (2013.01); *A23D 9/04* (2013.01)

(58) Field of Classification Search
CPC ...................................................... A23D 9/04
See application file for complete search history.

(56) References Cited

U.S. PATENT DOCUMENTS

| | | | | |
|---|---|---|---|---|
| 4,049,686 A | * | 9/1977 | Ringers | C11B 3/04 554/190 |
| 4,629,588 A | * | 12/1986 | Welsh | C11B 3/10 423/339 |
| 4,647,466 A | * | 3/1987 | Japikse | A23L 2/64 426/387 |
| 5,298,639 A | * | 3/1994 | Toeneboehn | C11B 3/10 554/191 |
| 5,830,738 A | * | 11/1998 | Thomas | C07C 403/24 435/209 |

(Continued)

FOREIGN PATENT DOCUMENTS

| | | | | |
|---|---|---|---|---|
| EP | 2399885 | * | 12/2011 | C07B 63/04 |
| JP | S 56-131341 | * | 10/1981 | A23C 11/10 |

(Continued)

OTHER PUBLICATIONS

JP S56-131341, Soeda et al., Preparationof soybean milk having improved tasste, 1981, English translation,5 pages.*

(Continued)

*Primary Examiner* — Yate' K Cutliff
(74) *Attorney, Agent, or Firm* — Amin, Turocy & Watson LLP

(57) ABSTRACT

The invention relates to a method for gently eliminating odorous substances and coloring agents from lipid phases. Said method is easy and inexpensive to carry out and and can be employed for purifying lipid phases of various origins.

17 Claims, 1 Drawing Sheet

(56) References Cited

U.S. PATENT DOCUMENTS

| | | |
|---|---|---|
| 6,407,271 B1 | 6/2002 | Deffense |
| 2008/0182322 A1* | 7/2008 | Dayton ................ C11B 3/003 |
| | | 435/271 |
| 2013/0090488 A1 | 4/2013 | Dietz |
| 2013/0102673 A1* | 4/2013 | Bouwer ................ A23D 9/06 |
| | | 514/560 |

FOREIGN PATENT DOCUMENTS

| | | | | |
|---|---|---|---|---|
| JP | S60-078560 | * | 5/1985 | ............. A23L 1/305 |
| JP | 5174326 | * | 10/2007 | ............... A61L 9/01 |
| WO | 2009148919 | | 12/2009 | |

OTHER PUBLICATIONS

JP S60-078560, Sakamori, Enriched nutrient agent free from acid taste, 1985, English translation, 4 pages.*
JP 5174326, Kamura et al., Organic substance removal material, 2007, English translation, 25 pages.*
Written Opinion for International Patent Application No. PCT/EP2015/061920 dated Sep. 11, 2015, 6 Pages.
International Search Report for International Patent Application No. PCT/EP2015/061920 dated Sep. 11, 2015, 9 Pages.
International Preliminary Examination Report for International Patent Application No. PCT/EP2015/061920 dated Sep. 11, 2015, 8 Pages.

\* cited by examiner

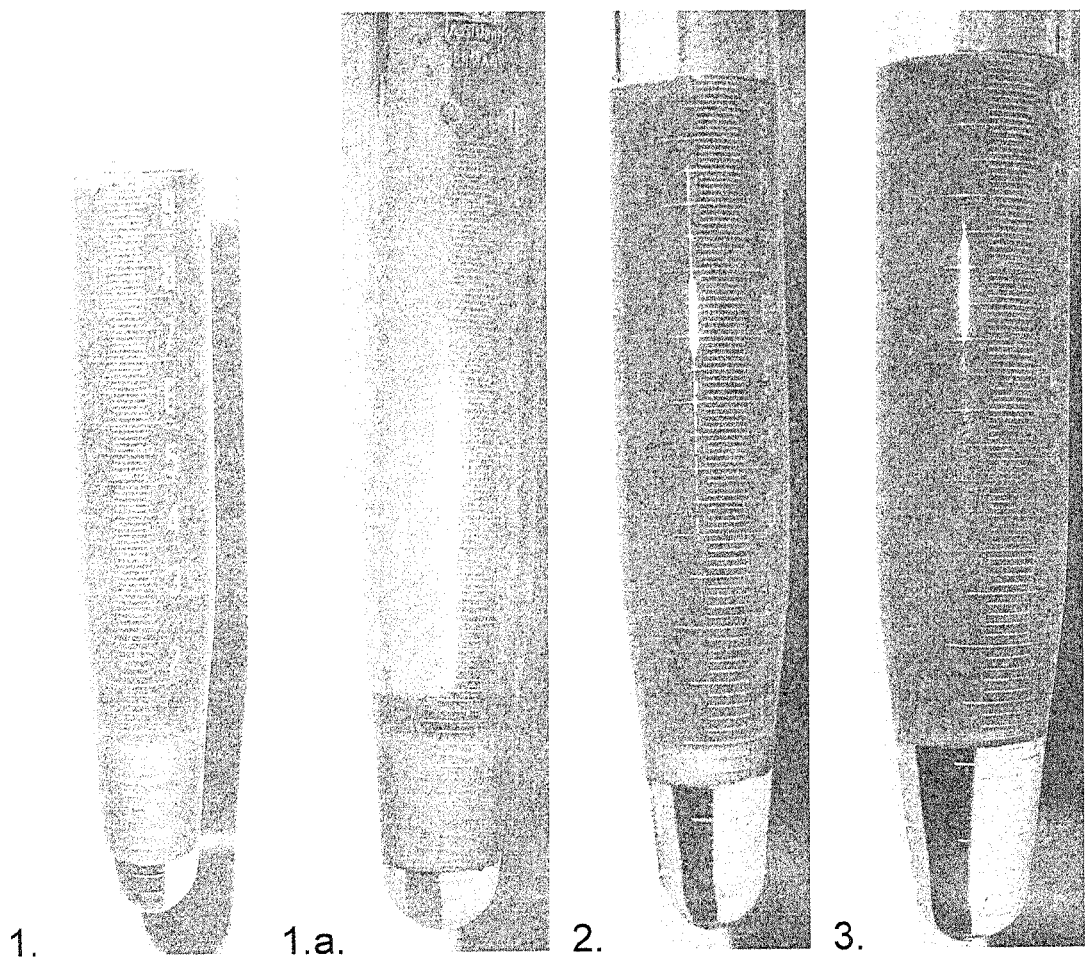

METHOD FOR REFINING LIPID PHASES, AND USE

The present invention relates to a method for reducing particularly odorants and dyes from a lipid phase and its application.

BACKGROUND OF THE INVENTION

Biogenic oils and fats are usually obtained by mechanical or physio-chemical extraction processes. By these means lipophilic or amphiphilic substances, so-called mucilages, which are dissolvable in oils and fats are liberated also which then leads to contamination of the lipid phase. When this concerns vegetable oils, a variable extent of phospholipids, phenols, dyes such as chlorophylls and carotenoids, glycolipids, free fatty acids, odorants, flavors, and other organic compounds are dissolved in the lipid phase. If this phase is prepared under anhydrous conditions, the resulting lipid phase is clear to slightly cloudy and has a greenish to yellowish or reddish to brownish coloring. The impurities have a negative impact on the shelf life, the optical appearance, and sensory effects if the oil is used for the human consumption. Known from prior art are methods to reduce these impurities or mucilages, respectively, can be achieved. These mucilages are at least in part complexed with other amphiphilic or lipophilic substances by electrostatic forces.

Therefore, aqueous solutions of acids and bases are used under elevated temperature and pressure and a prolonged exposure time, in order to "break-up" these complexes, whereby the amount of separable impurities increases significantly. Particularly phosphorus-containing compounds can be separated by these means, so that residual phosphorus content between 10 and 25 ppm can be achieved, independently from the prior content. If a base was used for degumming, the content of volatile fatty acids, which are also present in lipid phases, can be reduced to values of 0.8 to 0.5 wt % (g/100 g), due to conversion of the acids to the corresponding carboxylates. The color of the thus refined oil is not changed significantly, although the resulting gummy mucus phases have a blackish brown color. From the prior art it is known that by a renewed exposure to an acidic or alkaline solution no relevant changes in the characteristics of the oil can be achieved. There is no aqueous-based refining procedure known from the prior art, by which a further reduction of the residual phosphate content, the coloring of the oil, and the residual content of free fatty acids can be achieved in order to obtain the required levels of purity according industrial standards for their use as food or fuel. Particularly in refining of vegetable oils, various oil impurities must be depleted or removed completely because they cause visual or sensory impairments and decrease storage stability since they may lead to formation of undesirable compounds that even might be toxic. Therefore, additional methods have been developed, by which the according reductions can be achieved. One such method is known under the trademark ZENITH process of Procter & Gamble. In this case, first a degumming process is performed using concentrated phosphoric acid, which is added to the oil and mixed at a temperature between 35° and 50° C. over a period of 30 minutes. Subsequently the aggregated phospholipid mass is separated, and the oil neutralized by base treatment whereby volatile fatty acids are saponified and the so-called soap stock is subsequently removed. Thereafter, the oil is mixed with bleaching earth in order to remove nonhydratable phospholipids and pigments from the oil. The process is completed by deodorization with steam at temperatures of 218° C.-271° C. at 12-4,000 Pa.

Meanwhile, many variations of this method have been published, by which particular adjustments of process conditions are proposed to yield district improvements, e.g., in the reduction of color pigments (e.g., EP 0737238 B1, process for removing chlorophyll dye impurities from plant oils; U.S. Pat. No. 4,443,379, Oil bleaching method and composition for same). Improvements in the reduction of plant dyes were in particular obtained by bleaching earths that have been activated due to acid treatment or by adsorbents such as silica gels, admixed together with phosphoric or sulfuric acid to the oils. However, the by far most appropriate method to achieve a color reduction is the use of phyllosilicates which have a high internal surface area. This requires contacting the oil and the bleaching earth that has been pulverized or ground at an elevated (>60° C.) temperature and under vacuum (<1000 Pa) for at least 30 minutes. By this means color pigments can be depleted, and Lovibond color scale values of R3.0/Y3.9 are achieved as well chlorophyll concentrations are reduced to values of 0.08 ppm.

It was shown that further improvement in the reduction of color pigments can be achieved by activation of bleaching earths with an acid pretreatment. Furthermore, combining silica gels and phosphoric acid or phosphoric acid and sulfuric acid allows the duration of exposure of the adsorbents to be reduced while an equal reduction of the color pigments is achieved; however, the absolute amount of color pigments could not be further reduced. This is because the color pigments are chemically modified, but are not removed from the oil. Thus, it is necessary to perform a further purification step by means of a steam extraction. Application of heat and oxidizing agents can in turn lead to chemical changes of constituents of the oil, such as tocopherols, vitamins, polyphenols and/or cause oxidation products of plant dyes and/or of mucilages and/or generate peroxides of fatty acids. The latter promote generation of further peroxides during the course of storage thereby causing color reversion and of off-flavors, among others.

In the scientific literature it was shown that the organoleptic characteristics and changes in the color of refined oils crucially depend on the process technology used. The decisive condition is the formation of radicals which themselves can cause unwanted sensory or visual effects in addition to their chemical reaction with other organic compounds, which then lead to undesirable effects. The extent of radical formation is thereby essentially determined by the following: 1.) the number of oxidation products that a) were present in the crude oil and were not removed by the refining process, and b) have arisen due to the refining process and 2.) the amount of antioxidant compounds which a) were already present in the crude oil and b) still remained in the refined oil. With the use of methods allowing a better depletion of dyes, especially antioxidants, such as tocopherols, polyphenols or squalene are also reduced to a greater extent.

By oxidative processes, aldehydes, ketones, and free fatty acids among others are formed which accelerate the oxidative processes and are responsible in large part for off-flavors in vegetable oils.

The process steps bleaching and deodorization were found to be essentially responsible for the occurrence of a mismatch between the content of oxidatively modified organic compounds and the content of antioxidant organic compounds in vegetable oils.

Treatment of oils with bleaching earth cause acid-catalyzed oxidation, and, in varying degrees, they deplete compounds having antioxidant properties by adsorption, so the oxidative stability of oil can deteriorate significantly by this process step.

In principle, the same applies for the deodorization process, especially when high steam temperatures (>220° C.) are used and a longer residence time (>15 minutes) for the oil is selected. Thus, the storage stability is influenced by the classical refining methods to varying degrees. Moreover, the storage stability of refined oil is often not superior to that of cold-pressed oil since native oils may contain a greater amount of antioxidants, and processing does not add any further components which promote auto-oxidation. Components which promote auto-oxidation mostly have radical or radical-forming groups. A targeted depletion of these compounds is not possible by methods of the prior art.

Furthermore, there is scientific evidence that formation of secondary oxidation products correlates with the decrease in the sensory quality of the oil. This is because many of the secondary oxidation products themselves, such as aldehydes and ketones, lead to an off-flavor. It could be shown that the concentration of secondary oxidation products, which can be estimated by a reaction with anisidine, predicts both the formation of off-flavors and the extent of color reversion of oils that have been exposed to oxidants and bleaching earths. In this respect, determination of the anisidine value is of practical value, since it correlates with the content of aldehydes (2-alkenals and 2,4-dienals) and ketones.

Further optimization in removal of the color pigments was reported for the combined use of phosphoric and sulfuric acid having a more rapid and stronger bleaching effect. For removal of the acids and the degradation products of the color pigments, a caustic wash stage, which leads to a saponification of acids, is performed. These soaps are difficult to remove from the oils and often result in a loss of product due to additional removal of oil. Furthermore, soaps that remain in the washed oil lead to an unpleasant taste; thus, deodorization by means of steam extraction is still required. Procedures, allowing a depletion of dyes and/or odorants and/or flavors, which are present in vegetable oils, without using bleaching earths and/or deodorization procedures, have yet not been presented.

In vegetable oils, a variety of organic compounds can cause an uncomfortable sensation of the olfactory or gustatory senses. It is often not possible to distinguish whether the sensory perception of a smell or taste is caused by an odorant or a flavoring because the overall sensory impression of a flavor arises due to the merging and interference of nerve impulses that originate from different sensory areas of the nose, mouth, and throat. Therefore, sensory smell and taste attributes overlap.

Organic compounds which lead to an odor or taste perception have a very different origin, corresponding to the different classes of compounds to which they can be assigned. It is believed that there are more than 10,000 different compounds in lipid phases, and especially in vegetable oils, which contribute to sensory effects. The composition differs not only for each type of oil, but also depends on the growth conditions, the extraction process of the oils as well as how clarification and storage is performed, etc. Most flavorings and odorants in the lipid phases are in amounts below the threshold of perception. Removal of these compounds is therefore not necessary.

Most vegetable oils that are used as edible or essential oils, contain one (or more) taste and/or odor component(s) which is (are) considered to be characteristic for the product and which is (are) regarded as a desired positive attribute. For the qualitative assessment of such oils, manifestation and purity of specified sensory characteristics are considered as quality attribute. The presence of other sensory perceptions is interpreted as an off-odor or and off-taste, thus, results in the oil being classified as having inferior quality. Therefore, not all flavorings which are responsible for sensory perception should be removed for producing high-quality oils. Rather, it is the goal of a deodorizing procedure to remove off-flavors. It is therefore necessary, if possible, to remove such disturbing flavorings and odorants from these oils. Lipid phases that are not used for human consumption or for cosmetic applications may also be contain flavorings and odorants which lead to a limitation of the utility of the lipid phase. Examples are fish oils or animal fats or used cooking oils. Since only a few of the organic compounds that are responsible for the various sensory perceptions have been identified, prediction of the perceived sensations through a characterization and quantification of organic compounds present in a lipid phase using chemical analytical methods is not possible.

Methods and procedures to remove flavorings and odorants from lipid phases are known in the art. They are summarized under the term deodorization. The methods are based on the ability of phyllosilicates, which are also used for bleaching lipid phases, to bind organic compounds that are flavorings and odorants. Furthermore, they rely on the oxidizability of some of these organic compounds, e.g., by the use of chlorinated lime, sodium hypochlorite, sodium peroxide, or sodium perborate, and on the removal of these organic compounds by steam extraction. Since depletion of flavorings and odorants by adsorption and oxidants is generally not sufficient, deodorization is generally performed by means of steam extraction. Here, steam temperatures of 230° C. to 280° C. are used for duration of 30 to 60 minutes and a pressure of below 1500 Pa. In this process, steam consumption amounts 0.7 to 1.2 tons per ton of oil.

There are numerous patents on methods for optimizing steam deodorization (EP 0032434 B1 Process for deodorizing edible oil). Volatile organic compounds are very effectively removed with the vapor phase at high temperatures. However, in addition to the intended removal of specific flavorings and odorants, flavorings and odorants which are being characteristic for a vegetable oil are also removed; therefore, the sensory quality of deodorized oil might be inferior to that of the untreated oil.

Process modifications of the steam deodorization process have been introduced, known under the heading "Plant flavor-stable process temperature" (PEFSPT) (U.S. Pat. No. 4,378,317 Process to maintain bland taste in energy efficient oil deodoration system) which aim to selectively keep characteristic flavorings in an oil. In addition, methods have been proposed to address other drawbacks of the steam deodorization, e.g., the oxidation of organic compounds or an undesirable discharge of compounds (e.g., tocopherols) (U.S. Pat. No. 5,315,020 A Method of recovering waste heat from edible oil deodorizer and Improving product stability; AU 2010275318A1 A deodorized edible oil or fat with low level of bound MCPD and process of making using inert gas). Further, treating the lipid phase with high temperature steam produce decomposition products and compounds (polymers, epoxymeres, oxidation products) which are potentially harmful, such as trans fatty acids or monochloro propanediol ester (MCPD), such as 3-monochloropropane-1,2-diol (3-MCPD), as well as phthalates or adipates, for example, diisodecyl phthalate (DIDP). Furthermore, organic compounds are removed, that can improve storage stability of the refined lipid phase and exhibit beneficial health effects, such as tocopherols or carotenoids.

Furthermore, the use of bleaching earths is disadvantageous since process costs significantly increase and there is consumption of resources and waste streams arise, since the process is carried out at elevated temperatures and the bleaching earths are not reusable. Further, there is a relevant loss of oil by unintended discharge while removing bleaching earths from the lipid phase. In addition, antioxidants and phytosterols may be removed from the oil with this step.

Similarly, the vapor extraction (deodorization) leads to a significant increase in process cost and product loss. Therefore, methods which enable a resource-saving optimization of the classical oil refining process and yield biologically improved oil products are still necessary.

OBJECT OF THE INVENTION

The object of the present invention is to provide a process for the reduction of flavorings and odorants and/or coloring agents that lead to sensory and/or optical deterioration of a lipid phase from various origins, and that is inexpensive, easy to perform, and gentle on the product.

DETAILED DESCRIPTION OF THE INVENTION

This object is achieved by the technical teaching of the independent claims. Further advantageous embodiments of the invention result from the dependent claims, the description, the figures and the examples.

According to the invention the object is achieved by a process for reduction of odorants or dyes from a lipid phase comprising the steps of:
a determining the phosphorus content of the lipid phase and testing for the presence of mucilages in the lipid phase, and
b) performing a pre-purification step, if the phosphorus content exceeds a predetermined value, or the investigation for the presence of mucilages is positive, and
c) adding an aqueous phase containing a compound having at least one amidino group or at least one guanidino group and that have a partition coefficient between n-octanol and water of $K_{OW}<6.3$,
d) preparing a mixture of the lipid phase and the aqueous phase, and
e) carrying out a centrifugal phase separation and removal of the aqueous phase containing the detached odorants and/or dyes.

The designation $K_{OW}$ refers to the distribution coefficient between n-octanol and water.

It has been shown that a refined oil is obtained after steps c), d), and e) according to the process which has a high purity and is substantially free from flavorings and/or odorants and/or dyes and is particularly free from undesired color and in particular free of disturbing odorants and off flavors.

The invention also relates to a process for reduction of flavorings, odorant, and/or dyes of a lipid phase comprising the steps of:
a) determining the phosphorus content of the lipid phase, testing for the presence of mucilages in the lipid phase, and
b) performing a pre-purification procedure when the phosphorus content exceeds a predetermined value or the investigation for the presence of mucilage is positive, and
c) adding an aqueous phase containing a compound having at least one amidino group or at least one guanidino group and that have a partition coefficient between n-octanol and water of $K_{OW}<6.3$, and
d) preparing a mixture of the lipid phase and the aqueous phase, and
e) carrying out a centrifugal phase separation for separating the aqueous phase containing the detached odorants and/or flavorings and/or dyes.

The invention thus relates to a process for the multistage aqueous refining of lipid phases.

Flavorings and odorants include classes of compounds, such as alkaloids, alcohols, aldehydes, amino acids, aromatic hydrocarbons, esters, lactones, cyclic ethers, furans, furanoides, free fatty acids, flavonols, glycosides, ketones, saturated and unsaturated hydrocarbons, enamine ketones, ketopiperazine, isoprenoids, mono-terpenes, terpenes, cyclic terpenes, triterpenes triterpenoids, tetraterpenes, sesquiterpenes, sequiterpenoides, sterols, phytosterols, steradienes, purine derivatives, phenyipropanoids, phenols, nitrites, alkenylisothiocyanates, glucosinolates, and/or hydroxycinnamic acid derivatives. These classes of compounds may both, separately and in any composition, occur in a raw lipid phase originating from a biogenic raw material.

This concerns in particular 1,5-octadiene-3-ol, butanal, hexanal, octanal, nonenal, nonadineal, decanal, dodecanal, piperonal, cysteine, cystine, methionine, phenanthrene, anthracene, pyrene, benzopyrene, 4-hydroxybutanoic acid, hexanoate, coumarin, maitol, diacetylfuran, pentylfuran, perillene, rosefuran, caprylic acid, hydroxy fatty acids, amygdalin, progoitrin, 2-heptanon, 2-nonanon, decatrienal, 1-octen-3-on, vinylamylketon, 4-(4-hydroxyphenyl)-butan-2-on), mycosporin, diketopiperazin, humulone and lupulone (bitter acids), mono-terpenes: myrcen, ocimen and cosmen, linalool, myrcenol, ipsdienol, neral; citronellol and geranial, citronellal, mycren, limonen, linalool, nerol, geraniol, terpinolen, terpinen and p-cymol, carvon and carvenon, thymol, dihydroxycarveol, 2-pinen, - and β-pinen, limonen, phellandren, menthan, campher; fenchon, xanthophylline, bisabolane, germacrane, elemane andhumulane, farnesene, rotundon, sterole, phytosterole, p-cresol, guajacol, ferula acid, lignin, sinapin, catechine, eugenol, vanillin, 3-butenylisothiocyanat, 4-petenylisothocyanat, 4-pentennitril, 5-hexenitril, camphen, dodecan, cinnamylalcohol, fenchylalcohol, 1R,2S,5R-isopulegol, 2-ethylfenchol, menthol, 4-hydroxy-3,5-dimethoxybenzylalcohol, (R)-(−)-lavandulol, piperonylalcohol, thujylalkohol, 1,8-cineol, 4-ethylguajacol, N-[[(1R,2S,5R)-5-methyl2-(1-methylethyl)cyclohexyl]carbonyl]-glycinethylester, (1R,2S,5R)-N-cyclopropyl-5-methyl-2-isopropylcyclohexancarboxamid, L-alanine, aspart acid, 2,4-dimethylthiazol, lenthionin, (+)-cedrol, 3-methylphenol, anisol, 1-methoxy-4-propylbenzol, 4-allyl-2,6-dimethoxyphenol, 2,6-dimethoxy-4-vinylphenol, ethyl-4-hydroxy-3-methoxybenzylether, vetiverol, 2-butylethylether, ethylgeranylether, carvacrol, 2-methylpropanal, cinnamic aldehyde, p-tolualdehyde, 2-methyl butyraldehyde, salicylaldehyde, acetic acid, lactic acid, 3-methyl butyric acid, hexanoic acid, 1-malic acid and/or anethole. These compounds may both, separately and in any composition, occur in a raw lipid phase originating from a biogenic raw material.

Thus, the present invention relates to a method, wherein the flavorings and odorants comprise, for example, alkaloids, alcohols, aldehydes, amino acids, aromatic hydrocarbons, esters, lactones, cyclic ethers, furans, furanoides, free fatty acids, flavonols, glycosides, ketones , saturated and unsaturated hydrocarbons, enamine ketones, ketopiperazines, isoprenoids, mono-terpenes, terpenes, cyclic terpenes, triterpenes triterpenoids, tetraterpenes, sesquiterpenes, sterols, phytosterols, purine derivatives, phenylpropanoids, phenols, nitriles, alkenylisothiocyanates, glucosinolates, and/or hydroxycinnamic acid derivatives.

In addition, the present invention relates to a method where the preferred flavorings and odorants include 1,5-octadiene-3-ol, butanal, hexanal, octanal, nonenal, nonadineal, decanal, dodecanal, piperonal, cysteine cystine, methionine, phenanthrene, anthracene, pyrene, benzopyrene, 4-hydroxybutanoic acid, ethyl hexanoate, coumarin, maltol, diacetylfuran, pentylfuran, perillene, rosefuran, caprylic acid, caprinic acid, hydroxy fatty acids, amygdalin, progoitrin, 2-heptanone, 2-nonanone, decatrienal, 1-octene-3-one, vinylamylketon, 4-(4-hydroxyphenyl)-butan-2-on), mycosporine, diketopiperazine, humulones and lupulones (bitter acids), mono-terpenes: myrcene, ocimene and cosmen, linalool, myrcenol, ipsdienol, neral; citronellol and geranial, citronellal, mycrene, limonene, linalool, nerol, geraniol, terpinolene, terpinene and p-cymene, carvone and carvenon, thymol, dihydroxycarveol, 2-pinene, α- and β-pinene, limonene, phellandrene, menthane, camphor; fenchon, xanthophylline, bisabolanes, germacrane, elemanes and humulane, farnesene, rotundon, sterols, phytosterols, p-cresol, guaiacol, ferulic acid, lignin, sinapine, catechins, eugenol, vanillin, 3-butenylisothiocyanat, 4-petenylisothocyanat, 4-pentenenitril, 5-hexenenitril, camphene, dodecane, cinnamyl alcohol, fenchyl alcohol, 1R,2S,5R-isopulegol, 2-ethylfenchol, menthol, 4-hydroxy-3,5-dimethoxybenzyl alcohol, (R)-(−)-lavandulol, piperonyl alcohol, thujyl alcohol, 1,8-cineol, 4-ethylguajacol, N-[[(1R,2S,5R)-5-methyl-2-(1-methylethyl)cyclohexyl]carbonyl]-glycinethylester, (1R, 2S, 5R)-N-cyclopropyl-5-methyl-2-isopropylcyclohexan-carboxamid, L-alanine, asparic acid, 2,4-dimethylthiazol, lenthionin, (+)-cedrol, 3-methylphenol, anisol, 1-methoxy-4-propylbenzol, 4-allyl-2,6-dimethoxyphenol, 2,6-dimethoxy-4-vinylphenol, ethyl-4-hydroxy-3-methoxybenzylether, vetiverol, 2-butylethylether, ethylgeranylether, carvacrol, 2-methylpropanal, cinnamic aldehyde, p-tolualdehyde, 2-methyl butyraldehyde, salicylaldehyde, acetic acid, lactic acid, 3-methyl butyric acid, hexanoic acid, 1-malic acid and/or anethole, humulone, and/or lupulon. Especially preferred are 1-octen-3-on (muffy), capryl acid (rancid odor), carpin acid (goat-like smell), humulone, and/or lupulon.

Object of the invention is to reduce or completely remove dyes which are present in the lipid phase, particularly in oils of vegetable or animal origin. These color pigments or dyes, respectively as defined below, contaminate the lipid phases while producing the lipid phases, e.g., by pressing or solvent extraction. Therefore, the amount of dissolved dyes is determined by various conditions such as the manufacturing process of the lipid phase (pressing pressure, moisture, heat exposure), the storage conditions of the raw oils (duration, water content, content of impurities), the conditions in the treatment of oil during a refining (acid/alkali treatment, addition of oxidizing agents, heat treatment), and the conditions during storage of the refined oil (temperature, UV or oxygen exposure). In particular, by oxidative processes such as a Maillard reaction, compounds are formed which lead to an undesired coloring and an off-flavor. This concerns, for example, the emergence of melanoidins which are nitrogen-containing polymers of amino acids and carboxylic acids, and result in a brown color appearance of the oil. Another example are tocopherols, which can be oxidized during a bleaching process which are then precursor for color pigments that can arise during the course of storage. Discoloration (change in the color spectrum) of refined oil is called "color reversion" which occurs particularly in corn oil.

Dyes of biogenic origin that are found in lipid phases are almost exclusively organic compounds, which can be non-polar (e.g., carotenes) or contain only a few polar groups, e.g., chlorophylls. Therefore, they readily dissolve in a lipid phase or are extracted from other structures by a lipid phase. The dye classes differ significantly in their chemical properties. However, many of these compounds have a considerable chemical reactivity or catalyze reactions, particularly in the presence of a water fraction in the lipid phase or exposure to ionizing radiation (e.g., UV light).

This can in turn cause hydrolysis and/or oxidation of fatty acids or other ingredients of the lipid phase, which are undesirable, since compounds can arise which unfavorably alter the sensory quality of the lipid phase. Since these reactions are mainly caused by dyes which contain polar groups, methods and procedures have been developed to remove these compounds from lipid phases. A variety of methods have been proposed. As a matter of fact, only a few methods are in practical use, which can be assigned to processes for the adsorption of dyes (for example, by layer silicates, activated silica gels, activated carbon), chemical decomposition with strong acids (such as phosphoric acid or sulfuric acid), extractions with organic solvents (for example with alcohols), physical extractions (e.g., filtration, steam extraction). These methods are known in the art and are therefore not further described. A method that utilizes an aqueous medium for removal of dyes from oil is not known, except for applications of the aforementioned acid treatments.

The object of commercially conducted bleaching processes is to remove dyes from a lipid phase, which cause or accelerate chemical reactions or cause a coloring that is undesired by customers. In edible oils green, brown, black or reddish colors are not desirable; a pure yellow hue is however perceived as characteristic of oils. Therefore, the object of the present invention is directed to the removal of dyes which are causative for said chemical reactions or for an optically adverse impairment of the lipid phase. These dyes are, in particular, chlorophylls and their derivatives and degradation products such as pheophytin, but also flavonoids, curcumin, anthocyanin, indigo, kaempferol and xanthophylls, lignins, melanoidin.

Surprisingly, it has been found that reduction or removal of undesirable dyes from lipid phases with the inventive process is possible.

The technical teaching of the invention document is that with the use of the inventive method depletion of undesirable dyes can be carried out that is at least as effective as a bleaching procedure with adsorbents which are known in the prior art. This was demonstrated for both the achieved color spectra and depletion of chlorophyll obtained by the aqueous nano-emulsifying refining process. In contrast to methods utilizing adsorbents for the removal of dyes, it is not necessary to heat the lipid phase with the use of the inventive process, or to apply a vacuum or maintain a predefined residence time. Therefore, the inventive method is suited for resource- and product-friendly removal of undesired dyes from lipid phases.

In addition, the invention is directed to a method for reducing color reversion of refined lipid phases.

The inventive aqueous refining process enables extraction of organic compounds from a lipid phase, such as mucilages, flavorings and odorants and dyes into an aqueous phase, from which they can be isolated. By contrast, these organic compounds cannot be retrieved from bleaching processes that are known in the art. Therefore, the present invention is also directed to a separation of mucilages, including flavorings and odorants and dyes into an aqueous solution, from which they can be isolated for further utilization.

For the implementation of an aqueous refining step of a lipid phase, it is necessary to bring the lipid and the water phases into contact. For this purpose procedures from the prior art are available. These procedures aim to obtain a water-in-oil mixture, which can be separated again by centrifugal methods into an aqueous and an oil phase. A skilled person in the art knows that through admixture of an aqueous phase to a vegetable oil very stable emulsions, which are not separable by centrifugal separation techniques, can be created. Mixture of a lipid and an aqueous phase can be achieved with various techniques, which differ considerably in their intensity. This ranges from stirring with low shear forces to homogenization. By homogenization, as described below, high shear forces or pressure are applied to create a large interface, thereby obtaining stable water-in-oil emulsions that can be used as, e.g., ointments or creams. Such intense mixing methods are not used for the refinement of vegetable oils because of the stability of emulsion that are obtained herewith.

Through an intensive mixing process or homogenization, a considerably greater interface between two phases is created, compared to agitation with low shear forces, although emulsions are also created. Mechanisms that accomplish high shear forces are based on the creation of turbulence or cavitation.

The required energy input can be provided through ultrasound, tube or piston-gap systems as well as static systems that generate micro- or nano-fluidic shear forces or turbulence. The inventive intensive mixing process does not depend on one of the aforementioned methods, as long as a homogenate, as disclosed herein, is achieved.

Consistent with the literature, emulsions, which hardly allowed phase separation by means of ultracentrifugation, were created by intensive mixing of plant raw oil and basic solution.

Refinement of raw oils, performed with an arginine solution that was admixed to the oil phase by a stirrer exerting low shear forces, allowed reduction of odorants or dyes. However, in obtaining a high-quality refined lipid phase results for many problematic oils (e.g. grape seed oil, pumpkin seed oil, sesame oil, fish oil, animal fats) were not sufficient when compared of that of similar oils treated by a classical refining consisting of a pretreatment with phosphoric acid and a treatment with a bleaching earth and a subsequent deodorization.

This deficiency can be resolved by the simple and universally feasible process technology, which is disclosed herein.

Thus, the invention also relates to the provision of a method that enables feasibility of an intensive mixing of the lipid phase with a basic aqueous phase.

The problem can be solved by means of a simple and readily available test method that is performed before a refining stage, utilizing an arginine solution or a solution of a compounds containing at least one amidino group or at least one guanidino group and a partition coefficient ($K_{OW}$) between n-octanol and water that is <6.3. The result of this test indicates whether or not one or more pre-purification refinement stage(s) must be performed, in order to obtain a lipid phase that is acceptable for homogenization of the native or pre-cleaned oil phase with a solution containing compounds having at least one amidino group or at least one guanidino group, and the resulting emulsions can be separated into two phases thereafter.

It was found that stable emulsions arise from a mixing processes in which low shear forces were applied by using solutions of compounds containing at least one amidino group or at least one guanidino group even when the oils have undergone pre-purification steps. When using a rotor-stator dispersing tool for mixing of the two phases, performed under identical conditions, initially there was also a marked increase in the viscosity of a rapidly forming emulsion. Surprisingly, continuation of the intensive mixing process resulted in a decrease of the viscosity; thus, the resulting emulsion exhibited a lower viscosity than the original oil phase. It has been shown that a centrifugal phase separation of the emulsion prepared by an intensive mixing in two emulsion-free phases is possible only if this condition is met.

The process is therefore directed to the separability of water-in-oil emulsions into two emulsion poor or two emulsion-free phases.

Furthermore, it was shown that the process of intensive mixing improves both the process flow and the product quality. In one investigation it was shown that even after several hours of stirring of a solution containing compounds having at least one amidino group or at least one guanidino group and a lipid phase with a propeller mixer using an approximately equal amount of energy as the amount of energy that has been applied for homogenization of those fluids by a rotor-stator system, the quality of the resulting emulsion was inferior.

The superiority of the mixing quality by using an intense mixing procedure could be documented by a smaller size of particles/droplets measurable in the emulsions that also exhibited a more intense turbidity.

Furthermore, droplet dimensions were durable in emulsions that were produced by the intensive mixing procedure, while there was progressive increase of the average droplet size in emulsions obtained after mixing with a stirring device. Therefore durability of the emulsion forming droplets is increased.

Surprisingly, the separability of emulsions that were obtained after application of a large amount of energy accomplished by an intensive mixing procedure and in which the droplet size of >90% of all measured particles was <1 µm, and which showed only very slight tendency to coalesce, was possible by centrifugal separation technology, yielding phases that were virtually emulsion-free.

These differences then turned out to be decisive determinates of the achievable reductions of flavorings and odorants or dyes, due to an intensive mixing procedure. Thus, separation efficiency depends on the receipt of a nano-emulsifying emulsion obtained by an intensive mixing process utilizing a solution containing compounds having at least one amidino group or at least one guanidino group and a partition coefficient ($K_{OW}$) between n-octanol and water <6.3, which is enabled by the intensive mixing procedure. It could be shown that the refining of lipid phases can be carried out faster with the use of an intensive mixing procedure as compared to other mixing procedures.

Therefore, the invention is also directed to the provision of an intensive mixing process of basic solutions for the production of low-viscous emulsions with a diameter of water droplets contained herein of <1 µm.

Furthermore, a method for the refining of lipid phases is provided by which the process duration can be shortened and product quality is improved, by the use of an intensive mixing procedure.

Thus, for the first time a method is provided by which it is possible to refine oils of different quality and different origins by an aqueous refining process with the use of a simple analytical technique, where bleaching and deodorization can be guaranteed in a single process step.

The inventive method also offers significant improvements over the procedures of the prior art:
Continuous process
No heating of the oil phase
Conservation of natural resources (bleaching earth) and elimination of their waste disposal
Prevention of heat-related changes to triglycerides (trans fatty acids) or other oil ingredients (oxidation products), thereby increasing the oxidation and storage stability of the oil phase.

It has surprisingly been found that lipid phases refined by this method exhibit a purity which does not necessitate treatment with activated bleaching earths or to perform steam deodorization.

Refined oil phases obtained from the process that have been dried were analyzed by the Lovibond method which documented a significant reduction of red and yellow color elements. Moreover, obtained refined lipid phases had residual contents that were less than 5 ppm, especially less than 2 ppm (mg/kg) for phosphorus-containing compounds, less than 0.2 wt %, in particular less than 0.1 wt % for free fatty acids, and less than 3 ppm (mg/kg), particularly less than 0.02 ppm (mg/kg) for Na, K, Mg, Ca or Fe ions. In addition, refined lipid phases which exhibit a significant reduction in undesired colors and color intensities and are substantially free of off-flavors are obtained. In particular, it is possible to remove a proportion of chlorophyll compounds and off-flavors of more than 90%. In certain purifications it is even possible to reduce the phosphorus content to 0.8 ppm.

In other words, the refined lipid phases obtained are characterized by residual contents of key characteristics such as of phosphorus-containing compounds of <5 ppm (mg/kg), particularly <2 ppm, and of free fatty acids of <0.2 wt %, in particular <0.1 wt %, and Na, K, Mg, Ca or Fe ions of <3 ppm, preferably <0.5 ppm, in particular less than 0.02 ppm. In addition, refined lipid phases which exhibit a significant reduction in false colors and color intensities and are substantially free of off-flavors are obtained. In particular, it is possible to remove a proportion of chlorophyll compounds and odorous substances of more than 90%. In certain purifications it is even possible to reduce the phosphorus content to 0.8 ppm.

Thus, the method is directed to a reduction of a refining step, which consists of a treatment with bleaching earth and/or a steam deodorization.

Further, the method is directed to a reduction of key oil parameters that is comparable to that obtained by a refining that comprises degumming, bleaching, and deodorization.

Surprisingly, it has been shown that these highly effective reductions or removals of oil mucilages, including flavorings and odorants and dyes can be accomplished particularly effectively when the lipid phase has a content of free fatty acids of >0.2 wt % which are dissolved by a solution containing compounds having at least one amidino group or at least one guanidino group in process step c). Moreover, it could be shown that in case that the content of free fatty acids is <0.2 wt % in a lipid phase to be refined, the refining result can be improved by addition one or more carboxylic acid(s) or addition of a nano-emulsion consisting of one or more carboxylic acids and a solution containing compounds having at least one amidino group or at least one guanidino group.

It can therefore be assumed that the electrostatic bonds between guanidino and/or amidino groups and carboxyl groups of carboxylic acids are present in the resulting emulsions, thereby forming nano-emulsions. Although this is not scientifically proven, it is believed that the nanoparticles, which result from the aforementioned bonding forces and which have a diameter of less than 2 nm, contribute to the achieved reduction of oil mucilages, including flavorings and odorants and dyes. Therefore, refining according to the inventive method can also be called nano-emulsifying refining; in the following, the terms aqueous refining with compounds containing at least one amidino group or at least one guanidino group and nano-emulsifying refining are used interchangeably.

The decisive advantage the nano-emulsifying refining is also that in one process step a reduction of flavorings and dyes can be achieved, so that a further reduction, e.g., by bleaching earth, is not necessary. At the same time the need for deodorization is eliminated, since a reduction of odorants, oxidation products, as well as carboxylic acids that are present in the lipid phase can be achieved with the same process step. This eliminates these refining steps. In addition, any alkaline earth metal ions and metal ions are reduced to degrees that are in accordance with the product requirements, for example, in the field of edible oils or vegetable oil fuels. In addition, the method ensures removal of phosphorus-containing compounds, which is true in particular for hydratable but also for non-hydratable phospholipids, whereby immediate applications of the resulting lipid phases also are possible as fuel for a combustion engine.

Therefore, nano-emulsifying extraction of mucilages, including flavorings and odorants and dyes, which is achieved by an intensive mixing procedure of an aqueous solution containing compounds having at least one amidino group or at least one guanidino group with a lipid phase, has distinct advantages over a refining step that utilizes a mixing process with low shear forces (e.g., stirring mixer), and represents a particularly preferred embodiment of the method.

The invention therefore relates to a nano-emulsifying aqueous refining process for the reduction flavorings and odorants and dyes from a lipid phase.

Furthermore, the invention relates to a process for the nano-emulsifying refining of lipid phases by means of the nano-emulsions.

In practice it has been found that hydratable mutilages often hinder such a nano-emulsifying refining process or make it impossible due to a strong emulsification. To estimate the content of the mucilage present in a lipid phase the phosphorus content, which can be determined by analytical methods (e.g. ICP-OES), is taken in account. Aqueous refining steps were performed in order to remove the organic compounds emulsifiable by admixing of water. Surprisingly, it was found that despite a reduction of phosphorus-containing compounds, in many lipid phases that exhibited phosphorus values of <10 ppm a nano-emulsifying refining was still not or only partially possible because of evolving stable emulsions. Prescreening of a further aqueous refining step with basic solutions then allowed the inventive nano-emulsifying refining steps c) to e).

As shown by the technical teaching of this application, it was not possible to predict whether after the nano-emulsifying process steps c), d), and e) the obtainable liquid phases can be separated from each other exhibiting a low or no formation of an emulsion, based on the determination of specific parameters of oils according to the prior art, such as of the content of phosphorus, magnesium, calcium, or of free fatty acids.

Surprisingly, such a prediction was possible with the herein described test for the presence of mucilages.

The invention also relates to methods for process control and testing of the applicability of the nano-emulsifying process stages c), d), and e) by determination of phosphorus content in the lipid phase and the determination of the presence of mucilages that can be emulsified by a basic solution and that exceed a predefined volume fraction.

The present invention thus also relates to a method of reducing odorants and/or dyes from a lipid phase comprising the steps of:

a) determining the phosphorus content of the lipid phase for the purpose of determining the presence of mucilages in the lipid phase, and b) performing a pre-purification process, if the phosphorus content exceeds a predetermined value, and c) adding to the lipid phase an aqueous phase containing a substance having at least one amidino group or at least one guanidino group and which has a partition coefficient (KOW) between n-octanol and water <6.3, and d) preparing a mixture or conduction of an intensive mixing procedure of the lipid phase and the aqueous phase, and e) applying centrifugal phase separation and removal of the aqueous phase containing the detached odorants and/or dyes.

Preferably, as disclosed in the methods herein, the determination of the phosphorus content is performed by ICP-OES.

Surprisingly, it was found that in all examined lipid phases—in which the phosphate content was initially low, but a high content of hydratable compounds was present, performing a simple washing step with a basic aqueous solution (e.g., with sodium carbonate), followed by centrifugal phase separation separating off those compounds, nano-emulsifying refining of the liquid phases was possible.

The inventive nano-emulsifying aqueous refining step with substance having at least one amidino group or at least one guanidino group, however, can only be carried out efficiently and economically if a depletion of water-binding mucilages has been performed to a sufficient degree. This condition can be guaranteed by the method disclosed herein with a simple and inexpensive test performed during process step b).

Therefore, conduction of a test for the presence of mucilages during process step a) as well as before performance of process step c) by the methods disclosed herein, is a particularly preferred embodiment, since process control for the nano-emulsifying refining can be performed reproducibly by simple means. It could be shown that the process step a) is applicable for process control in a large-scale application.

The highly advantageous nano-emulsifying refining results with the use of aqueous solution of arginine or of compounds containing a guanidino or amidino groups are achievable only if the lipid phase that is to be refined in process step c) has a phosphorus content that does not exceed a certain maximum value and a test on the presence of mucilage of the lipid phase reveals the presence of only a minimal amount (<1.0 vol %) of an emulsion layer, produced in an basic solution. Otherwise, pre-purification of the lipid phase is necessary before a nano-emulsifying refining step can be performed using Arginin or substance having at least one amidino group or at least one guanidino group. Mucilages as referred herein are organic compounds that may be either hydratable through a water phase or may be completely apolar and bound by a lipophilic interaction with other organic compounds being not a triglyceride, thereby reducing dischargeability of mucilage with a water phase and which therefore contribute to formation of an emulsion.

Mucilages include the following organic compound groups, without being limited to, waxes, wax acids, lingines, hydroxy and mycolic acids, fatty acids with cyclic hydrocarbon structures such as shikimic acid or 2-hydroxy-11-cyclo-heptyl undecanoic acid, mannosterylerythritol lipid, carotenes and carotenoids, chlorophylls, and their degradation products, further phenols, phytosterols, especially β-sitosterol and campesterol and sigmasterol, sterols, sinapine, squalene. Phytoestrogens, such as isoflavones or lignans. Furthermore, steroids and derivatives thereof, such as saponins, glycolipids and glyceroglycolipids and glycosphingolipids, rhamnolipids, sophrolipids, or trehalose lipids. Likewise, polysaccharides, pectins such as rhamnogalacturonans, arabinans (homoglycans), galactans and arabinogalactan. Furthermore, phospholipids, particularly phosphatidylinositol, phosphatides such as phosphatidylinositol, further long-chain or cyclic carbon compounds, further fatty alcohols, hydroxy and epoxy fatty acids. Likewise glycosides, lipoproteins, lignins, phytate or phytic acid and glucoinosilate. Proteins, including albumin, globulins, oleosines, vitamins, such as retinol (vitamin A1), as well as derivatives, such as, for example, retinoic acid, riboflavin (vitamin B2), pantothenic acid (vitamin B5), biotin (vitamin B7), folic acid (vitamin B9), cobalamins (vitamin B12), calcitriol (vitamin D), and derivatives, tocopherols (vitamin E) and tocotrienols, phylloquinone (vitamin K) and menaquinone. Furthermore, tannins, terpenoids, curcumanoide, xanthones. But also sugar compounds, amino acids, peptides, including polypeptides, as well as carbohydrates such as glucogen.

Thus, the present invention relates to a method, wherein the mucilage are preferably waxes, wax acids, lingines, hydroxy and mycolic acids, fatty acids with cyclic hydrocarbon structures such as shikimic acid or 2-hydroxy-11-cyclo-heptyl undecanoic acid, mannosterylerythritol lipid, carotenes and carotenoids, chlorophylls, and their degradation products, further phenols, phytosterols, especially 11-sitosterol and campesterol and sigmasterol, sterols, sinapine, squalene. Phytoestrogens, such as isoflavones or lignans. Furthermore, steroids and derivatives thereof, such as saponins, glycolipids and glyceroglycolipids and glycosphingolipids, rhamnolipids, sophrolipids, or trehalose lipids. Likewise, polysaccharides, pectins such as rhamnogalacturonans, arabinans (homoglycans), galactans and arabinogalactan. Furthermore, phospholipids, particularly phosphatidylinositol, phosphatides such as phosphatidylinositol, further long-chain or cyclic carbon compounds, further fatty alcohols, hydroxy and epoxy fatty acids. Likewise glycosides, lipoproteins, lignins, phytate or phytic acid and glucoinosilate. Proteins, including albumin, globulins, oleosines, vitamins, such as retinol (vitamin A1), as well as derivatives, such as, for example, retinoic acid, riboflavin (vitamin B2), pantothenic acid (vitamin B5), biotin (vitamin B7), folic acid (vitamin B9), cobalamins (vitamin B12), calcitriol (vitamin D), and derivatives, tocopherols (vitamin E) and tocotrienols, phylloquinone (vitamin K) and menaquinone. Furthermore, tannins, terpenoids, curcumanoide, xanthones. But also sugar compounds, amino acids, peptides, including polypeptides, as well as carbohydrates such as glucogen.

Surprisingly, the nano-emulsifying refining process according to the invention also leads to an improvement of the separation of carboxylic acids, as compared to a mixing process using low shear forces when using aqueous solutions containing compounds having at least one amidino group or at least one guanidino group, but also improves reductions of dyes, phospholipids, alkaline earth metal ions as well as phenols. Yet the particularly advantageous depletion of dyes from a lipid phase that has not achieved so far by means of aqueous refining processes is that the use of bleaching earths can be reduced or completely saved. The reductions of free fatty acids, phospholipids and alkaline earth metal ions as well as metal ions by means of an aqueous refining of vegetable oils with the starting qualities as examined herein also lead to an oil quality which also no longer necessitates deodorizing of the oils. This also applies to the reduction of odoriferous and flavoring substances, which are very likely to be emulsified by the likewise removed glycolipids and separated with these in the aqueous phase. Thus, process costs of oil refining can be reduced to a considerable extent. In addition, an improvement in quality of the refined oil can be expected unless deodorization becomes unnecessary hereby, because such ingredients that are quite desirable (e.g., polyphenols) are extracted by deodorization while health risk compounds are formed (e.g., trans-fatty acids and trans-fatty acid esters of triglycerides). Therefore, the aqueous refining process is particularly advantageous for the production of high quality lipid phases. Also particularly advantageous is the simple process control, which enables process control of the inventive method, since all process steps can be successively performed without delays and without relevant increases in the temperature of the process mixture. The process is also directed to a continuously operating refining process of lipid phases.

Therefore, the method is also directed to saving process costs, and a simple and time-saving process control.

Further, the method is directed to the obtainment of refined lipid phases, where the ingredients are physically or chemically unaltered or modified only to a small extent due to the refining process.

Aqueous refining processes are integral components in the purification of various lipid phases, one of the largest application areas is the refining of vegetable oils usable as edible oils. Despite numerous improvements of the established refining processes that are based on forming basic or acidic small hydrophilic compounds, thereby hydrating most of the mucilages present in the lipid phase, it is not possible so far to reduce the content of phospholipids and fatty acids and also that of odorants and dyes to a level that corresponds with the requirements of the industrial standards. However, by means of aqueous refining processes product, purification can be achieved easily with gentle product treatment. Thus, the inventive nano-emulsifying refining process is particularly suitable for a gentle product refining, whereby the advantageous reductions of residual amounts of phosphates, which are in the range of less than 2 ppm or 2 mg/kg, and less than 0.1 wt % of free fatty acids, less than 0.02 ppm, or 0.02 mg/kg of Na, K, Mg, Ca, or Fe ions are also achieved. In addition, along with a basic and/or acidic aqueous pre-purification step(s) of the lipid phases, by the use of the nano-emulsifying refining process, lipid phases which are depleted from green and brown dyes and appear significantly brighter and which are substantially free of undesired odorants and flavors are obtained. In particular, it is possible to remove a proportion of chlorophylls and its derivatives and odorants of more than 90%.

Another preferred embodiment is the production of a lipid phase, which in addition to a small content of mucilages and/or dyes and/or odorants or flavors, and free fatty acids, also have a low content of primary or secondary oxidation products. Preferred is also the receipt of a lipid phase in which anti-oxidative compounds such as polyphenols, tocopherols, etc. are not removed or are removed only to a small extent or are inactivated chemically or physically. Surprisingly, such a gentle product refining can be accomplished by the nano-emulsifying refining process according to the invention. It was shown that the content of antioxidant compounds decreases only slightly through the nano-emulsifying refining process, and at the same time oxidation products that were in the starting material were almost completely removed.

Altogether with the achieved reduction of mucilages and dyes there is significant improvement in the storage stability of the refined lipid phases.

In lipid phases and particularly in oils of vegetable and animal origin there are variable amounts of unsaturated carbon compounds, the majority of which comprise unsaturated fatty acids. Exposure of these compounds to atmospheric oxygen, or to heat, or to radiation (e.g., UV light) or bringing them into contact them with catalysts, such as iron, nickel, free radicals, or enzymes, such as e.g. lipooxygenases, or with an alkaline environment, can cause oxidation of double bonds of the organic compounds. Organic compounds that are catalyzed by oxygen radicals or metal and heavy metal ions are among others chlorophylls and riboflavin, creating hydroperoxides of the carbon compounds. These are chemically unstable and degrade to secondary oxidation products. This produces free alkoxy radicals. Detection and quantification of such oxidative products is performed in the routine analysis using the para-anisidine reaction test. Para-(p)-anisidine reacts with secondary oxidation products such as aldehydes and ketones that are present in a lipid phase. There is a strong correlation between the development of secondary oxidation products and the formation of off-flavors as well as discolorization (color reversion in a lipid phase and the content of secondary oxidation products.

In studies on the shelf stability of lipid phases which have been treated with a nanomulsive refining method according to the invention, it was shown that the initially achieved reduction in oxidation products present in the starting material, together with the achieved depletions of mucilages and dyes, resulted in a very small increase in oxidation products that occurred over 120 days at ambient temperatures and air oxygen exposure. It is also believed that the inventive refining process results in only limited removal of antioxidant compounds or a low deactivation rate of these compounds, thereby contributing to the improved storage stability.

Therefore, a preferred embodiment of the refining process according to the invention is the production of a purified lipid phase having a high storage stability.

Furthermore, it was shown that in lipid phases, which have been obtained by means of a nano-emulsifying refining, there it is no or only to a very small extent a discolorization (color reversion) in the course of at least 120 days.

Therefore, the method is also directed to improved color stability during storage of the lipid phase purified by a nano-emulsifying refining.

Improved storage stability was also documentedconcerning a reduced development of off flavors and arise of odorants through secondary oxidation products that cause unpleasant perceptions. Development of off-flavors was lower in oils refined by the inventive methods compared to oils refined using bleaching earth during the course of at least 120 days.

Therefore, the nano-emulsifying refining process is particularly suitable to improve sensory shelf life of lipid phases.

The process is also directed for obtaining sensory stabilized lipid phases.

Key Indicator Ranges and Methods for their Detection for Lipid Phases to be Provided Mucilages, as described below, may adversely affect the nano-emulsifying refining process and therefore quality parameters of the lipid phases should be determined as described herein, hereafter referred to as process indicators, in process step a) and be reduced to the predetermined values of the process indicators before performance of step c). Process indicators include the following: total phosphorus content (determination method: ICP), which must have a value of 515 ppm, thus there is sufficient reduction of mucilagesin order to perform the nano-emulsifying process step c). Further, the content of the neutralizable groups, in particular acid or carboxyl groups (determination method: for example, titration with methanolic KOH) should be determined prior to process step c) in an optional process step b1). If the determined value in step b1) is ≤0.2 wt %, the optional process step b2) may be carried out.

The invention also relates to a process wherein before carrying out process step b1) the optional process step b1) content of free fatty acids is determined, and, if the content of free fatty acids is below or equal to 0.2 wt % the optional process step b2) adding one or more carboxylic acid(s) is carried out, where the one or more fatty acids are admixed to the lipid phase.

For the determination of the content of hydratable saccharide-containing lipid compounds that are present in various lipid phases in high amounts and cause intense emulsification with water, there is no analytic procedure available that is used on a routine basis. For a person skilled in the art, it is easy to examine in addition to the phosphate and acid-containing compounds, which can be determined by the methods described above, whether other mucilages are present in a relevant amount. For this purpose a test for the presence of mucilagesis performed in process step a) that can be performed as follows: An aqueous solution containing a base or base-forming compound, e.g., sodium hydroxide, potassium hydroxide, sodium carbonate, sodium borate, and sodium metasilicate, at a concentration of 0.5 to 2 mol/l with a pH between 8 and 13 is applied to the lipid phase in a volume ratio of 0.5:10 to 5:10 (aqueous to lipid phase) and preferably 1:10 to 2:10 (aqueous to lipid phase) and admixed by shaking or rotation (vortex mixer (3,000 rpm) for 3 minutes) and then phase separation is obtained by centrifugation (2,000-3,000×g). Particularly suitable for this purpose is sodium hydrogen carbonate in a 0.5 molar solution at a pH of 11.5. In the presence of an emulsion layer that is clearly visible to the naked eye (FIG. 1) and that has a volume proportion of more than 1.0 vol %, preferably more than 2.0 vol %, preferably more than 3.0 vol %, preferably exceeds more than 4.0 vol %, and preferably more than 5.0 vol %, based on the volume of the mixture of lipid phase and alkaline solution, so the required product specification to perform process steps c) and d) is not achieved, and a suitable process for pre-purification the lipid phase has to be carried out before the nano-emulsifying refining process step c), d) and e) are performed.

The term emulsion-layer means a layer that is at the water/lipid phase boundary (within the oil or water phase) and can be distinguished from the two phases as a layer and due to the appearance and consistency, which is recognizable with the naked eye. The emulsion-layer may have a solid or liquid consistency; however, it differs significantly from the appearance and consistency from the oil and the water phase, which may be exist in form of clear phases or in the form of emulsions. The emulsion-layer may have a gel to ointment-like appearance and may also contain corpuscular material or aggregates. The viscosity of the emulsion-layer can range between low to high-viscous, but differs from that of the water and the lipid phase. Thus, a herein understood emulsion-layer is different in its appearance as well as the viscosity from the water and lipid phases. Therefore, the emulsion-layer can be quantified by volumetric measurement. The volume of the emulsion layer is determined (FIG. 1) by the sum of scale units which are between the lower and the upper phase boundaries of the emulsion-layer, or by separation of the emulsion-layer and subsequent volumetric determination.

The process indicators are therefore to be determined in process step a) and, if a process step b) has been carried out, must be determine again before carrying out process step c). A further process step b) is to be carried out when the determined process indicators are not reached.

The present invention thus also relates to a method for reducing odorants and/or dyes from a lipid phase comprising the steps of:

a) determining the phosphorus content of the lipid phase and testing for the presence of mucinages in the lipid phase by adding an aqueous solution having a pH from 8 to 13 in a volume ratio of 0.5:10 to 5:10 (base solution to lipid phase) and preferably admixed by shaking to the lipid phase and then phase separation is performed by centrifugation, where the presence of mucinages is recognized (positive) when a visible emulsion-layer exceeds a volume fraction of 1.0 vol % in relation to the volume of the lipid and the basic aqueous phases, and b) performing a pre-purification refining step if the phosphorus content exceeds a predetermined value, or the investigation for the presence of mucilage is positive, and c) adding an aqueous phase containing a compounds having at least one amidino group or at least one guanidino group and which has a partition coefficient ($K_{OW}$) between n-octanol and water <6.3 to the lipid phase, and d) preparing a mixture of the lipid phase and the aqueous phase, and e) carrying out a centrifugal phase separation and removal of the aqueous phase containing the detached odorants and/or dyes.

Preferably sodium hydrogen carbonate is used to prepare the aqueous alkaline solution in step a).

In principle, the inventive nanoemulsifying mixing process using an aqueous solution containing a dissolved form of at least one compound having a guanidino or amidino group can be performed immediately with every lipid phase that complies with the above-defined process indicators.

From the technical teaching it is evident that the presence of a high proportion of highly hydratable organic compounds such as phosphatidylcholines, leads to a severe emulsification, which hinders centrifugal phase separation. Therefore, in many applications it is necessary to carried out a pre-purification refining step of the lipid phase, as described herein. The lipid phases may be oils and fats in which; processes and techniques known from the prior art have been perform although the desired quality of the refining has not been obtained.

Thus, for the implementation of the nano-emulsifying refining process according to the invention a lipid phase must be provided in which the total phosphorus content is less than or equal to 15 mg/kg, more preferably <12 mg/kg, and most preferably <8 mg/kg. At the same time, a content of the neutralizable (carboxyl) acid groups has to be <15 wt % and >0.2wt %, more preferably <8 wt % and>0.2 wt %, and most preferably <1.5 wt % and >0.2wt %. In addition, it has to be ruled out that a volume fraction of >1.0 vol % of a macroscopically visible emulsion-layer forms in an examination of the content of mucilage with an alkaline solution, as described above. Therefore, of theexamination of the content of mucilage a negative result and a predeterminedphosphorus value should exceeded in order to successfully perform the nano-emulsifying refining process for the separation of flavorings and odorants and dyes. The phosphorus content has therefore to be determined in process step a) and after one or more of pre-purification processes in process stage b).

In another preferred embodiment, the predetermined value for the phosphorus content by a method disclosed herein in step b) is 100 ppm or 30 ppm or 20 ppm or 15 ppm.

Surprisingly, it has been found that using simple to carry out test procedures on the presence of multilages, the process control of the aqueous nano-emulsifying refining process can be guided. With the test on the presence of mucilages it may be decided whether to perform a pre-purification of the lipid phase with acidic or basic solutions to obtain suitability for an aqueous nanoemulsive refining step with a solution containing guanidino or amido group-bearing compounds that are admixed to the oil phase by an intensive mixing procedure, thereby permitting bleaching, deodorizing and removal of free fatty acids as well as inorganic compounds which are equivalent to a classical refining process in which the refining is based on degumming processes and a treatment with bleaching earths as well as steam deodorization.

Thus, the process allows several economically attractive advantages over methods of the prior art:
Continuous refining, a batch process is not needed
A heating of the oils to be refined is not required, whereby the process energy costs are reduced and the quality of the oils can be improved
Waiver of adsorbents such as bleaching earths or silica gels, whereby the processing costs and the amount of product loss by discharge along with the adsorbents is reduced,
Avoiding of deodorization by means of steam extraction which contributes to a reduction in process energy costs and improves product quality The investigation for the presence of mucilages in step a) is carried out in one embodiment of the invention by adding a sample of the lipid phase to an aqueous solution having a pH in the range from 8 to 13, the test being positive when there is a layering after shaking and phase separation, where the volume ratio of samples of the lipid phase to aqueous solution used being preferably 9:1.

In one embodiment the examination for the presence of mucilages in step a) is performed, by adding an aqueous solution having a pH in the range of 8 to 13 to a sample of the lipid phase, whereby said test is positive if after shaking and phase separation, an emulsion-layer formation is observable, wherein preferably the ratio by volume of lipid phase to aqueous solution is 9:1.

Methods for Carrying out Process Step b)

In one embodiment of the present invention, the lipid phase is precleaned in process step b) by adding water or an aqueous solution that is admixed and exhibits preferably a pH between 7.5 and 14, more preferably between 9.5 and 13.5, and most preferably between 11.5 and 13.0, and the aqueous phase is removed after mixing and phase separation. The use of one or more pre-purification steps prior to the application of a nanoemulsive refining step with an aqueous solution containing an amidino or guanidino group-containing compound has been shown to be an essential process element, provided that the content of oil contaminants which cause emulsion formation with an alkaline aqueous medium, exceed a certain level and to achieve bleaching and deodorizing with the nanoemulsive refining process in a process step which corresponds to the quality of bleaching and deodorizing according to the prior art. In a further embodiment the aqueous solution contains a base which is different from the substance in step c) and is preferably selected from sodium hydroxide, potassium hydroxide, ammonium hydroxide, sodium carbonate, sodium hydrogen carbonate, sodium bicarbonate, potassium carbonate and potassium hydrogen carbonate, sodium metasilicate, sodium borate. The appropriate concentrations and the mixing ratio of the aqueous phase with the oil phase can in principle be freely selected and can be easily determined by a specialist. Preferably, concentrations of the basic solutions are between 0.1 and 3 molar, more preferably between 0.5 and 2 molar, and most preferably between 0.8 and 1.5 molar. The volume ratio of the basic water phase and the oil phase should preferably be between 0.3 and 5 vol %, more preferably between 0.3 and 4 vol % and most preferably between 1.5 and 3 vol %. The addition of the basic solutions can be carried out continuously or in a batch process and the mixture of the two phases with stirrers of the prior art. However, it has shown in practice that the pre-purification should be performed with an intensive mixer, as described herein, in order to achieve a complete reduction of the mucilages present herein, provided that this does result in an emulsion that is not separable by physical methods.

According to a further embodiment of the present invention in process step b) pre-purification of the lipid phase is performed with an acid in a concentrated form or by means of an aqueous solution of an acid. The undiluted acid, or an acid-containing aqueous solution, which has a pH between 1.0 and 5, more preferably between 1.7 and 4 and most preferably between 3 to 3.5, is admixed to the lipid phase and thereafter phase separation is performed, separating the aqueous (heavy) phase. To adjust the pH value, acids are preferred and particularly preferred is an acid selected from phosphoric acid, sulfuric acid, citric acid, and oxalic acid. The mixing ratio between the undiluted acid, or the aqueous acid solution and the oil phase that should be used for an economical operation can be found out the skilled person, and are guided by the determined process indicators of the lipid phase. The volume ratio of the undiluted acid that is added is preferably between 0.3 and 1.0 vol %, more preferably between 0.1 and 2.0 vol %, and most preferably between 0.2 and 1.0 vol %. The volume ratio of the acid solution that is added is preferably between 0.5 and 5 vol %, more preferably between 1.0 and 2.0 vol %,and most preferably 0.8 and 2.5 vol %.

A particularly preferred embodiment is a pre-purification process with an acid or an acid- or base-containing solution where admixture to the oil phase is performed by means of an intensive mixer to obtain a dispersion or an homogenate, as described herein.

In one embodiment of the invention, admixture of the undiluted acid or the acid-containing solution or an aqueous alkaline solution in step b) is performed by an intensive mixing process, as described herein, particularly preferred are rotor-stator mixing systems, and systems that generate cavitation, such as ultrasound systems. In this case, the preferred exposure time for applications in a batch process is between 1 and 30 minutes, more preferably between 4 and 25 minutes and most preferably between 5 and 10 minutes. When a continuous mixing system (so-called in-line method) is used, the residence time in the mixer is preferably between 0.5 seconds and 5 minutes, more preferably between 1 second and 1 minute, and most preferably between 1.5 seconds to 20 seconds. The preferred temperatures at which the lipid phase and the added aqueous phase should have before applying the intensive mixing process are between 15 and 45° C., more preferably between 20 and 35° C., and most preferably between 25 and 30° C.

The separation of the aqueous phase from the emulsion in the process stage b) may preferably be carried out by centrifugal separation method, preferred is the use of centrifuges, separators, and decanters. The duration of a centrifugal separation depends on the product specifications (water content, viscosity, etc.) and the preferred separation method to be used and must be determined individually. Preferably, centrifugation should be carried out for 2 to 15 minutes, more preferably for 8 to 12 minutes. Preferred is a residence time in a separator or decanter of 2 to 60 seconds, more preferably of 10 to 30 seconds. The centrifugal acceleration is preferably selected from 2,000 to 12,000×g, more preferably from 4,000-10,000×g. The temperature during phase separation should preferably be between 15 and 60° C., more preferably between 20 and 45° C., and most preferably between 25 and 35° C.

In a further preferred embodiment, a further pre-purification step can be performed with a basic or acidic solution according to a method from the prior art in case that the investigation for mucilages is still not negative.

A particular advantage of the inventive process is that the aqueous pre-purification steps can be carried out at room temperature and without a prior conditioning in a continuous process sequence. These pre-purification steps differ thereby significantly from aqueous refining steps, which are known from the prior art and which are performed with the compounds disclosed herein, insofar, that it is not required to adhere to the demands of the known degumming processes concerning depletion of phosphorus-containing organic compounds or free fatty acids. This has a decisive impact on the practicality and the economic efficacy of the pre. purification process steps compared to processes with those compounds as performed by methods from prior art, since energy-intensive process steps (product heating, residence time in a mixing process, applying a vacuum) can be eliminated in this way.

A further aspect of the present invention relates to a process for the continuous nano-emulsifying refining of lipid phases.

If the examination of the lipid phase indicates the need for a pre-purification process, the selection of an aqueous refining process, i.e., treatment with an acid (neat or as an aqueous solution) or a base solution, can in principle be freely selected, so there are different ways how to perform the pre-purification process:

I. sole acid treatment, II. sole base treatment, III. first acid treatment then base treatment, IV. first base treatment, then acid treatment, V, repeated acid treatment, VI, repeated treatment with base, Selection of the appropriate and most cost-effective process can be done by a skilled person, since by the herein specified examination methods it can be assessed very easily and reliably whether further processing of the lipid phase in process steps c), d), and e) can be carried out. Practical experience has shown, however, that if pre-purification is required, the initial application of an aqueous acid treatment, followed, if still necessary, by an aqueous base treatment, represents the most preferred embodiment. Further, the use of phosphoric acid as described herein is particularly advantageous for pre-purification of a lipid phase having a high concentration of green or brown color components and/or odorants or off-flavors.

The method thus comprises, on the one hand, the direct refining of a lipid phase, which already has a low content of hydratable organic compounds and, on the other hand, the refining of a lipid phase in which previously one or more pre-purification steps using acid- or alkaline solutions as well as combinations thereof have been performed in order to obtain the required purity.

Methods for Carrying out the Method Steps c) and d)

The highly advantageous removal of odorants, flavorings and dyes, respectively, which cause off-flavors and/or an improper color of a lipid phase, is obtained by the inventive implementation of the process step c):

The lipid phase is mixed with an aqueous phase which contains dissolved compounds having at least one amidino group or at least one guanidino group and a partition coefficient ($K_{OW}$) between n-octanol and water <6.3, and the process stage d):

Preparing a mixture of the lipid phase and the aqueous phase.

Methods, techniques and variations are described below.

In a particularly preferred embodiment, the inventive removal of respective odorants, flavors and dyes, which cause off-flavors and/or an improper color of a lipid phase is obtained in process step d) by provision and set up of the nano-emulsive effect of nano-emulsified compounds containing at least one amidino group or at least one guanidino group and carboxylic acids.

For the preparation of such nano-emulsions the tremendous ability of guanidino or amidino groups to engage with carboxylic acids can be exploited. Since carboxylic acids are present in virtually all biogenic lipid phases, they are available already for the preparation of a nano-emulsion with compounds containing guanidino or amidino groups and must not be introduced additionally. Thus, on the one hand, they are bound and made extractable and, on the other hand, by producing a nano-emulsion, other lipophilic or amphiphilic compounds are dissolved and also extracted into the aqueous phase, by which they are separated altogether. Another decisive advantage is that there is no soap formation due to the electrostatic bonds that form between carboxylic acids and guanidino or amidino groups. Therefore, there is no formation of soaps that might remain in the oil and would unfavorably affect the refining result. Thus, a particularly advantageous embodiment of the process step c) and d) is the preparation of a nano-emulsion in a lipid phase by aqueous solution containing compounds having at least one amidino group or at least one guanidino group and carboxylic acids, that is obtained by an intensive mixing procedure with an intensive mixer.

In a further preferred embodiment, a nano-emulsion can also be prepared in lipid phases that are to be refined in process step b2) by adding a nano-emulsion, consisting of an aqueous solution containing at least one amidino group or at least one guanidino group and carboxylic acids that are nano-emulsified herein, to the lipid phase or by adding carboxylic acids to the lipid phase, independently from the addition of an aqueous solution containing at least one amidino group or at least one guanidino group.

In a further preferred embodiment, one or more carboxylic acids or a nano-emulsion, consisting of an aqueous solution containing compounds having at least one amidino group or at least one guanidino group and carboxylic acids, is added to the lipid phase.

In one embodiment, the substance used in step c) is a compound having not more than 10 carbon atoms and/or is used at a pH value of more than 7.0.

In an especially preferred embodiment, the substance used in step c) is arginine or an arginine derivative. Arginine is an amino acid and may remain in a product to a certain degree, e.g. in an application to prepare a food product.

In one embodiment, the substance containing at least one guanidino or amidino is used in molar excess in relation to titratable acid groups. It has been shown that complete separation of fatty acids is not possible if no such excess is present. This could be based on the fact that other amphiphilic or lipophilic compounds may also contain carboxyl groups, which can also interact with guanidino or amidino groups.

In one embodiment the concentration for the preferable used of compounds containing at least one amidino group or at least one guanidino group, dissolved preferably in a low-ion or ion-free water, is determined, by the acid number of to lipid phase be refined, which can be analyzed by titration with KOH. The number of carboxylic acid groups that can be derived therefrom is used to calculate the amount by weight of compounds containing at least one amidino group or at least one guanidino group to be added to the lipid phase in an aqueous solution. In one embodiment the number of carboxylic groups is least equal or greater to the number of guanidino or amidino groups which are present in free and ionized form. This means a molar ratio between the guanidino or amidino groups and free carboxylic acid groups or releasable compounds bearing carboxylic acids is >1:1 has to be obtained.

Preferred is a molar ratio between the determinable carboxylic acids (according to the acid number) with compounds containing at least one amidino group or at least one guanidino group of 1:3, more preferred of 1:2.2 and most preferred of 1:1.3, solved in preferably low-ion or ion-free water. In this case, the molarity of the solute solution containing compounds having at least one amidino group or at least one guanidino group may be preferably between 0.001 and 0.8 mol/l, more preferably between 0.01 and 0.7 mol/land most preferably between 0.1 and 0.6 mol/l. Since the interaction of the guanidino or amidino groups is ensured at ambient temperatures, the preferred temperature at which the addition of the aqueous solutions according to the invention may take place containing dissolved with compounds containing at least one amidino group or at least one guanidino group should be between 10 and 50° C., more preferably between 28 and 40° C., and most preferably, between 25 and 35° C. In principle the volume ratio between the lipid phase and the aqueous phase is unimportant when the inventive intensive mixing process of aqueous solutions containing compounds having at least one amidino group or at least one guanidino group is performed. However, in order to obtain the most beneficial resource-saving effects of the process, the volume of the water phase should be reduced to the minimum necessary. In one embodiment, therefore, the volume ratio (v v) of the aqueous solution in step c) to the lipid phase is in a range from 10 to 0.05 vol %, preferably from 4.5 to 0.08 vol %, more preferably from 3 to 0.1 vol %.

The volume and concentration ratio can be influenced by the fact that in some lipid phases organic compounds may be present that form emulsions such as glycolipids and which may be dissolved by an aqueous solution containing compounds having at least one amidino group or at least one guanidino group and thus the latter compounds are not available for the separation of the carboxylic acids. Therefore, in one embodiment a larger volume and/or concentration ratio of the aqueous solutions containing compounds having at least one amidino group or at least one guanidino group is chosen for the admixture to a lipid phase.

In one embodiment, the concentration of at least one substance in the aqueous phase in step c) is in a range from 0.001 to 0.8 molar, more preferably from 0.01 to 0.7 molar, and most preferably from 0.1 to 0.6 molar.

In one embodiment, the homogenization in step d) takes place in a temperature range from 15 to 60° C., preferably from 20 to 50° C., more preferably from 25 to 40° C.

In a further embodiment of the process step d) is carried out at a temperature of at most 60° C.

It has been shown that the refined lipid phases obtained by the disclosed nano-emulsifying refining process have a purity which renders posttreatment with bleaching earths or steam deodorization superfluous. In addition, refined lipid phases obtained therefrom have residual contents which are less than 5 ppm, in particular less than 2 ppm of phosphorus-containing compounds, less than 0.2 wt %, in particular less than 0.1 wt % of free fatty acids, less than 3 ppm, particular less than 0.02 ppm Na, K, Mg, Ca or Fe ions. In addition, refined lipid phases are obtained, which are essentially free of discolorings and are essentially free of undesired flavors or odorants. In particular, it is possible to remove a proportion of chlorophyll compounds and odorants of more than 90%. With certain purifications, it is even possible to reduce the phosphorus content to 0.8 ppm.

Thus, the present invention relates to lipid phases obtainable or obtained by any of the methods disclosed herein.

In addition, the present invention relates to lipid phases obtainable or obtained by any of the methods disclosed herein which have less than 5 ppm (or 5 mg/kg) of phosphorus-containing compounds.

The present invention relates to lipid phases obtainable or obtained by any of the methods described herein which contain less than 0.2 wt % free fatty acids, less than 3 ppm (or 3.0 mg/kg) Na, K, Mg, Ca and/or Fe ions and/or less than 10 wt %, based on the starting value of odorants, and less than 10 wt % based on the starting value of chlorophyll.

The invention relates to a off-flavor reduced lipid phase obtainable or obtained by one of the processes disclosed herein.

Further, the invention relates to lipid phases obtainable or obtained by one of the processes disclosed herein which have less than 5 ppm (or 5.0 mg/kg), in particular less than 2 ppm (or 2.0 mg/kg) of phosphorus-containing compounds, less than 0.2 wt %, in particular less than 0.1 wt % of free fatty acids, less than 3 ppm (mg/kg), in particular less than 0.02 ppm (or 0.02 mg/kg) of Na, K, and/or Fe ions and/or less than 10% of odorants causing a disadvantage smell based on the starting value of odorants, as well as less than 10% of chlorophyll based on the starting value.

The invention relates to a lipid phase that has a low level of off-flavors obtainable or obtained by one of the processes disclosed herein.

In one embodiment, the process is used to obtain a refined phase wherein the refined phase has less than 5 ppm (or 5.0 mg/kg), especially less than 2 ppm (or 2.0 mg/kg) phosphorus-containing compounds , 2 wt %, in particular less than 0.1 wt % of free fatty acids, less than 3 ppm (or 3.0 mg/kg), in particular less than 0.02 ppm (or 0.02 mg/kg) of Na, K, Mg, Ca and/or Fe ions and/or less than 10%, based on the starting value of odorants, and less than 10%, of chlorophyll based on the starting value.

In one embodiment of the invention, in addition to separation of odorants and dyes, also undesired flavorings are separated from the lipid phase according to one of the processes disclosed herein.

In a further embodiment, the mucilages and/or odorants and/or flavorings and/or dyes, contained in one of the aqueous refining phases according to the invention, are used in further applications.

Furthermore, it was unexpected and surprising that, for the investigated vegetable oils, irrespective of the species and starting oil characteristics examined, all the oils obtained by a process of intensive admixing of compounds containing at least one amidino group or at least one guanidino group according to the invention, corresponded to the quality standard of both edible oils as well as vegetable oil fuels. Thus, refining steps, such as bleaching or deodorizing, were dispensable for all raffinates obtained in this manner. To this end, the nano-emulsifying refining of vegetable oils according to the invention is also directed to a refining in which bleaching or deodorization is no longer required.

Furthermore, homogenization in step d) resulted in a viscosity decrease in some oils after an initial increase in the viscosity of the resulting emulsion, whereas in other cases inseparable emulsions formed during continued homogenization. It has been found that after a pre-treatment step with an alkaline solution and achievement of a negative test for the presence of mucilages as described herein, all lipid phases can be further treated in process steps c), d), and e), resulting in a low-viscosity emulsion, whereby subsequent phase separation can be optimally performed, and a reduction of coloring or odorous and/or flavoring agents as well as extremely low values for alkaline earth metals, metal ions as well as for the phosphorous content and for free carboxylic acids are obtained.

Surprisingly, it has been shown that the lipid phase should not exceed a maximum amount of hydratable organic compounds for the inventive application of the nano-emulsive aqueous refining process in order to enable nano-emulsive separation of dyes, off-flavors and odorants as well as other organic and inorganic substances, and phase separation can still be established.

A particularly preferred embodiment is therefore an intensive mixing process of aqueous solutions, such as can be done with in-line homogenizers, where addition of the aqueous phases in the process steps b) and/or c) to the lipid phase to be refined is accomplished by an inlet at or in the mixing chamber and the phases are dosed with a metering pump. In this way, the advantages of uniform homogenization during a continuous mixing process can be ensured.

Thus, one embodiment of the present invention is the preparation of an intensive mixing in step d) by the methods disclosed herein.

Another embodiment of the present invention is to perform a nano-emulsive purification by an intensive mixing process or homogenizing the phases in step d) with the methods disclosed herein.

The temperature of the aqueous solution that is admixed by an intensive mixing process to the lipid phase is freely selectable between 0° and 100° C., depending on the application. Since the electrostatic binding forces between the guanidino or amidino groups and the carboxylic acid groups are stronger at temperatures <40° C., applications are preferred in which the nano-emulsifyed lipid phase has a temperature between 10 and 50° C., and most preferably between 25 and 35° C. The need for a temperature increase due to the viscosity of the lipid phase has to be taken into account.

The duration and intensity of the intensive mixing process can vary to a large extent and arises naturally from the task. The lipid phase may be a vegetable oil that is already mucus-poor from processing, meets required specifications, has a low content of free fatty acids and dye pigments, and additionally has a low viscosity. Here it may be sufficient to admix only a small volume ratio, e.g., 1 vol % of a 0.5 M arginine solution by an intensive mixer for a period of 2 to 5 minutes to obtain homogenization and to complete the nanoemulsifying refining step. In general, however, the preferred embodiment is to obtain homogenization of the lipid phase with the aqueous solutions containing compounds having at least one amidino group or at least one guanidino group or a nano-emulsion consisting of an aqueous solution containing compounds having at least one amidino group or at least one guanidino group and a carboxylic acid by an intensive mixing process with a duration of <30 minutes, more preferably <15 minutes and most preferably <5 minutes, when performing a batch method.

Methods and Procedures of Method Step e)

The phase separation of the emulsions that have been produced in process stage d) can be performed by methods which are known for separation of a liquid-liquid mixture. Preferred, however, are procedures that allow centrifugal phase separation based on the existing density difference of the liquids. Thus, the preferred embodiment of process stage e) is to achieve a phase separation by means of centrifuges, separators, or decanters. The choice of the appropriate method depends on the volume or the required throughput, the viscosity of the lipid phase and the density difference between the water and lipid phase and the volume addition of the water phase. The temperature of the emulsion to be separated into separate phases is in principle freely selectable, preference is given to temperatures between 10 and 60° C., more preferably between 20 and 45° C., and most preferably between 25 and 35° C. The centrifugal force is preferably adjusted between 2,000 and 12,000×g, more preferably between 4,000 and 10,000×g. Preferably centrifugation is carried out for 2 to 15 minutes, more preferably for 8 to 12 minutes. The residence time in a separator or decanter is preferred 2 to 60 seconds and more preferably 10 to 30 seconds. A preferred embodiment is the use of a plate separator to execute process step e).

Forms of Application

The inventive nano-emulsifying refining process is in principle suitable for lipid phases of various origins and areas of application as well as for lipid phases that have different levels of impurities, as long as they meet the process specifications described herein. There is no limit to the amount of the lipid phase to be refined by the nano-emulsifying refining, as long as the intensive mixing process according to the invention can be technically implemented. Therefore the nano-emulsifying refining technique can be used on a laboratory scale, a pilot scale, or a large-scale refining facility. Particular preferred are large-scale refining facilities.

Definitions

Measurements

Measurements as described herein were performed under standard conditions, i.e., ata temperature of 25° C. and a pressure of 101.3 kPa, unless otherwise indicated.

Acids and Bases

The term "acids" is used for compounds which are able to deliver protons to a reactant, especially in an aqueous phase.

Accordingly, the term "bases" is used for compounds which are capable of absorbing protons, particularly in aqueous solutions.

Lipid Phase

The term "lipid phase" summarizes all organic carbon compounds of biogenic origin. It includes mixtures of biological origin which can be obtained from plants, algae, animals, and/or microorganisms and have a water content of <10% and a content of lipophilic substances comprising monoacylglycerides, diacylglycerols and/or triacylglycerides of a total of >70 wt %, or >75 wt % or >80 wt %, or >85 wt %, or >90 wt %, or >95 wt. Thus, the lipid phase may be, for example, an extract of oleaginous plants and microorganisms, such as seeds of rape, sunflower, soya, camelina, jatropha, palm, castor but may also derive from algae and microalgae and of animal fats and oils. It is irrelevant whether the lipid phase it is a suspension, emulsion, or colloidal liquid.

As far as the lipid phase is an extract or an extraction phase of lipoidal substances from a previously performed separation or extraction, the lipid phase may also contain organic solvents or hydrocarbon compounds in a proportion of >50%.

Preferred lipid phases are vegetable oils, in particular pressing and extracting oils from oil plant seeds. But also preferred are animal fats. Further included are nonpolar aliphatic or cyclic hydrocarbon compounds. These lipids phases are characterized in that >95% of the compounds herein are nonpolar.

In one embodiment, the lipid phase is a vegetable oil or animal fat. In particular, the lipid phase is a vegetable oil obtained by extraction or pressing, whereby known solvents can be used for the extraction.

In a further embodiment, the lipid phase to be purified, according to any of the methods disclosed herein, is a vegetable oil or an animal fat that can be used in the food industry.

A lipid phase according to the definition includes, inter alia, Acai oil, Acrocomia oil, almond oil, babassu oil, blackcurrant seed oil, borage seed oil, rapeseed oil, cashew oil, castor oil, coconut oil, coriander oil, corn oil, cottonseed oil, Kramben oil, flaxseed oil, grape seed oil, hazelnut oil, other nut oils, hemp seed oil, jatropha oil , jojoba oil, macadamia nut oil, mango oil, meadowfoam seed oil, mustard oil, neat's foot oil, olive oil, palm oil, palm kernel oil, palm olein oil, peanut oil, pecan oil, pine nut oil, pistachio oil, poppy seed oil, rice bran oil, safflower oil, camellia oil, sesame oil, shea butter oil, soybean oil, sunflower oil, tall oil, Tsubaki oil, walnut oil, varieties of "natural" oils with altered fatty acid compositions via genetically modified organisms (GMO) or traditional varieties, *Neochloris oleoabundans* oil, *Scenedesmus dimorphus* oil, *Euglena gracilis* oil, *Phaeodactylum tricornutum* oil *Pleurochrysis carterae* oil *Prymnesium parvum* oil, *Tetraselmis chui* oil, *Tetraselmis suecica* oil, *Isochrysis galbana* oil, *Nannochloropsis salina* oil, *Botryococcus braunii* oil, *Dunaliella tertiolecta* oil, *Nannochloris* oil, *spirulina* oil, *Chlorophyceae* oil *Bacilliariophyta* oil, a mixture of the previous oils or animal oils (especially marine animals oils), algae oils, oils such as rice bran oil and biodiesel.

Carboxylic Acids

Carboxylic acids are organic compounds which carry one or more carboxyl groups. A distinction can be made between aliphatic, aromatic, and heterocyclic carboxylic acids. Aliphatic forms of carboxylic acids, also called alkanoic acids, are fatty acids and are listed in the following paragraph.

Fatty Acids

Generally, fatty acids are aliphatic carbon chains having a carboxylic acid group. The carbon atoms may be linked with a single bond (saturated fatty acids) or with a double bond bridges (unsaturated fatty acids), these double bonds can be in a cis or trans configuration. As defined herein fatty acids refer to such compounds which have more than 4 consecutive carbon atoms in addition to the carboxyl group. Examples of linear saturated fatty acids are decanoic acid (capric acid), dodecanoic acid (lauric acid), tetradecanoic acid (myristic acid), hexadecanoic acid (palmitic acid), octadecanoic acid (stearic acid), n-eicosanoic acid (arachic acid), and n-docosanoic acid (behenic acid).

Examples of fatty acids that are mono-olefins are myristoleic acid, palmitoleic acid, oleic acid, elaidic acid, gondoic acid, and erucic acid.

Examples of fatty acids that are polyolefins are linoleic acid, linolenic acid, punicic acid, arachidonic acid, and nervonic acid.

Fatty acids may also carry functional groups such as the vernolic, ricinoleic, and lactobacillic acid. Herein functional groups include terminal cyclic carbon residues.

Examples of "fatty acids" are hexanoic acid, octanoic acid, decanoic acid, dodecanoic acid, tetradecanoic acid, hexadecanoic acid, heptadecanoic acid, octadecanoic acid, eicosanoic acid, docosanoic acid, tetracosanoic acid, cis-9-tetradecenoic acid, cis-9-hexadecenoic acid, cis-6-octadecenoic acid, cis-9-octadecenoic acid, cis-11-octadecenoic acid, cis-9-eicosenoic acid, cis-11-eicosenoic acid,cis-13-docosenoic acid, cis-1 5-tetracosen acid, t9-octadecen acid, t-11-octadecenoic acid, t3-hexadecenoic acid, 9,12-octadecadienoic acid, 6,9,12-octadecatrienoic acid, 8,11,14-eicosatrienoic acid, 5,8,11,14-eicosatetraenoic acid, 7,10,13, 16-docosatetraenoic acid, 4,7,10,13,16-docosapentaenoic acid, 9,12,15-octadecatrienoic acid, 6,9,12,15-octadecatetraenoic acid, 8,11,14,17-eicosatetraenoic acid, 5,8,11,14,17-eicosapentaenoic acid, 7,10,13,16,19-docosapentaenoic acid, 4,7,10,13,16,19-docosahexaenoic acid, 5,8,11-eicosatrienoic acid, 9c11t13t-eleostearinoic acid, 8t10t12c-calendula acid, 9c11t13c-catalpin acid, 4,7,9,11, 13,16,19-docosaheptadecanoic acid, taxoleic acid, pinolenic acid, sciadonic acid, 6-octadecinoic acid, t11-octadecen-9-inoic acid, 9-octadecinoic acid, 6-octadecen-9-inoic acid, t10-heptadecen-8-inoic acid, 9-octadecen-12-inoic acid, t7,t11-octadecadien-9-inoic acid, t8,t1-octadecadien-12-inoic acid, 5,8,11,14-eicosatetrainoic acid, retinoic acid, isopalmitinic acid, pristanic acid, phytanic acid, 11,12-methylen-octadecanoic acid, 9,10-methylen-hexadecanoic acid, coronaric acid, (R,S)-lipoic acid, (S)-lipoic acid, (R)-lipoic acid, 6,8-(methylsulfanyl)-octanoic acid, 4,6-bis(methylsulfanyl)-hexanoic acid, 2,4-bis(methylsulfanyl)-butanoic acid, 1,2-dithiolan-carboxyl acid, (R,S)-6,8-dithian-octanoic acid, (S)-6,8-dithian-octanoic acid, tariric acid, santalbic acid, stearol acid, 6,9-octadeceninoic acid, pyrulic acid, crepenic acid, heisteric acid, t8t10-octadecadien-12-inoic acid, t10-octadecadienoic-12-ynoic acid, ETYA, cerebronic acid, hydroxynervonic acid, ricinoleic acid, brassylic acid, thapsic acid, phytic acid, sinapinic acid, cinnamic acid, and trihydroxy acids For the production of nano-emulsions and use of the inventive nanoemulsifying extraction, suitable carboxylic acids are those which are poorly soluble or insoluble in water and are described by an octanol-water partition coefficient (Kow) of >2.0, more preferably >3.0, and most preferably >4.0.

Compounds Containing Guanidino and Amidino Groups

The term "guanidino and amidino group containing compounds and "guanidino and/or amindino compounds are used interchangeably herein.

A guanidino group is called the chemical residue $H_2N$—C (NH)—NH and its cyclic forms and an amidino group the chemical residue $H_2N$—C (NH) (see examples below) and its cyclic forms. Preferred are guanidino compounds which have in addition to the guanidino group at least one carboxylate group (COOH). It is also preferable that the carboxylate group(s) is/are separated from the guanidino group by at least one carbon atom within the molecule. Preferred are also amidino compounds which exhibit in addition to the amidino group at least one carboxylate group (COOH). It is also preferable if the carboxylate group(s) is/are separated by at least one carbon atom from the amidino group within the molecule.

These guanidino and amidino compounds preferably have a partition coefficient $K_{OW}$ between n-octanol and water of less than 6.3 ($K_{OW}$<6.3). Preferably, the $K_{OW}$ is <1.8 (log $K_{OW}$<0.26), more preferably <0.63 (log $K_{OW}$<-0.2), and most preferably <0.4 (log Kow <-0.4).

Particularly preferred are arginine and arginine derivatives. Arginine derivatives are defined as compounds having a guanidino group and a carboxylate group or an amidino group and a carboxylate, wherein the carboxylate group and guanidino group or amidino group and carboxylate group are removed from each other by at least one carbon atom, i.e., at least one of the following groups is between the guanidino or amidino group and the carboxylate group: —$CH_2$—, —CHR—, —CRR'—, wherein R and R' independently represent any chemical residues. Of course, the distance between the guanidino group and the carboxylate group or amidino group and the carboxylate group may also be more than one carbon atom, for example, due to the following groups —$(CH_2)_n$—, —$(CHR)_n$—, —$(CRR')_n$—, with n=2, 3, 4, 5, 6, 7, 8 or 9 as this is the case for example with amidino-propionic acid, amidino-butyric acid, guanidino-propionic acid or guanidino-butyric acid. Compounds with more than one guanidino and more than one carboxylate group are, for example, oligoarginine and polyarginine.

The following examples show preferred compounds having a guanidino or an amidino group and a carboxylate group.

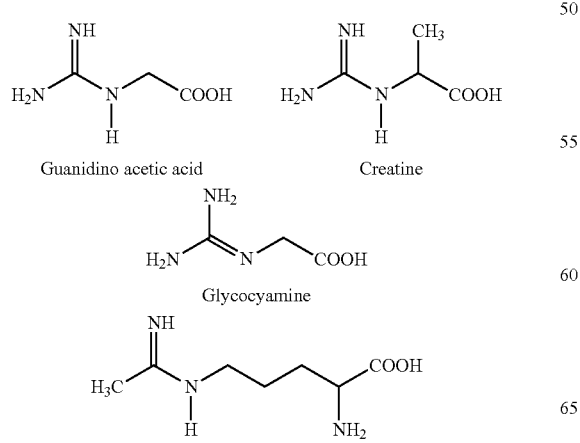

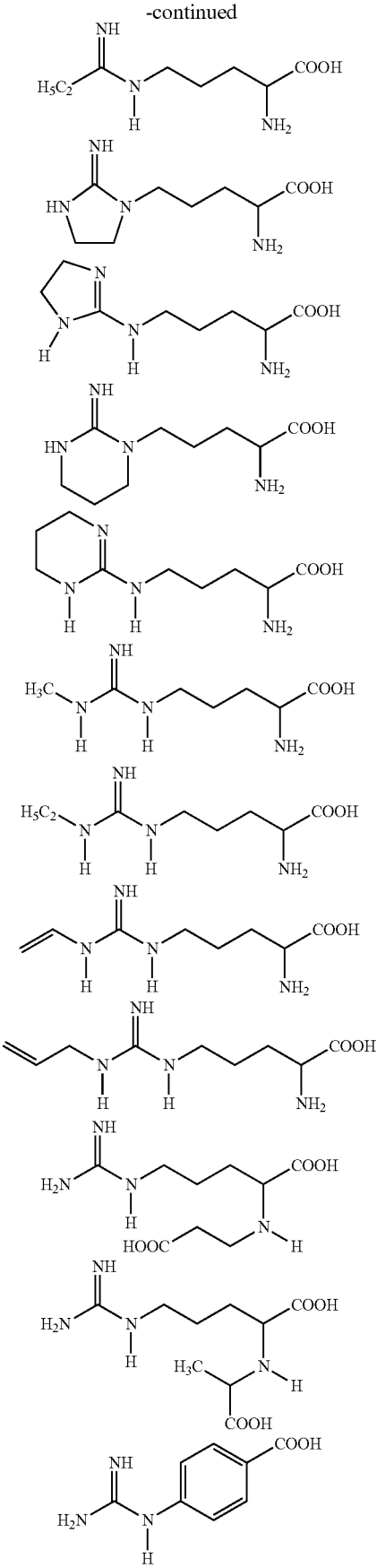

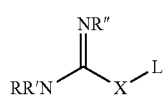

L-NIL

Preferred arginine derivatives are compounds with the following general formula (I) or (II)

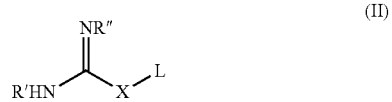
(I)

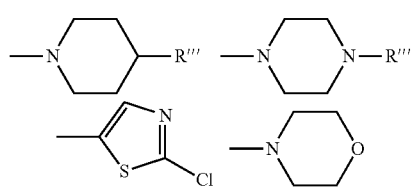
(II)

wherein
R', R", R''' and R'''' mean independently from each other:
—H, —OH, —CH=CH$_2$, —CH$_2$—CH=CH$_2$, —C(CH$_3$)=CH$_2$, —CH=CH—CH$_3$, —C$_2$H$_4$—CH=CH$_2$, —CH$_3$, —C$_2$H$_5$, —C$_3$H$_7$, —CH(CH$_3$)$_2$, —C$_4$H$_9$, —CH$_2$—CH(CH$_3$)$_2$, —CH(CH$_3$)—C$_2$H$_5$, —C(CH$_3$)$_3$, —C$_5$H$_{11}$, —CH(CH$_3$)—C$_3$H$_7$, —CH$_2$—CH(CH$_3$)—C$_2$H$_5$, —CH(CH$_3$)—CH(CH$_3$)$_2$, —C(CH$_3$)$_2$—C$_2$H$_5$, —CH$_2$—C(CH$_3$)$_3$, —CH(C$_2$H$_5$)$_2$, —C$_2$H$_4$—CH(CH$_3$)$_2$, —C$_6$H$_{13}$, —C$_7$H$_{15}$, cyclo-C$_3$H$_5$, cyclo-C$_4$H$_7$, cyclo-C$_5$H$_9$, cyclo-C$_6$H$_{11}$, —PO$_3$H$_2$, —PO$_3$H$^-$, —PO$_3^{2-}$, —NO$_2$, —C≡CH, —C≡C—CH$_3$, —CH$_2$—C≡CH, —C$_2$H$_4$—C≡CH, —CH$_2$—C≡C—CH$_3$, or
R' and R" together create one of the groups: —CH$_2$—CH$_2$—, —CO—CH$_2$—, —CH$_2$ CO—, —CH—CH—, —CO—CH—CH—, —CH—CH—CO—, —CO—CH$_2$—CH$_2$—, —CH$_2$—CH$_2$—CO—, —CH$_2$—CO—CH$_2$—or —CH$_2$—CH$_2$—CH$_2$—; X stands for —NH—, —NR''''—, —O—, —S—, —CH$_2$—, —C$_2$H$_4$—, —C$_3$H$_6$—, —C$_4$H$_6$— or —C$_5$H$_{10}$— or for one C1 to C5 carbon chains, which can be substituted by one or more residues: —F, —Cl, —OH, —OCH$_3$, —OC$_2$H$_5$, —NH$_2$, —NHCH$_3$, —NH(C$_2$H$_5$), —N(CH$_3$)$_2$, —N(C$_2$H$_5$)$_2$, —SH, —NO$_2$, —PO$_3$H$_2$, —PO$_3$H$^-$, —PO$_3^{2-}$, —CH$_3$, —C$_2$H$_5$, —CH=CH$_2$, —C≡CH, —COOH, —COOCH$_3$, —COOC$_2$H$_5$, —COCH$_3$, —COC$_2$H$_5$, —O—COCH$_3$, —O—COC$_2$H$_5$, —CN, —CF$_3$, —C$_2$F$_5$, —OCF$_3$, —OC$_2$F$_5$;

L represents a hydrophilic substituent, selected from a group consisting of:
—NH$_2$, —OH, —PO$_3$H$_2$, —PO$_3$H$^-$, —PO$_3^{2-}$, —OPO$_3$H$_2$, —OPO$_3$H$^-$, —OPO$_3^{2-}$, —COOH, —COO$^-$, —CO—NH$_2$, —NH$_3^+$, —NH—CO—NH$_2$, —N(CH$_3$)$_3^+$, —N(C$_2$H$_5$)$_3^+$, —N(C$_3$H$_7$)$_3^+$, —NH(CH$_3$)$_2^+$, —NH(C$_2$H$_5$)$_2^+$, —NH(C$_3$H$_7$)$_2^+$, —NHCH$_3$, —NHC$_2$H$_5$, —NHC$_3$H$_7$, —NH$_2$CH$_3^+$, —NH$_2$C$_2$H$_5^+$, —NH$_2$C$_3$H$_7^+$, —SO$_3$H, —SO$_2$NH$_2$, —CO—COOH, —O—CO—NH$_2$, —C(NH)—NH$_2$, —NH—C(NH)—NH$_2$, —NH—CS—NH$_2$, —NH—COOH,

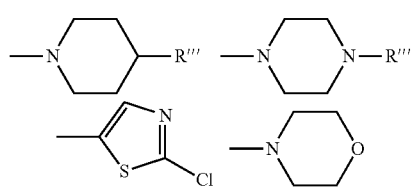

Mixing and Homogenizing

The terms homogenizing, dispersing, intensive mixing and intensive mixing process are essentially used herein synonymously and designate the homogenization of oil with an aqueous solution. For this purpose methods can be used that are known in the art. Nano-emulsions are prepared from solutions containing a compound having at least one amidino group or at least one guanidino group and carboxylic acids where they form aggregates that have sizes of <100 nm, preferably <50 nm, and more preferably <10 nm. These figures refer to the fact that 90% of the particles measured have a size that is less than the stated value. The size refers to the maximum diameter of the droplets or aggregates including bound water molecules, which can be determined, e.g. by laser spectroscopic analysis (DLS), in an aqueous phase containing these particles.

However, the droplet size increases by uptake of other organic compounds that do not correspond to a neutral fat or a nonpolar solvent and that are extracted into the aqueous phase with the nano-emulsified carboxylic acids by the process of homogenization. Therefore emulsions arise by homogenization of lipid phases that are mild to severely turbid, even when there are still very small amounts of impurities which are present in the lipid phase that are not a triglyceride or a nonpolar organic solvent. Quantification can be performed by known methods such as turbidimetry and a laser light scattering analysis (DLS).

The intensive mixing process of an aqueous phase and a lipid phase according to the invention has been accomplished when a homogeneous distribution of water droplets in the lipid phase is present, having an average diameter of the droplets between 0.01 and 20 µm, more preferably between 0.05 and 10 µm, and most preferably between 0.1 and 2 µm. The droplet sizes can be determined and monitored by established methods, which are also available for continuous process monitoring.

The present invention thus also relates to a method of reducing odorants and/or dyes from a lipid phase comprising the following steps:

a) determining the phosphorus content of the lipid phase, and testing for the presence of mucilages in the lipid phase, and b) performing a pre-purification step when the phosphorus content exceeds a predetermined value or the investigation for the presence of mucilage is positive, and c) adding an aqueous phase containing a compound having at least one amidino group or at least one guanidino group that have a partition coefficient ($K_{OW}$) between n-octanol and water of <6.3 to the lipid phase, and d) preparation of an intensive mixture of the lipid phase and the aqueous phase with a homogeneous distribution of the water droplets in the lipid phase and an average diameter of the droplets between 0.01 and 20 µm, and e) carrying out a centrifugal phase separation and removal of the aqueous phase containing the detached odorants and/or dyes.

The present invention further relates to a method of reducing odorants and/or dyes from a lipid phase comprising the following steps:

a) determining the phosphorus content of the lipid phase, testing for the presence of mucilages in the lipid phase by adding an alkaline solution having a pH between 8 and 13 in a volume ratio of 0.5:10 to 5:10 (basic solution to lipid phase) and mixing preferably by shaking with the lipid phase and performing phase separation by centrifugation; whereby the test is positive if an emulsion phase can be visually detected and has a volume fraction of >1.0 vol % referred to the volume of the mixture, and b) performing a pre-purification step if the phosphorus content exceeds a predetermined value or the investigation for the presence of mucilage is positive, and c) adding an aqueous phase containing a compound having at least one amidino group or at least one guanidino group that have a partition coefficient ($K_{OW}$) between n-octanol and water of <6.3 to the lipid phase, and d) preparation of an intensive mixture of the lipid phase and the aqueous phase with a homogeneous distribution of the water droplets in the lipid phase and an average diameter of the droplets between 0.01 and 20 µm, and e) carrying out a centrifugal phase separation and removal of the aqueous phase containing the detached odorants and/or dyes.

Preferably an aqueous solution of sodium hydrogen carbonate is used as the alkaline solution in step a).

Processes to perform homogenization are known to persons skilled in the art and described in the following.

In order to provide the nano-emulsifying refining process, it is necessary to bring highly hydrophilic compounds in a water phase together with hydrophobic compounds in a lipid phase in very narrow spatial contact. Furthermore, to realize the resource-saving effect of the invention of the nanoemulsifying refining process, it is also necessary to use only a very small volume of the water phase in relation to lipid phase to be purified.

These basic conditions already explain the advantageous use of an intensive mixing process of aqueous solutions of compounds containing at least one amidino group or at least one guanidino group with the lipid phases to be refined. According to the prior art such an intensive mixing procedure can be accomplished by various methods. The methods are based on the generation of interfaces between the phases to be mixed.

Since the liquids to be mixed have very contrasting characteristics (hydrophilic-hydrophobic), high local energy input is necessary to produce the largest possible boundary interfaces of the two liquids. According to the prior art, various techniques are available for this purpose: dynamic mixing methods based on laminar or turbulent flow of the mixed components or static methods in which local pressure/tension gradients are generated, leading to interface formation. From the literature it is known that the critical Weber number in laminar strain and shear flows and mixing flows depends from the viscosity ratio A between the disperse and continuous phase for individual droplets. Consequently in the usually highly viscous lipid phase mixing with a laminar flow is not suitable. For turbulent flows, the flow progress takes place intermittently, seemingly haphazardly, random and chaotic; thus, spatial and temporal resolution are not predictable. Building on the model of Kolmogorov, various models have been developed to simulate interactions at interfacial boundaries in turbulent flows at the individual drops and in general [N Vankova, Tcholakova S, Denkov N D, Vulchev V D, Danner T. emulsification in turbulent flow 2. Breakage rate constants. J Colloid Interface Sci. 2007 Sep. 15; 313 (2): 612-29]. The models differ mainly in the equipment and material systems, for which they were designed, and thus concern assumptions about the turbulent flow. The variation of the breaking up mechanism was achieved by the selective setting of different Reynolds numbers, viscosities of the phases, densities of the phases, or interfacial tension. Since the Kolmogorov model only allows sizes of droplets that cannot be broken up any more to be predicted, but not the size of drops at the start of break up, only the upper particle size can be calculated with this model.

Cavitations arise in liquids by the generation of bubbles, which then collapse again. In general, three kinds of cavitations can be distinguished: vapor cavitation (hard cavitation), gas cavitation (soft cavitation), and pseudo-cavitation. In hard cavitations, bubbles are created by lowering the static pressure below the vapor pressure, whereby the fluid partially evaporates and vapor bubbles are formed. Soft cavitations are created when the solubility of gases is lowered by decreasing the static pressure so that they form bubbles. If bubbles are already in a liquid, drop of pressure leads to growth of these bubbles, which is called pseudo-cavitation. Once the pressure rises above the vapor pressure, there is a sudden condensation of the liquid and therefore in extreme cases, bubbles collapse, which leads to high pressure variations. Which forces can result from the cavitation and the mechanism that leads to droplet breakup is still not definitively resolved.

Methods which are suitable for generation of interfaces between two fluids can be divided into four main groups: rotor-stator, high pressure, ultrasound, and membrane systems. The simplest variant of a rotor-stator system is the stirrer in a container. Further developments of the rotor-stator systems are toothed-wheel dispersers and colloid mills, which are characterized in that they allow application of defined shear forces. A disadvantage of rotor-stator systems is that the energy that is brought in often is highly inhomogeneous, resulting in wide droplet size distributions or long process times. Furthermore, only low specific energy inputs are often realized. High-pressure homogenizers are used in particular when very high specific energy inputs are required. Pressure homogenizers consist essentially of a high pressure pump and a crushing unit. As high pressure pumps, piston pumps that produce pressures of 50-10,000 bar are usually used. The crushing unit can consist of valves or diaphragms which are passed by the pressurized fluids. Tensions are generated between the fluids thereby which are responsible for drop formation or droplet deformation and break up. The resulting effects depend on the material properties of fluids (such as viscosities of the phases, interfacial structure, type of surface-active material) and the pressure drop and the geometry of the crushing device. Deformation and breakup are largely determined by the viscosity ratio A between the disperse and the continuous phase. Especially for higher viscosity ratios A, the stretching flow in the valve inlet is advantageous because the resulting tension stresses from turbulence and cavitation are more effective on the filaments and thus fine droplets can be produced with the lowest possible energy input.

In membranes and microstructured systems, mostly premixed fluid phases are used in which the droplets are broken up by passing through the pores, whereby an even closer droplet size distribution can be obtained than with high pressure homogenizers; however no high volume throughputs can be obtained at reasonable cost today.

Thus, in principle, different methods and procedures for an intensive mixing process are available. Surprisingly, a particularly good result of the nanoemulsifying refining was found for the very simple and robust rotor/stator systems. These were superior in the refining capacity over other systems. Therefore, a particularly preferred method by which the inventive mixing step of the refining of lipid phases can be carried out is the use of rotor-stator homogenization systems.

Methods for Testing an Intensive Mixing Process

The intensive mixing process of an aqueous phase with a lipid phase for the purpose of a nano-emulsifying refining as described herein leads, unless a complete extraction of mucilages has not been carried out, to formation of an emulsion. This is much more pronounced when alkaline aqueous medium is used as compared to an aqueous medium having a neutral or acidic pH range. The visual appearance of turbidity is caused by interfaces of the two phases or by corpuscular parts. The interfaces are due to the formation of droplets of the water phase in the lipid phase. Thus, theoretically the intensity of the turbidity allows assumptions to be made on the number of surface-forming structures and thus indirectly on the size of droplets per unit volume, which can be quantified by various optical measuring systems.

However, it is possible that amphiphilic molecules adhere onto the inner as well as the outer phase boundary, producing additional interfaces. Thus the frequency of interfaces in a volume unit can be assumed from a surrogate parameter that can be obtained by light beam diffraction, or reflection. Measurements of the turbidity of the reaction mixture have the advantage that they can be conducted continuously and immediately after a mixing process. Quantification of particle or droplet dimensions can be made by analyzing the reflection of a laser beam (DLS). The absolute dimensions of the main fractions of particles or droplets existing in a liquid can be determined therewith. An intensive mixing process of an aqueous phase with a lipid phase according to the invention has been achieved when a homogeneous distribution of water droplets that are present in the lipid phase is achieved where the average diameter of the droplets is in the range between 0.01 and 20 µm, more preferably between 0.05 and 10 µm and most preferably between 0.1 and 2 µm.

Production of Nano-Emulsions and Dosages

For the production of nano-emulsions that can be used for the inventive nano-emulsifying refining of lipid phases, compounds containing at least one amidino group or at least one guanidino are completely dissolved in a low-ion or ion-free water. Nano-emulsification can be accomplished with a liquid or liquefied form of carboxylic acids, as disclosed herein. In this case, the molar ratio between the solubilizing compounds containing at least one amidino group or at least one guanidino and one or all carboxylic acid(s) can be between 1:1 and 1:0.0001, more preferred between 1:0.9 and 1:0.001, more preferably between 1:0.85 and 1:0.01, and most preferably between 1:0.7 and 1:0.1. The decisive factor is the solubility of the two compounds. Due to the large number of possible combinations it therefore may be necessary to select a lower concentration of the carboxylic acid in order to ensure that a nano-emulsion is obtained as defined herein. A nano-emulsion is present when a clear liquid that remains thermodynamically stable for months is obtained. Physically, such a nano-emulsion is characterized by droplet or particle sizes <100 nm, preferably <50 nm, particularly preferably <10 nm, and in particular <3 nm. This can be documented by means of dynamic laser beam spectroscopy (dynamic light scattering). The hydrodynamic diameters of the particles are measured, to which the above figures relate to.

Nano-emulsions can be prepared by addition of carboxylic acids to an aqueous solution with dissolved compounds containing at least one amidino group or at least one guanidino group by mixing. Initially an increase in viscosity occurs and possibly there is formation of solids. This is completely reversible by heating the solution with continuous stirring of up to 24 hours.

The concentration of compounds containing at least one amidino group or at least one guanidino group and the aqueous nano-emulsion can be selected freely depending on the application, provided that the solubility product is not exceeded. For arginine this is at a concentration of about 0.6 molar.

The concentration of carboxylic acid(s) or a carboxylic acid mixture to be dissolved depends on the ability to dissolve them, of compounds containing at least one amidino group or at least one guanidino group. Even though the concentration is mainly determined by the process conditions and is determined by the individual solubility of compounds containing at least one amidino group or at least one guanidino group, a concentration range between 0.001 and 0.8 molar is preferred, more preferred between 0.01 to 0.6 molar and most preferred between 0.1 and 0.5 molar.

The application of the inventive nano-emulsions can be manual or automated. This can be done by drips or a beam of the aqueous medium that is admixed as further described by stirring or a turbulent mixing modality by means of a homogenizer. The nano-emulsions can be added to the lipid phase to be refined in step b2) in an arbitrary amount ratio depending on the application. Thus, in principle a proportion of a nano-emulsion to the lipid phase can be between 0.5:1 and 100:1. More preferred is a proportion between 0.6:1 and 10:1, more preferred 0.8:1 and 5:1. However, low dosages are preferable for an economic use, which can be in a range between 0.49:1 and 0.0001:1, more preferably between 0.2:1 and 0.001:1 and most preferably between 0.1:1 and 0.01:1.

To prepare nano-emulsions according to the invention, carboxylic acids that are already present in the lipid phase can also be used. Complete nano-emulsification of all carboxylic acids present in a lipid phase is a particularly preferred embodiment for the preparation of the nanoemulsifying refining process of the invention. The aforementioned concentrations, volumes, and volume ratios are applicable in an identical fashion. It is preferred to determine the concentration of existing and quantifiable carboxylic acids in the initial lipid phase in order to set the parameters for the desired nano-emulsion. These can be determined with established methods such as the determination of the acid number or by gas chromatography. If the concentration is not known, the aqueous solution containing compounds having at least one amidino group or at least one guanidino group can be metered and admixed with the techniques previously mentioned until the lipid phase has a liquid consistency. Under liquid lipid phase it is meant herein, when the viscosity of the obtained reaction mixture is preferably 1 to $2\times10^4$ Pa s, is more preferably between 1.2 to $1\times10^4$ Pa s, and most preferably between 1.3 to $5\times10^3$ Pa s.

A further preferred embodiment of the nano-emulsifying refining is to provide nano-emulsions with suitable compounds containing at least one amidino group or at least one guanidino group and carboxylic acid, in which there is a sufficient excess of dissolved compounds containing at least one amidino group or at least one guanidino group in the lipid phase, that remains ready to dissolve and bind soluble carboxylic acids that are admixed in order to nano-emulsify them.

For the production, it may be necessary to increase the temperature of the water phase containing compounds having at least one amidino group or at least one guanidino group and/or increase the temperature of the dissolved or to be dissolved carboxylic acids. This allows acceleration of the preparation of a nano-emulsion according to the invention and also decreases the viscosity of the resulting nano-emulsion. Provided that the nano-emulsion is produced only by the intensive mixing process into the lipid phase, it may be necessary to heat the lipid phase. For the preparation of the nano-emulsions of the invention, a temperature range between 15 and 60° C. is preferred, more preferred is a range between 20 and 50° C., and most preferably between 25 and 40° C.

A further important adjustment parameter is the viscosity of nano-emulsions that are produced separately, i.e., in the form of an aqueous solution with compounds containing at least one amidino group or at least one guanidino group, as disclosed herein, with herein nano-emulsified carboxylic acids that have been added to this solution or nano-emulsions that have been obtained within the lipid phase by an intensive mixing procedure of aqueous solution containing compounds having at least one amidino group or at least one guanidino group with a lipid phase. In principle, there is an increase in viscosity with attainment of an equimolar ratio between the number of acid groups and guanidino and/or amidino groups as a function of their absolute concentrations. The resulting viscosity has to be determined specifically for the components used. For the inventive nano-emulsifying refining, it is advantageous when the resulting nano-emulsion or emulsion liquid, that means is readily flowable. This property can be determined by appropriate methods, such as a falling ball viscometer. The preferred viscosity is between 1 and $5\times10^3$ Pa s, more preferably between 1 and $1\times10^3$ Pa s, and most preferably between 1 and $1\times10^2$ Pa s.

Provided that the lipid phase already has a higher viscosity, the viscosity of the nano-emulsifying reaction mixture to be produced can be adjusted by a larger volume of the solubilizing aqueous solution containing compounds having at least one amidino group or at least one guanidino group or a lower concentration of compounds containing at least one amidino group or at least one guanidino group which are contained herein.

Preferred compounds for the preparation of the nano-emulsions of the invention are in the guanidino or amidino group containing compounds arginine and arginine derivatives as described herein. For the preparation of nano-emulsions the carboxylic acids, the oleic acid, and stearic acid are the preferred as to be nano-emulsified carboxylic acids in the lipid phase. In artificially produced nano-emulsions, preferred carboxylic acids which are used for the inventive nano-emulsifying refining are phytic acid and the sinapinic acid.

The value of the self-adjusting pH of the aqueous solution during formation of a nano-emulsion depends on the pK value of the individually dissolved compounds therein. Self-adjustment of the pH by the nano-emulsified with compounds containing at least one amidino group or at least one guanidino group and carboxylic acids is a particularly preferred embodiment. However depending on the application, it may be advantageous to adjust the pH to a specific value, in particular to obtain advantageous effects, e.g., on the lipid phase to be refined. A skilled person in the art knows buffer systems (e.g., Tris buffer, citrate buffer) or individual pH-active compounds (e.g. ascorbic acid or NaOH) as well as how to adjust the pH and how to add them. The resulting pH can be determined accurately by established methods such as pH monitoring.

The term "reaction mixture" herein means a lipid phase and an aqueous solution containing compounds having at least one amidino group or at least one guanidino group or a nano-emulsion made with an aqueous solution containing compounds having at least one amidino group or at least one guanidino group and one or more carboxylic acid(s) that are mixed by means of an intensive mixing process.

Nano-Emulsifying Refining

The nano-emulsifying refining process is based on the provision of a nano-emulsion and/or the preparation of a nano-emulsion in a lipid phase, in that the provided nano-emulsion is admixed to the lipid phase and/or a nano-emulsion is prepared in the lipid phase by an intensive mixing process. The nano-emulsifying refining process can be achieved by an intensive mixing process of the phases after addition of a nano-emulsion and/or preparation of a nano-emulsion in the lipid phase according to the invention.

A nano-emulsifying refining can be achieved by solutions with compounds containing at least one amidino group or at least one guanidino group according to the invention and carboxylic acids which are brought into contact, whereby electrostatic bonds between guanidino and/or amidino groups are formed with the carboxylic acid groups, thereby generating nanoparticles (<2 nm). This can be accomplished by preparation of a nano-emulsion as described above, or by formation of a nano-emulsion within in a lipid phase containing free carboxylic acids, by admixture of an aqueous solution containing compounds having at least one amidino group or at least one guanidino group. The nano-emulsifying refining is achieved then by mixing of nano-particles having a water shell with the lipid phase. The nano-emulsifying effect on the discharge of mucilages is enhanced when the mixing is performed with an intensive mixer or an intensive mixing process.

Separation Methods

The term "centrifugal phase separation" as used herein refers to a separation of phases by utilizing centrifugal forces. It includes in particular methods that are known in the art using centrifuges, decanters and preferably separators.

Since the reaction mixture in principle consists of liquid phases that have different densities, phase separation by sedimentation is possible in principle. However, practice shows that the solubilized organic compounds do not detach spontaneously for the most part; thus, to enhance efficiency and speed of the separation increased tensile and compressive forces can be applied. This is easily possible according to prior art by means of a simple centrifuge or of a suitable separator. Also applying pressure or vacuum is possible. In separators tensile and centrifugal forces are built up by plates or discs that rotate with the same or a different rotational speed. The advantage in the use of separators is that a continuous phase separation can be performed. Therefore, a particularly preferred embodiment for the phase separation of the reaction mixture is to carry out phase separation with a phase separator.

For the preferred phase separation by a separator, systems are preferred that allow a throughput volume of preferably >3 m$^3$/h, more preferably >100 m$^3$/h, and most preferably >400m$^3$/h.

Phase separation of lipid phases obtained from a nano-emulsifying refining process according to the invention can in principle performed immediately after finishing the intensive mixing process. On the other hand, if required by the process flow, the nano-emulsified reaction mixture to be separated can be stored first in a tank. The duration of storage depends only on the chemical stability of the compounds present in the nano-emulsified reaction mixture and the process conditions. Preferably, phase separation is performed immediately after the intensive mixing procedure.

The temperature of nano-emulsified reaction mixture to be separated can in principle be the same as that selected for production of the same. However, it may also be advantageous to vary the temperature and to select a higher temperature when, e.g., the efficacy of the separation tool is thereby increased, or a lower temperature, e.g., to increase the extraction efficiency of the emulsions. In general, a temperature range between 15 and 50° C. is preferred, more preferably from 18 to 40° C. and most preferably between 25 and 35° C.

The residence time in a phase separator or a centrifuge is essentially determined by the apparatus-specific properties. Generally, for an economic embodiment the lowest possible residence time in a separation device is preferred, such a preferred residence time in a phase separator is <10 minutes, more preferably <5 minutes, and most preferably <2 minutes. For centrifuges a preferred residence time is <15 minutes, more preferably <10 minutes, and most preferably <8 minutes.

The selection of the centrifugal force depends on the density difference of the two phases to be separated and can be determined individually. Preferably, acceleration forces between 1,000 and 15,000×g, more preferably between 2,000 and 12,000×g, and most preferably between 3,000 and 10,000×g.

Preferably, a separation into an oil and a water phase is obtained, where the oil and the water phases are a pure oil or water phase by >90 vol %, more preferably by >97 vol % and most preferably by >99 vol %.

Test Methods for Verification of Product Quality

By nano-emulsifying refining, lipid phases are obtained in which only minimal amounts of phosphorus-containing compounds and inorganic substances such as calcium, magnesium, potassium, sodium, iron, nickel, sulfur are present. The concentrations can be by determined by established procedures, such as mass spectroscopy (for example ICP-OES). The content of free acid groups is significantly reduced, which can be determined potentiometrically by titration of a methanolic solution of KOH. Further, the content of dyes such as chlorophylls, pheophorbides, pyropheophytines, chlorins, rhodines, purpurins, carotenes, luteins is reduced. The concentrations or the content, respectively, can be quantified spectroscopically or in a more practical way by determination of the color composition and color intensity according to the AOCS method Lovibond. The advantage of the latter method is that all compounds that contribute to the coloring as well as their interference, which can result in disadvantageous colors, can be recognized immediately. Further, this method is very suitable to detect a color reversion occurring during further course. The content of the odorants and flavors can be quantified by extractive methods with subsequent gas chromatographic analytical technics for compounds such as benzo-a-pyrene, octane, hexanoate, ethyl octanoate, acetic acid-3-methyl-1-butyl ester, palmitinic acid ethylester, dienoic acid ethyl ester, or 2,4-dodecadienal. The preparative effort for this is very high and the importance for the sensory effect is usually unclear because the thresholds of perception are very different and only due to a combination of compounds, which cause a sensory perception, is a specific sensation realized. Therefore, a test for the presence of characteristic or undesired odorants and flavors by expert tasting is the standard method for evaluation of edible oils and fats. The content of antioxidants may be of great importance for the color and the smell and taste quality of a lipid phase. This concerns in particular changes that can occur during storage. Therefore, the determined content of polyphenols, squalene, tocopherols, as well as of dyes and their degradation products are important for evaluation of product quality. Suitable measuring methods are e.g. thin layer chromatography, but also quantitative determinations with HPLC techniques. Quality determinants of a gentle product refining are a low level of carboxylic acid residues of triglycerides having a trans position of a double bond, which can be detected by gas chromatography. In addition, absence of thermal reaction or decomposition products have to be determined, such as 3-MCDP-esther which can be documented by HPLC-MS. Furthermore, the effective reduction of the viscosity of a lipid phase due to a more effective depletion of mucilage is a characteristic quality thereof. This can be quantified by viscometric measurement methods. The improvement of product quality can also concern improvement of its long-term stability. This can be determined by various key characteristics. Thus, there may be a change in color and/or smell or taste characteristics, and occurrence of off-flavors, disturbing odorants or disadvantageous dyes. This can be detected with the analytical methods described herein. Furthermore, because depletion of organic compounds having anti-oxidative can deteriorate product quality, the above-mentioned methods can be applied for detecting the active antioxidant compounds. Oxidative processes can modify dyes and mucilages as well as carbon residuals of triglycerides that are still present in residual contents.

Primary oxidation products, e.g., epoxy compounds, however, decompose rapidly to so-called secondary oxidation products. These often lead to sensory perceptions that are called off-flavors; therefore, detection of such oxidation products for documentation of storage stability is particularly suitable. Para-(p)-anisidine reacts with secondary oxidation products such as aldehydes and ketones, which are present in a lipid phase. The reaction product can be detected and quantified spectrophotometrically (absorbance at 350 nm). In particular, unsaturated aldehydes, which are often responsible for off-odors in oils are recognized by the p-anisidine reaction. The p-anisidine value is closely correlated with the peroxide value that can be measured in a lipid phase; therefore the presence of peroxides can be estimated with the p-anisidine test method. The peroxide value provides the number of primary oxidation products of a lipid phase and indicates the amount of milliequivalents of oxygen per kilogram of oil.

Plant Color Pigments and Dyes

The term "dyes" summaries all organic compounds typically found in oils and fats of biogenic origin that are chromophoric, simultaneously present in varying quantities and compositions.

The term "vegetable dyes" as used herein summarizes all color-providing compounds also referred to color pigments that exist in lipid phases. The by far most dominant dye occurring in the largest quantity in vegetable oils is the group of chlorophylls and their degradation products, such pheophyline, pheophytine, chlorophyllides, pheophorbides, pyropheophytin, rhodins, and purpurins. However, compounds, which are summarized under the group of carotenes or carotenoids, also occur. However, other classes of compounds can also be present, such as flavonoids, curcumines, anthrocyanes, betaines, lignins, xanthophylls, which derive from carotenes and luteins, lignins, indigo, kaempferol and xantophyllienes, such as neoxanthin or zeaxanthin, or reaction products such as melanoidins. These dyes may be present in the lipid phase in different proportions. These dyes have differing solubilities in water or in organic solvents. With the use of a nano-emulsifying refining procedure according to the invention the separation of lipophilic compounds into an aqueous nano-emulsion is made possible, whereby compounds that are not soluble otherwise in water are transferred into an aqueous phase and can also be removed from this. It is therefore an object of the inventive refining process to transfer dyes that are virtually insoluble in water into a water phase and hereby to separate them in an unaltered from.

The most common representative of plant dyes are chlorophylls. In vegetable oils chlorophylls are typically encountered in quantities which amount to between 10 and 100 ppm (or 10.0 mg/kg). Lipid phases having a high content of chlorophylls are especially canola and rapeseed oils.

Chlorophylls

The term "Chlorophylls" as used herein summarizes compounds, which consist of a derivatized porphyrin and are divided in the subgroups a, b, c1, c2 according to their organic residues. Furthermore, they differ in the number of double bonds between carbon atoms 17 and 18.

Chlorophylls are the dyes that have the highest prevalence in vegetable oils. Due to their hydrophobicity or lipophilicity they dissolve well in lipid phases, especially in triglyceride mixtures. They contribute a green color of the lipid phase, and further they lead to the introduction of magnesium or copper ions which decreases the oxidation stability of the lipid phase. Therefore, their removal from a lipid phase may be desired, particularly when an edible oil is concerned. The variation in the absolute quantities that can be found in lipid phases and in particular in vegetable oils is very large, ranging from 0.001 to 1,000 ppm (or 0.001 to 1000 mg/kg).

Chlorophylls that are not degraded are virtually insoluble in water. Therefore, aqueous refining processes are also not suitable to extract these dyes from a lipid phase. By the inventive nano-emulsifying aqueous refining process, depletion of the content of chlorophyll compounds that are not degraded can be achieved preferably between 50 and 100 wt %, more preferably a reduction of between 60 and 90 wt % and most preferably between 75 and 85 wt % based on the mass originally present in a lipid phase. Since determination of the absolute concentrations can be obtained only by a high analytical effort, it is practicable to determine the content of dyes by a spectrometric determination of the color content of a lipid phase. An established method for this is the determination of the color spectrum of oil, i.e., the Lovibond method in which intensity levels of yellow and red tones are compared with reference values. The intensity of a blue hue, which is responsible for a green color in the presence of a yellow color, is only very low. Therefore, the considerably more intense yellow color spectrum is used for determination of the content of chlorophylls. Hereby assessment of oil color in general or a comparison to reference products can be done, as well as a determination of a change of the color spectrum during the course of storage. With the nano-emulsifying refining process, a reduction of the Lovibond intensity in the yellow color range of preferably at least 50%, more preferably at least 70%, and most preferably from at least 90% as compared to the baseline measurement is possible.

Furthermore, a reduction of Lovibond intensity for the red spectrum is achieved by at least 50%, more preferably by at least 70%, and most preferably by at least 90% as compared to baseline intensities.

By the use of the nano-emulsifying refining process with the inventive aqueous emulsions it is further possible to obtain chlorophyll molecules which are not chemically modified to a large extent. Therefore, the inventive aqueous nano-emulsifying refining procedure is also directed to the separation of an aqueous solution/emulsion having a high content of chlorophylls.

The light absorption in specific wavelength ranges by chlorophylls depends on the presence of magnesium or copper ions. These are bound only electrostatically and can be detached and dissolved in an aqueous medium by a weak acid; thereby the ability for light adsorption of chlorophylls is greatly reduced, and therefore, lipid phases containing chlorophylls that were exposed to an acid treatment become yellowish. However, the derivative compounds that no longer provide color also remain largely in the oil and can in the long-term promote oxidative reactions and contribute to complexation of other alkaline earth metal ions and metal ions. Therefore, complete removal of these compounds is desirable.

By the use of the inventive nano-emulsifying refining process, a reduction in the chlorophyll content is preferred that is at least 50%, more preferably at least 70%, and most preferably at least 90% as compared to baseline (in crude oil). Here the concentrations of chlorophylls (a+b) of preferably <0.1 mg/kg, more preferably <0.01 mg/kg, and most preferably <0.001 mg/kg can be achieved.

On the other hand, the green to blue-green vegetable dyes are valuable materials that can be used otherwise. Further use of dyes can be achieved by the separation of these compounds provided by the inventive method.

Herbal Odorants and Flavorings

In virtually all organic mixtures of biogenic origin, organic compounds are present which lead to sensory perception of the senses of taste or smell. Organic compounds that are capable to induce such a perception are extremely heterogeneous. Alone in the group of strictly hydrophobic compounds that are found in the various lipid phases, the structural composition of the carbon-based compounds is not uniform. Some typical classes of compounds are alkaloids, alcohols, aldehydes, amino acids, aromatic hydrocarbons, esters, lactones, cyclic ethers, furans, furanoids, free fatty acids, flavonols, glycosides, ketones, saturated and unsaturated hydrocarbons, enamine ketones, ketopiperazine, isoprenoids, mono-terpenes, terpenes, cyclic terpenes, triterpenes triterpenoids, tetraterpenes, sesquiterpenes, sequiterpenoide, sterols, phytosterols, steradienes, purine derivatives, phenylpropanoids, phenols, nitrites, alkenyl isothiocyanates, glucosinolates and/or hydroxycinnamic acid derivatives. These classes of compounds may both separately and in any composition be present in a raw lipid phase originating from a biogenic raw material. It is in particular 1,5-octadiene-3-ol, butanal, hexanal, octanal, nonenal, nonadineal, decanal, dodecanal, piperonal, cysteine, cystine, methionine, phenanthrene, anthracene, pyrene, benzopyrene, 4-hydroxybutanoic acid, hexanoate, coumarin, maltol, diacetylfuran, pentylfurane, perillene, rosenfuran, caprylic acid, hydroxy, amygdalin, progoitrin, 2-heptanone, 2-nonanone, decatrienal, 1-octene-3-one, vinylamylketone, 4-(4-hydroxyphenyl)butane-2-one), mycosporine, diketopiperazine, humulone and lupulones (bitter acids), monoterpenes: myrcene, ocimene and cosmen, linalool, myrcenol, ipsdienol, neral; citronellol and geranial, citronellal, mycrene, limonene, linalool, nerol, geraniol, terpinolene, terpinene and p-cymene, carvone and carvenon, thymol, 2-pinene, α and β pinene, limonene, phellandrene, menthane, camphor; Fenchon, Xanthophylline, bisabolanes, germacrane, elemanes and humulane, farnesene, rotundon, sterols, phytosterols, p-cresol, guaiacol, ferulic acid, lignin, sinapine, catechins, eugenol, vanillin, 3-butenyl isothiocyanat, 4-petenylisothocyanate, 4-pentenenitrile, 5-hexenitril, camphene, dodecane, cinnamyl alcohol, fenchyl alcohol, 1R,2S,5R-isopulegol, 2-ethylfenchol, menthol, 4-hydroxy-3,5-dimethoxybenzyl alcohol, (R)-(−)-lavandulol, piperonyl alcohol, thujylalkohol, 1,8-cineole, 4-ethylguajacol, N-[[(1R,2S,5R)-5-methyl-2-(1-methylethyl)cyclohexyl]carbonyl]-glycinethylester, (1R, 2S, 5R)-N-cyclopropyl-5-methyl-2-isopropylcyclo-hexanecarboxamid, L-alanine, aspartic acid, 2,4-dimethylthiazole, lenthionin, (+) -cedrol, 3-methyl phenol, anisole, 1-methoxy-4-propylbenzene, 4-allyl-2,6-dimethoxyphenol, 2,6-dimethoxy-4-vinylphenol, ethyl-4-hydroxy-3-methoxybenzyl ether, vetiverol, 2-butyl ethyl ether, ethylgeranylether, carvacrol, 2-methyl propanal, cinnamic aldehyde, p-tolualdehyde, 2-methyl butyraldehyde, salicylaldehyde, acetic acid, lactic acid, 3-methyl butyric acid, hexanoic acid, 1-malic acid, benzo-a-pyrene and/or anethole. These compounds may occur both separately and in any composition in a raw lipid phase originating from a biogenic raw material.

An identification of individual compounds that often are present only in trace amounts, which may be <0.001 ppm, demand great analytical effort. Although they are present in low concentrations, they can lead to a significant deterioration of the product quality and therefore extractive depletion is required. For commercial use of oils and fats in the food industry, a tasting is performed by a committee of trained persons according to the guidelines of the German Food Society in order to evaluate the sensory quality of crude or refined oils. Since chemical analytical methods for the assessment of the reduction or removal of odors and flavors are not used so far, qualitative assessment of the oils obtained from refining processes as discloses herein were carried out by sensory evaluations according to the usual criteria. However, identification of individual organic compounds can achieved by extractive methods combined with analytical methods like gas chromatography; therefore a change in the content of specific and known smell and flavor component can be quantified using such a method.

Sensory Evaluation of Lipid Phases:

Sensory evaluation of the lipid phase was carried out according to the guidelines of the German Food Society for tasting or food use in accordance with the test specifications "DLG, 6th edition 2012". The DLG method of sensory analysis is a "Descriptive sensory evaluation with integrated evaluation" and refers, inter alia, methodologically to DIN 10964, "Simple descriptive test", the DIN 10975 "expert opinion" and DIN 10969 "Descriptive analysis with subsequent quality assessment". The tasting of the lipid phase was carried out by at least 4 trained competent persons. The oils and fats have been (25° C., in an opaque covered glass with the same temperature) pairs (crude and refined oil) assessed by each examiner three times by a fixed evaluation scheme under the same conditions.

The following parameters were assessed in all tastings and the intensity present of a distinct characteristic was classified according on a scale of 0-10 (0=absent, 10=very intense). The median results of all ratings was calculated and published as a result herein, unless otherwise stated.

The following flavor attributes were defined as a characteristic for the studied vegetable oils: nutty, seed-like, fruity, The following flavor attributes were rated as off-taste: rancid, spicy, stale, soapy, bean-like, fishy, musty, pungent, astringent, bitter, sweet, sour, as well as fishy and chemical, in particular lipid phases (e.g., animal fats).

The following odor attributes were defined as a characteristic of the studied vegetable oils: nutty, seed-like, fruity.

The following odor attributes were rated as unpleasant smells: rancid, spicy, stale, fishy, musty, pungent, chemical, plant smell, floral, further fishy and chemical, in particular lipid phases (e.g., animal fats).

Mucilages

The term "mucilage" as used here summarizes all biogenic organic compounds that have water-binding properties and therefore bind or can bind water molecules when water is admixed, thereby forming an emulsion. It is not meant that the mucilages are removed and can be separated through admixture of water to a lipid phase in which they are present. Rather, they bind water and form an emulsion. In appropriate conditions, as described herein (e.g., by treatment with an acid or an alkaline solution), mucilages can however also be transferred into a water phase. Examples of organic compounds that were understood as mucilages herein are:

"Phospholipids" which are amphiphilic lipids which contain a phosphate group and either are phosphoglycerides or phosphosphingolipids. Further acidic glycoglycerolipids, such as sulfoquinovosyldiacylglycerin or sulfoquinovosyldiacylglycerin. "Phosphoglycerides" (also referred to as glycerophospholipids or phosphoglycerolipids) consist of a diacylglyceride, the remainder of terminal hydroxy group is attached to a phosphate residue, which is not further modified either (phosphatidic) or is esterified with an alcohol. The most common representatives of the latter group are phosphatidylcholine (also called lecithin), phosphatidylethanolamines and phosphatidylserine.

The term "glycolipid" as used herein, comprises compounds, in which one or more monosaccharide residue(s) is/are connected via a glycosidic bond with a hydrophobic acyl group.

"Glycophosphatidylinositoles" are compounds in which saccharides are glycosidically linked to the inositol group of phosphatidylinositols.

To perform the inventive nanoemulsifying refining process, as already described above, a lipid phase must be provided, wherein the total phosphorus content present is less than or equal to 15 mg/kg. At the same time formation of a macroscopically visible emulsion layer that has a volume fraction of >1.0% has to be ruled out by an test for the presence of mucilages as described herein. In addition, the content of (carboxyl) acid groups that can be neutralized preferably is <15% and >0.2%, more preferably <8% and >0.2%, most preferably <1.5% and >0.2%.

Thus, a further embodiment of the invention provides a method, comprising the steps of:

a) determining the phosphorus content of the lipid phase, testing the presence of mucilages in the lipid phase and determining the content of fatty acids, and b) performing a pre-purification step if the phosphorus content exceeds a predetermined value, or the investigation for the presence of mucilage is positive, or adding a carboxylic acid if the fatty acid content is below a predetermined value, and c) adding an aqueous phase with compounds containing at least one amidino group or at least one guanidino group that have a partition coefficient ($K_{OW}$) between n-octanol and water of <6.3 to the lipid phase, and d) preparing a mixture of the lipid phase and the aqueous phase, and e) carrying out a centrifugal phase separation and removal of the aqueous phase containing the detached odorants and/or flavorings and/or dyes.

If the concentration of free fatty acids is below the determined limit, one or more carboxylic acid(s) can be added as described in step b).

Alternatively, at first the aqueous solution containing compounds having at least one amidino group or at least one guanidino group is mixed with a fatty acid, and then the resulting nano-emulsion is added to the lipid phase.

Furthermore, the invention relates to a method comprising the steps of:

a) determining the phosphorus content of the lipid phase, testing for the presence of mucilages in the lipid phase, and determining the content of fatty acids, and b) performing a pre-purification step if the phosphorus content exceeds a predetermined value or the investigation for the presence of mucilage is positive, and b1 determining the content of free fatty acids, and, if the content of free fatty acids is below or equal to 0.2 wt %, implementation of the optional process step b2)

b2) adding one or more carboxylic acid(s) to the lipid phase and mixing the phases, and c) adding an aqueous phase with compounds containing at least one amidino group or at least one guanidino group that have a partition coefficient ($K_{OW}$) between n-octanol and water of <6.3 to the lipid phase, and d) preparing a mixture of the lipid phase and the aqueous phase, and e) carrying out a centrifugal phase separation and removal of the aqueous phase containing the detached odorants and/or flavorings and/or dyes.

In one embodiment of the invention, the carboxylic acid that is added in step b) or c) is preferably a fatty acid, and most preferably oleic acid.

In one embodiment, the predetermined value for the content of free fatty acids in step a) is 0.2 wt %. Nevertheless it has been shown that even when there is a lower amount of free fatty acids very good refining results can be obtained without the addition of a carboxylic acid; on the other hand, the refining efficiency can also be further increased by the addition of carboxylic acids.

According to the inventive methods as described herein, dyes, odorants, mucilage, metal ions, including alkaline earth metal ions, and/or free fatty acids can be separated from the lipid phases.

Another decisive advantage of the separation of the dyes that can be obtained with the inventive method is that the nano-emulsified organic compounds can be separated off in a structurally and chemically unmodified form and thus are available for further use. Also other separated organic compounds, such as e.g. phenols or sterol compounds, are present in the aqueous phases in a non-complexed form, so it is conceivable that these compounds may be recoverable by a separation technique which is accomplished by centrifugal phase separation of the water phase, from where they can be recovered for further use.

Thus, the invention also relates to separated odorant, flavor and dye phases obtainable or obtained by any of the methods disclosed herein.

The invention also relates to a process for reduction of odorants or dyes from a lipid phase comprising the steps of:

a) determining the phosphorus content of the lipid phase, testing for the presence of mucilages in the lipid phase, and b) performing of one or more pre-purification step(s) if the phosphorus content exceeds a predetermined value or the investigation for the presence of mucilage is positive, and c) adding an aqueous phase with compounds containing at least one amidino group or at least one guanidino group that have a partition coefficient ($K_{OW}$) between n-octanol and water of <6.3 to the lipid phase, and d) preparing a mixture of the lipid phase and the aqueous phase, and e) carrying out a centrifugal phase separation and removal of the aqueous phase containing the detached odorants and/or dyes.

The invention also relates to a process for the reduction of odor, flavor and/or coloring of a lipid phase comprising the steps of:

a) determining the phosphorus content of the lipid phase, testing the presence of mucilages in the lipid phase, and b) performing one or more pre-purification step(s) if and as long as the phosphorus content exceeds the value of 15 mg/kg and/or testing for the presence of mucilage is positive, and c) adding an aqueous phase with compounds containing at least one amidino group or at least one guanidino group that have a partition coefficient ($K_{OW}$) between n-octanol and water of <6.3 to the lipid phase, and d) preparing a mixture of the lipid phase and the aqueous phase, and e) carrying out a centrifugal phase separation and removal of the aqueous phase containing the detached odorants and/or flavorings and/or dyes.

FIGURE DESCRIPTION

FIG. 1: Shown are the results of an investigation for the presence of mucilages in camellia oil, raw and after refining procedures. The test was performed as in Example 1

1.) Crude oil with a content of phosphorus of 64 ppm and of free fatty acid of 1.2 wt %; after centrifugation there is a semi-solid mucilage phase which has a volume fraction of 10 vol %.

1.a) Sample of 1) after decantation of the oil phase.

2.) Sample after aqueous pre-purification step by means of citric acid; the content of phospholipids was 15 ppm and that of free fatty acid 1.0 wt %. After performance of the investigation for the presence of mucilages a semisolid mass with a volume fraction of 3.2 vol % is observable (test for the presence of mucilages positive).

3.) Sample after an additional aqueous pre-purification step by means of a sodium carbonate solution; the phosphorus content was 8 ppm and that of free fatty acids 0.45 wt %. The investigation for the presence of mucilages exhibits a thin mucilage layer that has a volume fraction of 0.9 vol % (test for the presence of mucilages negative).

EXAMPLES

Measurement Methods

The following test methods were used in the embodiments as described below:

The content of phosphorus, calcium, magnesium, and iron in lipid phases was determined by ICP OES (iCAP 7400, Thermo-Fisher, Scientific, Germany). Values are given in ppm (or mg/kg).

The content of free fatty acids in a lipid phase was determined by means of a methanolic KOH titration with a TitroLine 7000 titrator (SI Analytics, Germany). Values are given in weight% (g/100 g).

Determination of chlorophyll concentrations in oil samples was performed, unless otherwise stated, from samples poured in 10 mm cuvettes without further dilution with a UV-visible spectrometer (UV-1601, Shimadzu, Japan) at 630, 670, and 710 nm. The calculation of the total amount of chlorophylls was performed according to the AOCS method Cc formula of 13e-92.

Quantification of turbidity (turbidimetry) of oil phases or reaction mixtures was performed using a scattered light detector, wherein the re-entry of a scattered beam at an angle of 90° is determined by a measuring probe, which was immersed in a sample volume of 10 ml (InPro 8200-measuring sensor, M800-1 transmitter, Mettler Toledo, Germany). The measuring range is 5-4000 FTU. Measurements were made in duplicate for each sample.

Determinations of droplet or particle sizes were made by the use of a noninvasive laser light backscatter analysis (DLS) (Zetasizer Nano S, Malvern, UK). To this end, 2 ml of a liquid to be analyzed was poured into a measuring cuvette and placed in the measuring cell. The analysis on particles or phase boundaries forming droplets was run automatically. The measuring range covered diameters between 10 μm and 0.3 nm.

Determination of secondary oxidation products in a lipid phase was performed with a p-anisidine reaction, which was quantified photometrically. A 20 μl aliquot of the oil to be tested was added to a cuvette that already contained the test reagent and placed immediately thereafter in the measuring chamber of an automatic analyzer (FoodLab, Italy). The measuring range was between 0.5 and 100. Each sample was analyzed twice.

The analysis of 3-MCPD was carried out by mass spectroscopy. Sample preparation and analysis was performed as described in: Zhou Y, Wu Z, Li C. Coupling neutral desorption sampling to dielectric barrier discharge ionization mass spectrometry for direct oil analysis. Anal. Methods, 2014, 6: 1538-1544.

The concentration of benzo-a-pyrene was performed according to the DGF method III 17a.

The pH was determined with a glass capillary electrode (Blue Line, ProLab 2000, SI Analytics, Germany).

All solutions with compounds containing at least one amidino group or at least one guanidino group were prepared from a low-ion or ion-free water phase.

All tests were carried out under atmospheric pressure (101.3 Pa) and an ambient temperature of 25° C., unless otherwise specified.

Example 1

Canola oil, which was obtained by means of a screw press as a yellow-greenish slightly turbid raw oil, was analyzed for phosphorus content (ICP-EOS, iCAP 7400, Thermo-Fisher, Scientific, Germany). Further, an investigation for the presence of mucilages was performed by adding 1 ml of a 5 wt % sodium carbonate solution (pH 12.5) to 9 ml of the raw oil. The sample which was in a centrifuge glass was agitated (vortexed at 3,000 rpm) for 3 minutes. Subsequently, the sample was centrifuged at 3,000 rpm for 5 minutes. A semisolid emulsion layer that was 3 mm thick (corresponding to a volume of 0.3 ml or 3.0 vol %, respectively) located at of the water-oil phase boundary was observed. The acid number of the oil was determined by potentiometric titration (Titroline 7000 SI Analytiks, Germany) by means of an alcoholic KOH solution. The oil has a strong smell and a slight bitter taste.

After 200 kg of the raw oil was heated to 60° C., and a 75 vol % phosphoric acid solution was added in a volume ratio of 0.4 vol %. Then the liquids were homogenized with a homogenizer (Fluco MS 4, Fluid Kotthoff, Germany) at a rotational speed of 1,000 rpm for 30 minutes. The homogenized mixture was allowed to stand for 30 minutes at 65° C. Then phase separation with a plate separator (OSD 1,000, MKR, Germany) at a throughput volume of 100 l/h and a rotational speed of 10,000 rpm was performed. An investigation for the presence of mucilages was performed from a sample which showed an emulsion layer of 0.2 ml or 2.0 vol %, respectively. Then 200 ml of a 0.5 M arginine solution was added to 10 kg of the prepurified oil and mixed by using a homogenizer (Fluco MS2, Fluid Kotthoff, Germany) (3000 rpm for 1 minute). There was immediate formation of a highly viscous emulsion, which made further mixing impossible. No phase separation of the high viscous emulsion could be achieved by centrifugation (4,500 rpm/20 minutes). In another investigation the same arginine solution with an identical amount was admixed to 10 kg of the acid-treated oil by continuously mixing the liquids with a propeller mixer (500 rpm). This resulted in a highly viscous emulsion which was just still flowable. Phase separation performed by centrifugation (3,800 rpm/10 minutes) remained incomplete. The remaining acidic precleaned oil was subjected to a further pre-purification step, which was performed with a sodium hydroxide solution (1 N, 3 vol %). For this purpose the two liquids were stirred first and then intensively mixed with a homogenizer (Fluco MS 4, Fluid Kotthoff, Germany) for 10 minutes at 1,000 rpm. Thereafter phase separation by means of the above-mentioned separator was achieved. Then, the phosphorus content and the acid number were determined. In investigation for the presence of mucilages there was only a weakly discernible skinning at the water-oil phase boundary (volume <0.1 ml corresponding to <1.0 vol %). Each of 10 kg of the obtained slightly turbid oil were refined according to the following schemes: admixing the aqueous arginine solution by means of: A) stirring with a propeller mixer at 500 rpm for 30 minutes at 35° C.; B) homogenizing with the above homogenizer (Fluco MS2, fluid Kotthoff, Germany) (1000 rpm, for 5 minutes at 25° C.), using solutions with an arginine concentration of 1) 0.3 mol/l, or 2) 0.6 mol/l, and by using a volume addition of a) 1 vol %, or b) 3 vol %, or c) 5 vol %. In one investigation, the precleaned oil was treated again with a sodium hydroxide solution (1 N, 3 vol %) admixed with a propeller mixer (500 rpm) for 30 minutes (C.1) or with the homogenizer, as described previously (C.2). Then phase separation was performed with the separator as described above.

Determination of the contents of phosphorus, sodium, potassium, calcium, and iron was carried out by means of ICP-OES (ICAP 7400, Thermo-Fisher Scientific, Germany). Determination of chlorophyll concentrations was carried out according to the methods specified under the measurement methods section after the vacuum drying of the oils. Measurements on the color spectra were performed by the Lovibond color scale test method according to the ISO 15305 method with Lovibond Colour Scan (Tintometer Ltd., Amesbury, UK, 5¼" cell).

Results (summarized in Tables 1a and 1b):

After a pre-purification process using a solution of phosphorus acid, the oils still had a greenish color and a musty smell. Admixture of an arginine solution by means of an intensive mixer to the acidic precleaned oil led to formation of stable emulsions that could not be separated into separate phases, independently from the dosing technique used. Although admixture of arginine solution by stirring was possible, the emulsive mixture was highly viscous, so that phase separation was incomplete; thus no further refining attempts were made here. After a second pre-purification process using an alkaline solution, the investigation for the presence of mucilages was negative and admixture of an arginine solution was possible by all mixing modalities. The resulting water-in-oil emulsions differed clearly in their appearance: after admixture with a stirrer, the reaction mixture had an oil-like character and a yellow-greenish color, with a moderate to severe turbidity; after admixture using an intensive mixing process, the reaction mixture had a milky character with a whitish to light yellow color and considerable turbidity. Phase separation with a separator was possible in all; the water phases obtained after performance of the admixture by stirring were significantly turbid with a yellowish hue and those obtained after an intensive mixing process were turbid and greenish. The oils differed after phase separation, in which the oil was almost clear after mixing with a stirrer, and the oils obtained after an intensive mixing process were markedly turbid. In order to obtain comparability between the refined oils and to allow feasibility of the analysis, the oils were dried first by a vacuum dryer (VC-130SC, Cik, Germany) at a temperature of 55° C. over a period of 120 minutes and under a pressure of 0.01 Pa. Then the oil obtained after an intensive mixing process had a brilliant appearance in contrast to the oil obtained after mixing with a stirrer, which still had a slight haze. Already visible with the eye was then a color difference of the obtained oil phases: the oil color after an intensive mixing procedure was yellowish and yellowish to slightly greenish after mixing with a stirrer. The color of both refined oils differed clearly from that of the oil obtained after acid pre-purification. Obvious was also the change in the odor in the refined oils. In oils obtained after mixing with a stirrer there was a faint plant smell, after refinement with an intensive mixing of the arginine solution, the oil was virtually odorless. While the oil after mixing with a stirrer had a nutty taste and a discreet bitter aftertaste, the oil obtained after an intensive mixing of the arginine solutions had no aftertaste. Oils which were treated for a second time with sodium hydroxide had a slightly greenish appearance and a distinct plant smell and a soapy and slightly bitter taste, which persisted after both, a mixture of the solution with a stirrer or mixing with an intensive mixing process. An analysis of the greenish water phase obtained by phase separation of the reaction mixture after performance of an intensive mixing process with the arginine solution which had an intense odor (plant smell) revealed the presence of chlorophylls.

TABLE 1a

| Refining step | Phosphorus [mg/kg] | FFA [wt %] | Magnesium [mg/kg] | Potassium [mg/kg] | Calcium [mg/kg] | Iron [mg/kg] |
|---|---|---|---|---|---|---|
| Raw material | 664 | 1.8 | 56 | 72 | 164 | 2.5 |
| after $H_3PO_4$ | 32 | 2.0 | 29 | 8.8 | 32 | 1.2 |
| after NaOH | 15 | 0-3 | 5.2 | 5.1 | 10 | 1.3 |
| A.1.a | 8 | 0.18 | 12 | 1.8 | 1.7 | 0.9 |
| A.1.b | 6 | 0.12 | 1.3 | 1.3 | 2.0 | 0.8 |
| A.1.c | 5 | 0.11 | 1.0 | 1.4 | 1.5 | 0.8 |
| A.2.a | 7 | 0.08 | 0.1 | 0.1 | 0.8 | 0.7 |
| A.2.b | 4 | 0.09 | 0.15 | 0.1 | 1.0 | 0.8 |
| A.2.c | 3 | 0.06 | 0.1 | 0.08 | 0.5 | 0.6 |
| B.1.a | 5 | 0.07 | 004 | 0.05 | 0.023 | 0.2 |
| B.1.b | 2 | 0.05 | <0.02 | <0.02 | <0.02 | 0.1 |
| B.1.c | 2 | 0.03 | <0.02 | <0.02 | <0.02 | <0.1 |
| B.2.a | 0.9 | 0.03 | <0.02 | <0.02 | <0.0 | <0.02 |
| B.2.b | 0.6 | 0.01 | <0.02 | <0.02 | <0.02 | <0.02 |
| B.2.c | 0.5 | 0.01 | <0.02 | <0.02 | <0.02 | <0.02 |
| C.1 | 12 | 0.24 | 5.1 | 5.2 | 10 | 1.3 |
| C.2 | 11 | 0.20 | 5.2 | 5.1 | 11 | 1.3 |

TABLE 1b

Lovibond color scale values

| Refining step | Lovibond-red | Lovibond-yellow |
|---|---|---|
| Raw material | 12.3 | 55 |
| after $H_3PO_4$ | 8.9 | 45 |
| after NaOH | 9.2 | 42 |
| A.1.a | 7.5 | 38 |
| A.1.b | 7.4 | 37 |
| A.1.c | 7.6 | 39 |
| A.2.a | 7 | 40 |
| A.2.b | 7.2 | 36 |
| A.2.c | 6.9 | 37 |
| B.1.a | 3.6 | 28 |
| B.1.b | 3.2 | 24 |
| B.1.c | 3 | 25 |
| B.2.a | 3.1 | 26 |
| B.2.b | 3 | 23 |
| B.2.c | 3.1 | 24 |
| C.1 | 9.3 | 41 |
| C.2 | 9.1 | 42 |

Example 2

Investigation on the Use of Nano-Emulsions for Oil Refining.

For this investigation jatropha oil was used which contains naturally very low concentrations of green dyes, but has an unpleasant odor and due to a high proportion of mucilages it is not possible to refine it by aqueous refining methods. Here the smell is intense, pungent and has an unpleasant species-specific character. The concentration of phosphorus was 78 ppm (mg/kg) and the acid number was 1.3 wt % (analytical method according to Example 1). The investigation for the presence of mucilages was carried out as in Example 1, using a water:oil ratio of 1:10. There was an emulsion layer of 0.7 ml (corresponding to 7.0 vol %) at the oil-water interface with only a small volume of free water. Jatropha raw oil (10 kg) was precleaned by aqueous extraction with a solution of sodium carbonate (concentration: 10 wt %, volume admixed: 3 vol %); mixing was performed with a propeller mixer (500 rpm for 30 minutes). Phase separation was performed by means of a beaker centrifuge (3,800 rpm/5 minutes). The investigation for the presence of mucilages showed then a semisolid emulsion layer that had a volume fraction of 3.0 vol %. Therefore, the aqueous refining procedure by means of a sodium carbonate solution (concentration: 20 wt %, volume admixed: 3 vol %) was performed using an intensive mixing process with a homogenizer (Fluco MS2, Fluid Kotthoff, Germany) (1,000 rpm, for 5 minutes at 25° C). Then, the repeated investigation for the presence of mucilages showed only a thin layer at the water-oil phase boundary (<1.0 vol %). The oil had an intense species-specific odor. The refined oils had the following key characteristics: phosphorus 6 ppm (mg/kg), acid number of 0.25 wt %, calcium 0.01 ppm (mg/kg), iron 0.01 ppm (mg/kg). The oil was subjected to a nanoemulsifying aqueous extraction by means of a 0.4 molar arginine solution; to each 5 liters of prepurified Jatropha oil, 100 ml of arginine solution was added and (M 1) intensive mixing was performed with an Ultraturrax T50 (5,000 rpm for 2 minutes at 25° C.) or (M 2) mixing was performed with a propeller mixer (500 rpm for 60 minutes at 25° C.). Then phase separation was obtained by means of a beaker centrifuge (3,800 rpm/5 minutes). The refined jatropha oil (M 2) had a distinct species-specific odor, while the purified oil obtained by intensive mixing (M 1) only had a very faint odor. The key characteristics amounted (M1/M 2): phosphorus 2/0.5 ppm (mg/kg), acid number 0.03/0.01 wt %, calcium 0.01/0.01 ppm (mg/kg), iron 0.02/<0.02 ppm (mg/kg).

Chlorophyll A (60 mg, Sigma Aldrich, Germany), which was first dissolved in acetone, was admixed to 2 kg of the refined oil from M 1 for 10 minutes. The clear oil then had a distinct green color. The solvent was removed by vacuum extraction, thus, resulting in the oil phase M 3.

Nano-emulsions were prepared by adding to 100 ml of 0.5 M arginine stock solution a) 3.2 ml of oleic acid, b) 2.4 ml palmetoleinic acid, and c) 1.9 ml of erucic acid at 40° C., which were mixed (12 hours) until complete dissolution with a stirrer, then transparent nano-emulsions formed. To each 100 ml of the oil from M 3 2 ml was added of: the nano-emulsions a)-c) as well as 2 ml ion-free water (d) or an arginine solution (0.5 molar) (e). The samples were homogenized using an Ultraturrax T18 with 18,000 rpm for 4 minutes at 25° C. Phase separation was carried out using a beaker centrifuge at 5,000 rpm for 8 minutes at room temperature. Other approaches were carried out with each 100 ml of the oil M 3 to which 3 g of each bleaching clays Filtrol-105 (f), or CLARION 470 (g) were added and mixed at 80° C. for 60 minutes with a magnetic stirrer. All oil samples were centrifuged immediately after the end of the investigation (5,000 rpm for 8 minutes) and then subjected to drying, which was carried out according to example 1. Analysis of the key oil characteristics was performed as well as determination of the chlorophyll concentrations (see measurement methods). Further, in all experiments, two samples were taken for determining the anisidine values and if not already done, subjected to vacuum drying.

One of 2 additional samples (10 ml) was frozen (t0), the second sample was stored under exclusion of air for 4 months (t120) at room temperature and in daylight. At the end of this investigation, samples t0 were thawed and analyzed together with the stored samples in one run according to the procedure described in measurement methods.

TABLE 2

| Investigation no. | Chlorophyll ppm (mg/kg) | Lovibond red (R)/ yellow (Y) | Anisidine t0 | Anisidine t120 |
|---|---|---|---|---|
| Raw oil | 0.24 | R 12.8/Y 29 | 4.2 | 38.4 |
| M 1 | 0.03 | R 3.2/Y 6.1 | 0.5 | 3.9 |
| M 2 | 0.08 | R 4.7/Y 9.5 | 0.9 | 7.3 |
| M 3 | 32.4 | R 5.2/Y 56.2 | 0.7 | 44.6 |
| M 3a) | 0.04 | R 3.2/Y 5.8 | 0.5 | 1.2 |
| M 3b) | 0.12 | R 3.3/Y 8.2 | 0.5 | 2.1 |
| M 3c) | 0.03 | R 3.3/Y 6.0 | 0.5 | 1.1 |
| M 3d) | 32.1 | R5.3/Y56.5 | 0.9 | 45.1 |
| M 3e) | 0.82 | R3.9/Y16.2 | 0.5 | 8.2 |
| M 3f) | 0.73 | R3.0/Y 15.1 | 0.9 | 16.9 |
| M 3g) | 1.03 | R3.7/Y16.2 | 1.1 | 17.3 |

Results:

The investigated oil had a significant amount of mucilages despite a low content of phosphorus-containing compounds. After a repeated alkaline pre-purification process, the investigation for the presence of mucilages was negative and an intensive mixing process with an arginine solution was possible. With the use of the intensive mixing process, a more efficient reduction of phosphorus-containing compounds, earth alkali metals, and metal ions as well as of the content of acid groups and of chlorophylls was achieved as compared with a mixing process with a stirrer. When chlorophyll was admixed to the refined oil, which have been obtained by means of an intensive mixing procedure and which exhibited a content of acidic groups that was below the predetermined process specification, only partial removal of the chlorophyll content could be achieved by an intensive mixing process using an arginine solution; however, the reduction of the chlorophyll content and the bleaching effect achieved corresponded to those which have been achieved by bleaching earths.

Refinement of the oil M 3 by means of nano-emulsions that was admixed using an intensive mixing process however resulted in an optimal extraction of chlorophyll and had an optimal bleaching result; the water phases were green with a slight haze. An investigation of the water phase obtained showed the presence of chlorophyll.

In a comparative investigation with pure water, there was a spontaneous separation of the water and oil phases; both were unchanged to those measured at the start. The oil which was treated with a nano-emulsion consisting of arginine and palmetoleinic acid, only had a minimal shade of green, while the color of the other oils treated with a nano-emulsion were indistinguishable from the oil used originally, i.e., before addition of chlorophyll.

The crude oil exhibited a great amount of secondary oxidation products. A considerable reduction of the oxidation products was achieved in all refining processes investigated; however, the lowest contents were present after an intensive mixing process with an arginine solution or a nano-emulsion in oils that have received chlorophyll. After 4 months, there was a substantial increase in the content of secondary oxidation products in the raw oil and in the oil, in which chlorophyll had been added. As compared to oil that had been refined by admixture of the arginine solution with a stirrer, the oil refined with an intensive mixing process of the arginine solution had better storage stability.

Oils, in which a substantially complete depletion of chlorophyll has been achieved by intensive mixing with nano-emulsions, exhibited the best storage stability. In oils treated with bleaching earths, there was deterioration in the storage stability despite of a reduction of the chlorophyll content, which was comparable to the one obtained by a refining with an arginine solution.

Example 3

Cold pressed rapeseed oil with the key parameters: phosphorus content 4.1 ppm (mg/kg), calcium 28 ppm (mg/kg), iron 2.5 ppm (mg/kg), free fatty acids 1.1 wt %, chlorophyll content 6.8 ppm (mg/kg), that had a clear appearance and a slightly green-yellowish color, and a mustard-like odor as well as an intensely rancid and bitter taste was used for the following investigation. The investigation for the presence of mucilages was negative (<0.1 ml/<1.0 vol %, for protocol see example 1). To each of 1000 ml oil, 30 ml of 0.5 M arginine solution was added. Mixing was carried out with A) a propeller mixer at 200 rpm for 30 minutes, B) with a propeller mixer at 800 rpm for 15 minutes, and C) with an Ultraturrax T18 at 24,000 rpm for 5 minutes. Then centrifugation with a beaker centrifuge was performed (5,000 rpm for 10 minutes). Oil analyses were carried out as described in Examples 1 and 2. In each case, 2 samples (20 ml) of the raw oil (RO) and the refined oils A) and C) were taken, from which one sample was frozen directly (t0) and the other was left standing in an open vessel for 30 days, at room temperature and daylight (t30). For analysis of secondary oxidation products, the samples t0 were thawed and analyzed along with the samples t30 (analytics according to measurement methods). The viscosity of the raw oil and the emulsions obtained after mixing with the aqueous phase was determined by a vibrational viscometer (Visco Lite d15, PCE Instruments, Germany) which was attached to a tripod and immersed in the upper layer of the process liquid. In investigation C) a sample of the reactive mixture was taken 60 seconds after start of homogenization and the viscosity was immediately determined herein. All measurements were performed at the same temperature (28° C.).

Results:

In the samples obtained by process A) and C), phase separation by centrifugation was possible. The sample, which was obtained by the process B) was highly viscous; here phase separation was insufficient, so that further investigations were not performed. The crude oil had a viscosity of 152 mPa·s, that of emulsions from process A) was 368 mPa·s after 5 minutes of stirring and that of C) was 3520 mPa·s after 60 seconds and 26 mPa·s after 5 minutes. The oil phase of the samples A and C were clear to brilliant. While the oil from A) still had a slight green tint, the oil from C) was pale yellowish. The resultant oils had contents of phosphorus (A or C) of 3.6 and 0.8 ppm (mg/kg), calcium of 1.3 and 0.02 ppm (mg/kg), iron of 0.9 and <0.01 mg/kg and free fatty acids of 0.08 and 0.04 wt %, respectively. The chlorophyll content was 0.96 ppm (mg/kg) for oil A) and was 0.02 ppm (mg/kg) for oil C). The sensory test revealed a discrete plant odor in sample of oil A, while oil C was virtually odorless. The taste of oil A) was much less intense than that of the raw oil while having a slightly bitter aftertaste. The oil from experiment C had a slightly nutty flavor character with a pleasant mouth feeling, and no aftertaste. In both separated aqueous extraction phases chlorophyll and phospholipids could be detected. Further, the aqueous phase had an intense musty and plant odor. The anisidine value for the crude oil was 3.7 at baseline and 38.4 after 30 days. By refining, secondary oxidation products were reduced more significantly by the intensive mixing process with arginine, compared to mixing an arginine solution with a stirrer (anisidine value after refining in C) was 0.6 vs. 0.9 in A)). During the storage period, more secondary oxidation products developed in oil A) compared to oil C) (12.6 vs 3.1).

Example 4

Investigations on the Deodorization Effectiveness of an Aqueous Extraction by Means of an Arginine Solution.

For the investigation oils from rapeseed (RSO), sesame (SEO), and sunflower seeds (SSO), which had been already stored for 2-3 years and exhibited a significant rancid odor and taste, were selected. The sunflower and rapeseed oil had also a greenish appearance. The key oil parameters were as follows, for RSO: phosphor 4 ppm (mg/kg), calcium 23 ppm (mg/kg), magnesium 3 ppm (mg/kg), iron 1 ppm (mg/kg), acid value 1.2 wt %, chlorophyll 12.4 ppm (mg/kg); for SEO: phosphorus 6 ppm (mg/kg), calcium 67 ppm (mg/kg), magnesium 12 ppm (mg/kg), iron 4 ppm (mg/kg), acid value 0.8 wt %, chlorophyll 8.2 ppm (mg/kg), and for SSO: phosphorus 24 ppm (mg/kg), calcium 64 ppm (mg/kg), magnesium 13 ppm (mg/kg), iron 4 ppm (mg/kg), acid number 0.8 wt %, chlorophyll 4.4 ppm (mg/kg). The determination of the oil characteristics was performed as described in Example 1, chlorophyll concentration was determined as described under measurement methods. The investigation for the presence of mucilages (conduction according to Example 1) showed a solid emulsion layer of 0.5 ml or 5.2 vol % at the oil-water interface with minimal amount of free water volume in SSO, a semisolid emulsion layer of 0.4 ml or 4.1 vol % in SEO with a yellowish almost clear water phase, and no emulsion layer (<0.1 ml or <1.0 vol %) in RSO, wherein the aqueous phase was greenish and turbid. For each investigation 6 liters of crude oil were used.

Pre-purification of the SSO was performed with citric acid (25 wt %, volume addition 0.3 vol %), the mixture was homogenized with an Ultraturrax T25 (20,000 rpm) for 3 minutes and centrifugal phase separation was carried out after a waiting period of 15 minutes at 3,800 rpm for 5 minutes. Then, the investigation for the presence of mucilages showed a semisolid emulsion layer of 0.3 ml or 3.3 vol % on a clear slightly yellow water phase. Therefore, a further pre-purification was performed with an aqueous solution of sodium metasilicate anhydrate (10 wt %), which was completely dissolved, admixed using a volume ratio of 3 vol % and by performing an intensive mixing procedure with the Ultraturrax (20,000 rpm for 3 minutes); subsequently the reaction mixture was centrifuged (3,800 rpm for 5 minutes). The investigation for the presence of mucilages then showed only a thin film at the phase boundary (<1.0 vol %). The initially present pungent odor of the oil was reduced significantly; however, a strong rancid odor persisted.

An aqueous solution with completely dissolved sodium bihydogencarbonate (20 wt %) was added to the SEO (added volume 4 vol %) and mixed (20,000 rpm for 5 minutes) by means of an intensive mixing process with the aforementioned Ultraturrax and then phase separation was obtained by centrifugation (3,800 rpm for 5 minutes). In the investigation for the presence of mucilages, there was still a semisolid emulsion layer of 0.3 ml or 3.4 vol %. Therefore, the previously performed aqueous refining stage was repeated. Then, investigation for the presence of mucilages showed only a membrane-like structure at the phase boundary (<1.0 vol %). The smell of the oil was virtually unchanged compared to the raw material.

In RSO, the investigation for the presence of mucilages showed virtually no emulsion layer (<0.1 ml or <1.0 vol %) and therefore no pre-purification was performed.

The precleaned oils had the following key characteristics, in SEO: phosphorus 3 ppm (mg/kg), calcium 12 ppm (mg/kg), magnesium 2 ppm (mg/kg), iron 0.5 mg/kg, acid number 0.3 wt %, chlorophyll 6.2 mg/kg; in SSO: phosphorus 6 ppm (mg/kg), calcium 14 ppm (mg/kg), magnesium 2 ppm (mg/kg), iron 1.5 ppm (mg/kg), acid number of 0.35 wt %, chlorophyll 3.9 ppm (mg/kg).

Then, 3 liters each of precleaned SSO and SEO and the raw rapeseed oil were mixed with an arginine solution (0.5 molar, added volume 3 vol %) by an intensive mixing procedure with the Ultraturrax (20,000 rpm, 6 minutes). Subsequently, phase separation was obtained with a separator (3,800 rpm for 5 minutes). The oils obtained had the following key characteristic: for RSO phosphorus 2 ppm (mg/kg), calcium 0.3 ppm (mg/kg), magnesium 0.08 ppm (mg/kg), iron 0.01 ppm (mg/kg), acid number 0.08 wt %, chlorophyll 0.08 ppm (mg/kg); for SEO: phosphorus 1 ppm (mg/kg), calcium 0.8 ppm (mg/kg), magnesium 0.05 ppm (mg/kg), iron 0.01 ppm (mg/kg), acid number 0.05 wt %, chlorophyll 0.02 ppm (mg/kg) and for SSO: phosphorus 2 ppm (mg/kg), calcium 0.8 ppm (mg/kg), magnesium 0.04 ppm (mg/kg), iron 0.01 ppm (mg/kg), acid number of 0.03 wt %, chlorophyll 0.01 ppm (mg/kg);

A sensory quality testing of the refined oils was performed in which the sensory characteristics were compared with corresponding commercially available premium oils (comp) in which a classical refining including bleaching and deodorization have been carried out.

The oils were examined by 4 trained tasters who performed blinded evaluation of taste and odor; tests were performed in triplicate. The following organoleptic characteristics were evaluated:

Positive attributes: seed-like and nuttiness; negative attributes: rancid, straw-like, woody, roasted, burned, bitter, astringent, fusty, musty or fishy. The intensity of each sensory characteristic was judged and scaled by a level of intensity from 0 (none) to 10 (very intense).

The tastings were performed on oils at a temperature of 28° C. that were served in a tinted glass, sealed with a watch glass.

The aqueous phases obtained after nano-emulsifying aqueous extraction by means of an arginine solution had a greenish milky appearance and a musty to pungent plant smell. Quantitative analyses for chlorophyll, phospholipids, and glycolipids were performed from the water phases.

The results are listed in Table 4:

TABLE 4

| | RPO-raw | RPO-refined | RPO-deodorized | SEO-raw | SEO-refined | SEO-deodorised | SSO-raw | SSO-refined | SSO-deodorized |
|---|---|---|---|---|---|---|---|---|---|
| Seed-like | 3 | 5 | 3 | 6 | 5 | 4 | 4 | 6 | 3 |
| Nutty | 1 | 3 | 2 | 3 | 3 | 1 | 2 | 3 | 1 |
| fruity | 0 | 0 | 0 | 0 | 0 | 0 | 0 | 0 | 0 |
| rancid | 7 | 0 | 0 | 6 | 0 | 0 | 4 | 0 | 0 |
| woody | 3 | 0 | 0 | 0 | 0 | 0 | 3 | 0 | 0 |
| fusty | 0 | 0 | 0 | 0 | 0 | 0 | 3 | 0 | 0 |
| musty | 5 | 0 | 0 | 4 | 0 | 0 | 3 | 0 | 0 |
| astringent | 4 | 0 | 0 | 3 | 0 | 0 | 3 | 0 | 0 |
| bitter | 2 | 0 | 0 | 4 | 0 | 0 | 0 | 0 | 0 |
| Sum of off-flavors | 21 | 0 | 0 | 17 | 0 | 0 | 16 | 0 | 0 |

Results:

The studied vegetable oils had a significant content of off-flavors and unpleasant smells due to the extraction conditions or aging. In one of the oils, the pre-purification step had to be repeated because of a positive result of the investigation for the presence of mucilages, indicating an unacceptable content of mucilages after the first pre-purification step. Finally, all oils were refined by means of an intensive mixing process with an aqueous arginine solution after wathing with the process indicators. Oil tastings revealed that off-odors or off-flavors have been completely removed; the sensory quality corresponded to a respective commercially available oil produced by a refining process according to prior art, which included the processes of bleaching and deodorization. Furthermore, oils refined with the nano-emulsifying refining procedure exhibited a stronger intensity of positive sensory characteristics as compared to comparable premium oils. Furthermore, a considerable reduction in the chlorophyll content of the aqueous refined oils could be documented. In the aqueous phases chlorophyll, phospholipids, and glycolipids were detected. Further, odorants and off-flavors, having a very intense plant smell, with a musty, beany, and pungent character were present. A brief taste test from a drop of the aqueous phase (tasting unreasonable) gave evidence of astringent and bitter flavors.

Example 5

Investigations on the Bleaching of Oils by an Aqueous Extraction by Means of an Arginine Solution.

Investigations were performed on soybean oil (SO) obtained by hexane extraction, rapeseed oil (RO) from a winter crop, grape seed oil (GSO), and camelina oil (CO). All oils were clear; the SO had a straw yellow to light brown color, the RO an olive-green tint, the GSO an intense green color and the CO an intense yellow color with a discreet shade of green. The experiments were performed on 5 liters of the raw oils. Oil characteristics were determined according to Example 1; determinations of chlorophyll were performed with a Lovibond PFX1-995 (Tintometer, UK).

The oils had the following key oil parameters, for SO: phosphorus 380 ppm (mg/kg), calcium 84 ppm (mg/kg), magnesium 56 ppm (mg/kg), iron 17 ppm (mg/kg), acid number 1.4 wt %; for RO: phosphorus 8.3 ppm (mg/kg), calcium 37 ppm (mg/kg), magnesium 8 ppm (mg/kg), iron 4 ppm (mg/kg), acid value 0.6 wt %, for GSO: phosphorus 54 ppm (mg/kg), calcium 15 ppm (mg/kg), magnesium 8 ppm (mg/kg), iron 3 ppm (mg/kg), acid number 0.8 wt % and for CO: phosphorus 28 ppm (mg/kg), calcium 33 ppm (mg/kg), magnesium 12 ppm (mg/kg), iron 2 ppm (mg/kg), acid number 0.5 wt %.

Due to a phosphorus content of >15 ppm (mg/kg) SO, GSO, and CO were subjected to a refining with phosphoric acid (85 vol %, volume addition 0.3 vol %), admixed by an intensive mixing process with a homogenizer (Ultraturrax T50, 8,000 rpm, 3 minutes). Phase separation was carried out after 30 minutes by means of a beaker centrifuge (4,000 rpm, 5 minutes).

The investigation for the presence of mucilages (as described in Example 1) was then performed in all the oils (precleaned or raw, respectively) showing semisolid emulsion layers with a volume/volume fraction in SO: 0.5 ml or 5.5 vol %; in RO: 0.3 ml or 3.3 vol %; in GSO: 0.6 ml or 6.4vol%; in CO: 0.5 ml or 5.0 vol %. Therefore, an aqueous pre-purification step was performed in all of the oils by means of a solution of sodium carbonate pentahydrate (20 wt %, volume addition 5 vol %), admixed by an intensive mixing process with the above stated homogenizer for 5 minutes at 10,000 rpm. Phase separation was carried out thereafter as previously described. The investigation for the presence of mucilages was again positive for the refined GSO (emulsion layer of 2.0 vol %); therefore, the refining step was repeated in this oil. Subsequently, the investigation for the presence of mucilages was negative in all oils (emulsion layers with a volume/volume fraction <0.1 ml/<1.0 vol %). Then the content of phosphorus was analyzed, which was 14 ppm (mg/kg) in SO, 5 ppm (mg/kg) in RO, 9 ppm (mg/kg) in GSO, and 4 ppm (mg/kg) in CO. Half of the obtained oil phases were refined with an arginine solution (0.3 molar, volume addition 5 vol %) admixed by an intensive mixing process with the above stated homogenizer for 5 minutes (10,000 rpm). Phase separation was carried out as previously described.

The resulting oil phase had the following contents in SO: phosphorus 1.3 ppm (mg/kg), calcium 0.08 ppm (mg/kg), magnesium 0.03 ppm (mg/kg), iron 0.01 ppm (mg/kg), acid number of 0.08 wt %; in RO: phosphorus 0.8 ppm (mg/kg), calcium <0.02 ppm (mg/kg), magnesium <0.02 ppm (mg/kg), iron <0.02 ppm (mg/kg), acid number 0.02 wt %, in GSO: phosphorus 3 ppm (mg/kg), calcium 0.08 ppm (mg/kg), magnesium <0.02 ppm (mg/kg), iron <0.02 ppm (mg/kg), acid number 0.18 wt % and in CO: phosphorus 1.2 ppm (mg/kg), calcium 0.06 ppm (mg/kg), magnesium <0.02 ppm (mg/kg) iron <0.02 ppm (mg/kg), acid number of 0.02 wt %.

Each of the second halves of the pre-purified oils was divided onto 2 beakers. To each of which, one of the bleaching clays (bleaching earth 1: Tonsil Optimum 210 FF amount added 2 wt %; bleaching earth 2: Tonsil Supreme 118 FF, amount added 2 wt %) was added and stirred at a temperature of 100° C. and a vacuum of 1000 Pa for 60 minutes. Subsequently, solids were removed by centrifugation, as described above, the oils were dried according to Example 1.

Determination of the chlorophyll A content and of the Lovibond red (R) and yellow (Y) color scale values was done in all raw oils, the oils obtained after pre-purification steps, and after the aqueous extraction by means of arginine or bleaching earths treatment, respectively; results are shown in Table 5.1 and Table 5.2. In each of the raw oils, and the oils refined with the arginine solution or with bleaching earths, 2 samples were taken, which were subjected to vacuum drying according to Example 1, of which one of the samples was frozen (t0), the other was allowed to stand at room temperature and day light exposure under exclusion of air for 120 days (t120). Subsequently, the thawed samples t0 and the samples t120 were examined for secondary oxidation products (experimental procedure according to measurement methods) (Ansisdine test results are listed in Table 5.3) and for tocopherol content. Furthermore sensory tastings were carried out according to Example 4 and the results are summarized in Table 5.3 (calculated as described in Example 4).

TABLE 5.1

| | Chlorophyll content (mg/kg) | | | | |
|---|---|---|---|---|---|
| | Raw oil | After pre-purification | After refining | Bleaching earth1 | Bleaching earth 2 |
| SO | 58 | 4.9 | 0.02 | 0.03 | 0.02 |
| RO | 72 | 7.2 | 0.06 | 0.05 | 0.07 |
| GSO | 98 | 10.3 | 0.01 | 0.02 | 0.02 |
| CO | 67 | 5.8 | 0.01 | 0.01 | 0.01 |

TABLE 5.2

| | LOVIBOND | | | | |
|---|---|---|---|---|---|
| | Raw oil | After pre-purification | After refining | Bleaching earth 1 | Bleaching earth 2 |
| SO | R18.4/Y68 | R15.3/Y48.8 | R 2.2/Y 6.3 | R 1.8/Y 5.5 | R2.3/Y5.8 |
| RO | R10.8/67.8 | R 11.2 Y 43.1 | R 6.2 Y 8.4 | R 5.8/Y 9.5 | R 6.0/Y 8.5 |
| GSO | R8.5/Y 70 | R 9.2/Y 56.4 | R 6/Y 26.3 | R 4/Y 27.5 | R5/Y25.2 |
| CO | R24.3/Y70 | R12.2/Y51.6 | R 9/Y 9.3 | R10/Y 10.2 | R9/Y 9.1 |

TABLE 5.3

| | Anisidine | | | | Off-flavor | | | |
|---|---|---|---|---|---|---|---|---|
| | SO | RO | GSO | CO | SO | RO | GSO | CO |
| Raw oil t0 | 4.2 | 3.8 | 2.1 | 2.5 | 16 | 14 | 12 | 19 |
| Raw oil 120 | 27.8 | 26.6 | 17.1 | 36.4 | 21 | 26 | 19 | 28 |
| NV t0 | 1.4 | 1 | 2.1 | 1.8 | 12 | 15 | 16 | 14 |
| NV t120 | 22.1 | 18.7 | 15.5 | 28.1 | 22 | 25 | 20 | 12 |
| NA t0 | 0.5 | 0.5 | 0.6 | 0.7 | 0 | 0 | 0 | 0 |
| NA t120 | 3.2 | 1.6 | 2 | 1.4 | 0 | 0 | 0 | 1 |

TABLE 5.3-continued

|  | Anisidine | | | | Off-flavor | | | |
| --- | --- | --- | --- | --- | --- | --- | --- | --- |
|  | SO | RO | GSO | CO | SO | RO | GSO | CO |
| NB1 t0 | 0.8 | 0.7 | 1 | 1.1 | 2 | 1 | 4 | 1 |
| NB1 t120 | 16.2 | 15.8 | 13.9 | 20.7 | 3 | 2 | 4 | 4 |
| NB2 t0 | 0.5 | 0.7 | 0.7 | 0.6 | 0 | 2 | 2 | 0 |
| NB2 t120 | 13.7 | 15.9 | 14.1 | 18.7 | 3 | 4 | 2 | 3 |

NV = after pre-purification refinements; NA = after nano-emulsifying refining with an arginine solution, NB = after treatment of the pre-cleaned oils with bleaching earth 1 or 2.

Results:

In 3 of the 4 investigated oils, phosphorus levels were above the limit of the process specification, so that a pre-purification step with an acid treatment was carried out. Thereafter, the phosphate content was below 15 ppm (mg/kg) in all oils; however, the investigation for the presence of mucilages remained positive in all of the pre-cleaned oils; thus, a further pre-purification with an aqueous alkaline solution was carried out. This refining step had to be repeated for one of the oils; thereafter sufficient reduction of mucilages was obtained in all oils, and the analytical results were then in accordance with the process specifications. Refining of these oils with an aqueous solution of arginine by using an intensive mixing procedure was possible in all oils. Accordingly, an emulsion-free phase separation could be achieved in all oils. The oils obtained had a yellow tint of low to medium intensity. The color spectrum of the refined oils according to visual assessment and to the Lovibond color scale measurements was comparable to that of oils that have been bleached with bleaching earths. This also holds true for the achieved reduction of the absolute chlorophyll concentrations of oils refined by the inventive mixing process and that were obtained after bleaching with bleaching earths.

The content of secondary oxidation products could be reduced by the pre-purification process and further reduction was achieved by subsequent aqueous extraction by means of an arginine solution, which was then below the detection limit. Reduction of secondary oxidation products was also achieved by bleaching earths in the pre-purified oil. During the course of 120 days, there was an increase of secondary oxidation products in the raw oils and the pre-purified oils. In pre-purified oils treated with bleaching earths, there also was a significant increase of secondary oxidation products, while there was only a minimal increase over time in oils obtained after nano-emulsifying refining using an arginine solution. The raw oils had several unpleasant smells and off-flavor characteristics. After pre-purification the off-flavors persisted at a lower level of intensity; however, further off-flavors developed, thus, causing the sensory characteristics soapy and astringent. A complete or almost complete reduction of off-flavors and unpleasant smells could also be achieved in oils obtained from nano-emulsifying refinement with an arginine solution and bleaching earths. In the further course, the intensity of unpleasant smells and off-flavor characteristics in the crude oils and the pre-purified oils increased. While some unpleasant smells and off-flavors arose during the storage period in oils treated with bleaching earths, this was not the case in oils refined by the inventive mixing procedure.

In the separated aqueous phase after refining with arginine chlorophyll, phospholipids, free fatty acids and tocopherols were found. The phases had a green-yellow color and a spicy to musty smell. Due to a strong astringent characteristic of these aqueous solutions in the mouth, no sensory tastings were performed here.

Example 6

Investigation on the Deodorization of Vegetable Oils

Investigated were 6 vegetable oils, which had a significant amount of unpleasant smells and off-flavors due to extraction conditions, aging, or storage conditions, or their natural taste quality was impaired. For this purpose, a sunflower seed oil (SSO), in which the kernels were pressed without peeling and then were deoiled by means of a solvent extraction procedure, was used. The oil fractions obtained were merged. The oil had a brownish color; approximately 8 vol % of a brown gum phase had sedimented after a 12-h standing time. Further, a cold-pressed rapeseed oil (RO) was investigated, which has been stored in barrels for 18 months. The oil had an intensely brown-green color and was slightly turbid; after a 10-hour standing time 5 vol % brown gum phase had sedimented. Further, sesame oil (SO) was examined which had a yellowish-brownish color. Further investigated was an olive oil obtained by hot-pressing (OO) that has been stored for a period of 8 months. This had an intense olive-colored slightly turbid appearance. Furthermore, a cold-pressed walnut kernel oil (WKO), which had a brownish color, was investigated.

For the studies, 1.5 kg of each raw oil was refined.

The oils were analyzed concerning the key parameters according to Example 1 (Table 6.1). Since the process limit for phosphate was exceeded in SSO, RO, and OO, a pre-purification step with phosphoric acid (85 vol %, addition volume 0.2 vol %) was performed using an intensive mixing procedure by means of an Ultraturrax T18 (IKA, Germany) (24,000 rpm for 5 minutes). Then phase separation with a beaker centrifuge (3,500×g, for 5 minutes) was performed. The investigation for the presence of mucilages (performed in accordance to example 2) was positive in the 3 prepurified oils (phosphorus contents here: SSO 28 ppm (mg/kg), RO 12 ppm (mg/kg), OO 22 ppm (mg/kg)) and the other oils: SSO 4.3 vol %, RO 3.8 vol %, SO 5.2 vol %, OO 4.8 vol %, WKO 6.2 vol %. A pre-purification step was performed with an aqueous sodium metasilicate pentahydrate solution (20 wt %, volume addition 3 vol %) by means of an intensive mixing procedure using the identical set up and settings as in the previous pre-purification process, in SO and WKO. Hereafter the investigation for the presence of mucilages was still positive for two of the oils: SO 2.2 vol % and WKO 3.4 vol %. Then all of the oils obtained from the previous pre-purifications were subjected to a further pre-purification step with an aqueous sodium carbonate solution (25 wt %, volume addition 4 vol %) by means of an intensive mixing process, performed as described above. Phase separation was carried out with a beaker centrifuge, as performed before. The investigation for the presence of mucilages was then negative (<1.0 vol %) in all pre-purified oils and phosphorus contents were <10 ppm (mg/kg) in all. Subsequently, refining with an arginine solution (0.3 molar, volume addition between 1.5 and 4 vol %) was performed in all oils by means of an intensive mixing process as described above. Subsequently, phase separation was performed, as described above; analyses according to the procedures in Example 1 were conducted.

TABLE 6.1

| Refining step | Phosphorus [mg/kg] | FFA [wt %] | Magnesium [mg/kg] | Potassium [mg/kg] | Calcium [mg/kg] | Mucilage (vol %) |
|---|---|---|---|---|---|---|
| SSO- raw | 725 | 1.9 | 68 | 56 | 94 | 11.5 * |
| SSO - refined | 2 | 0.02 | 0.05 | <0.02 | <0.02 | 0 |
| RO - raw | 74 | 1.1 | 26 | 2.3 | 21 | 7.7 |
| RO refined - | 0.5 | 0.01 | <0.02 | <0.02 | <0.02 | 0 |
| SO - raw | 9 | 0.43 | 6.4 | 0.5 | 8.6 | 5.2 |
| SO - refined | 0.5 | 0.01 | <0.02 | <0.02 | 0.03 | 0 |
| OO - raw | 234 | 1.4 | 54 | 12 | 46 | 9.6 |
| OO - refined | 2 | 0.09 | 0.04 | <0.02 | <0.02 | 0 |
| WKO raw | 12 | 0.6 | 12 | 1.8 | 15 | 6.2 |
| WKO-refined | 0.5 | 0.07 | <0.02 | <0.02 | <0.02 | 0 |

Mucilage: Relative volume fraction of an emulsion phase recognizable in an investigation for the presence of mucilagest.
* No more free water phase, the volume of the semisolid emulsion mass exceeds the water volume added.

The raw oils and the oils obtained after nano-emulsive refining were evaluated by 4 qualified tasters in accordance with the Guidelines for edible fats and oils of the German Food Code, and in accordance with the procedure in Example 4 after the oils had previously been subjected to vacuum drying.

The median of all tasting results for the investigated oils was calculated (Table 6.2).

TABLE 6.2

| | SO - raw | SO - refined | RO - raw | RO - refined | SSO- raw | SSO- refined | WKO- raw | WKO- refined |
|---|---|---|---|---|---|---|---|---|
| Seed-like | 2 | 4 | 2 | 4 | 2 | 3 | 2 | 4 |
| Nutty | 1 | 2 | 0 | 3 | 0 | 0 | 3 | 5 |
| Fruity | 0 | 0 | 0 | 0 | 0 | 0 | 0 | 1 |
| Rancid | 6 | 0 | 5 | 0 | 3 | 0 | 4 | 0 |
| Woody | 1 | 0 | 2 | 0 | 1 | 0 | 1 | 0 |
| Fusty | 3 | 0 | 0 | 0 | 3 | 0 | 0 | 0 |
| Musty | 6 | 0 | 3 | 0 | 3 | 0 | 3 | 0 |
| Astringent | 5 | 1 | 4 | 0 | 1 | 0 | 4 | 0 |
| bitter | 4 | 0 | 5 | 0 | 2 | 0 | 5 | 0 |
| Sum of off-flavors | 25 | 1 | 19 | 0 | 13 | 0 | 17 | 0 |

Results:

The investigated aged oils, which had a large amount of off-flavors and odorants, had to be refined by a 1- or 2-stage pre-purification processes due their content of phosphate and/or mucilages; thereby the process parameters were achieved that are required to qualify for the nano-emulsifying refining. This could be performed with an arginine solution; the obtained reaction mixtures could be separated into two phases by using centrifugal phase separation. The obtained aqueous phases exhibited a marked turbidity and a green, greenish-yellow, or yellow-brownish color. Further, the aqueous phases had an intense plant smell, partly with a musty to pungent character. The flavors and odorants that caused the sensory perception of an off-flavor or an unpleasant smell could be removed virtually completely in all refined oils. On the other hand, a more intensive perception of sensory characteristics that are typical for the respective oils was noticed.

Example 7

Investigation on the Production of Water-in-Oil Emulsions by Homogenization and their Effect on the Bleaching and Deodorization of Lipid Phases.

Two process techniques were investigated: mixing procedures archived in a batch process (batch process) or due to a continuous mixing procedure (inline process). The batch mixing process was conducted with a turbulence mixer device (SRT4 1500, Black, Germany) (V1+V2) and a rotor-stator homogenizator (Fluco, MS23, Fluid Kotthoff, Germany) (V3+V4). The inline mixing process was carried out with an inline dispersion unit (Fluko DMS2.2/26-10, Germany) with 1 or 3 consecutively aligned dispersion units (R/S-units) (gap diameter 1 mm) as indicated in Table 7.1 (V5-V10) using different flow rates. The energy demand of each investigation was documented. For conduction of the batch process, the entire volume of the aqueous phase was added to the oil (100 kg), which was in a container having a bottom diameter of 47 cm, before start of the mixing process; the homogenizer and the turbulence mixing device were set to have a ground clearance of 10 cm. The in-line mixing system was fed by means of two metering pumps, which allowed a continuous flow with defined flow rates of the two phases through tubing; flow rates are given in Table 7.1. The volume ratios of the admixed aqueous phases are also listed in Table 7.1. The tubings conducting the two phases merged directly in front of the dispersing tool.

Sesame press oil was used having the following key values: phosphorus 25 ppm (mg/kg), calcium 54 ppm (mg/kg), magnesium 23 ppm (mg/kg), iron 7 ppm (mg/kg), acid number 1.1 wt %, chlorophyll 36 ppm (mg/kg). A pre-purification process was carried out with a sodium carbonate solution (20 wt %, volume addition 4 vol %) by the use of the various mixing modalities. The obtained reaction mixtures were conducted through a separator (OTC 350, MKR, Germany) (flow rate 30 L/h, 10,000 rpm). In the pre-cleaned oils investigation for the presence of mucilages was carried out as performed in Example 1. It was positive in V1 (2.2 vol %); therefore, here, the pre-purification step was repeated. Then in all the pre-purified oil phases, the investigation for the presence of mucilages was negative (<1.0 vol %) and phosphorus was <8 ppm (mg/kg) in all of them. Thereafter, the pre-purified oils were refined with an arginine solution (0.4 molar, 3 vol %) where an identical mixing or homogenization procedure was performed as done in the individual pre-purification steps using the same mixing and dispersing tools and settings according to Table 7.1. Subsequently, phase separation was carried out with the separator mentioned above under the same process conditions as previously mentioned.

The key values of the refined oils were determined (measurement methods). The oils were dried after refining as describe in Example 1. The chlorophyll content was determined according to Example 5.

TABLE 7.1

| No. | Process mode | Diameter propeller */ rotor ** (mm) | Number of R/S units | Rotational frequency | Duration (Min)* flow rate (L/Min)** | Energy applied (W) |
|---|---|---|---|---|---|---|
| V1 | Batch | 100* | n. a. | 750 | 90 Min * | 126 |
| V2 | Batch | 100* | n. a. | 1500 | 90 Min * | 378 |
| V3 | Batch | 180* | 1 | 1250 | 5 Min * | 134 |
| V4 | Batch | 180* | 1 | 1250 | 10 Min * | 262 |
| V5 | inline | 74** | 1 | 1000 | 60 L/Min ** | 120 |
| V6 | inline | 74** | 1 | 1000 | 20 L/Min ** | 240 |
| V7 | inline | 74** | 3 | 1000 | 60 L/Min ** | 143 |
| V8 | inline | 74** | 3 | 1000 | 20 L/Min ** | 52 |
| V9 | inline | 74** | 1 | 2800 | 60 L/Min ** | 335 |
| V10 | inline | 74 | 1 | 2800 | 20 L/Min  | 126 | na = not applicable; R/S = rotor-stator

The emulsification that was obtained after an individual mixing process of arginine solutions was characterized by a turbidimetry measurement (InPro 8200, Mettler Toledo, Germany) as well as by determination of the droplet sizes by dynamic laser light scattering analysis (DLS) (Zetasizer Nano S, Malvern, UK). All samples were analyzed 1 and 15 minutes after finishing of each mixing or homogenization process. The intensity of turbidity and the average diameter of the fraction(s) of droplets that accounts for >90% of all measured droplets, determined by DLS, are given in Table T2. A sensory tasting test was carried out by four trained tasters, according to the procedure outlined in Example 4. The intensity values of all characteristics of unpleasant smells and off-flavors were summed up for the respective raffinates and listed in Table 7.2 (Sum off-flavors). The maximum value possible for the sum of all the eventual unpleasant smells and off-flavor intensities was 50. In the investigations V1, V2, C4, V8, and V10 and the raw oil samples were taken to investigate the storage stability accordingly to Example 2 (the refined oils were subjected to vacuum drying); the anisidine value was determined at t0 and t120. The difference between the value present at t0 and that present at t120 was calculated. These samples were also used for the determination of the color spectrum by the Lovobond method. The difference for obtained values of red (R) and yellow (Y) between the value present at t0 and at t120 was calculated for the individual investigation.

TABLE 7.2

| | Turbidity (FTU) | | Droplet size (µm) | | Phos-phorus | Acid value | Chlorophyll | Off- |
|---|---|---|---|---|---|---|---|---|
| | 1 Min | 15 Min | 1 Min | 15 Min | ppm | wt % | ppm | flavors |
| V1 | 932 | 534 | 6.13 | 9.2 | 28 | 0.24 | 0.43 | 6 |
| V2 | 2411 | 820 | 1.23 | 4.93 | 1.4 | 0.13 | 0.12 | 3 |
| V3 | 3036 | 2588 | 0.48 | 0.61 | 1.1 | 0.05 | 0.01 | 0 |
| V4 | 3225 | 2886 | 0.38 | 0.59 | 1.2 | 0.02 | 0.01 | 0 |
| V5 | 1558 | 938 | 1.43 | 3.45 | 1.8 | 0.07 | 0.09 | 2 |
| V6 | 2866 | 988 | 0.92 | 1.05 | 1.3 | 0.05 | 0.05 | 2 |
| V7 | 2988 | 2556 | 0.43 | 0.67 | 0.8 | 0.01 | 0.02 | 0 |
| V8 | 3721 | 3101 | 0.38 | 0.49 | 0.9 | 0.01 | 0.01 | 0 |
| V9 | 3520 | 3145 | 0.45 | 0.69 | 1.0 | 0.01 | 0.01 | 0 |
| V10 | 3655 | 3005 | 0.27 | 0.38 | 0.05 | 0.01 | 0.01 | 0 |

Results:

In the pre-purified oil phases, obtained by the different mixing procedures and where the process indicators accorded to the process specifications, admixture of arginine solutions could be performed by mixing or homogenization with all of the mixing processes. Thus, subsequent phase separation was possible without presence of an emulsification in the obtained oil or water phases. Reductions of off-flavor or odorants and of chlorophyll were achieved in all refined oils; however, the extent was less when the mixing process was performed by a propeller mixer or a dispersion mixer executing low shears forces as compared to a nano-emulsifying refining, despite an equal or even higher amount of energy applied for the mixing process. This finding was paralleled by the presence of higher values for phosphorus and the acid number. Correspondingly, the droplet sizes were significantly smaller and show no relevant tendency to coalesce in oils, in which an optimal depletion of mucilages was achieved; therefore, sustainability of the emulsion has been increased significantly.

The total amount of the intensities of characteristics of an unpleasant smell or off-flavor of the raw oil was 19. There was a depletion of unpleasant smell or off-flavor by using a mixing process according to the invention utilizing low shear forces. However, complete depletion of unpleasant smell or off-flavors could be achieved only by the use of a nano-emulsifying intensive mixing process where stabilized emulsions have been obtained with durable droplet sizes that were <1 µm even 15 minutes after manufacturing. The aqueous phases obtained after phase separations were turbid and had a green color. The turbidity was stronger when the nano-emulsifying refining was carried out with a high shear rate or when there was a longer contact time in the dispersion unit. All water phases had an intense woody and musty smell. A significant increase of secondary oxidation products was observed in the raw oil after storage for a period of 120 days at room temperature and exposure to light to (anisidine: +17.5). In the refined oil phases of V1 and V2, there was a slight increase of oxidation products (anisidine: +3.2 and +2.1), while in investigations V4, V8, and V10 virtually no increase occurred (anisidine: +0.6, +0.4, +0.3). In the stored raw oil, there was a change in color (R +5/Y +16). In the refined oils there was only a slight (V1: R +2/Y +5) or minimal change of color (V2: R +1/Y +2; V4: R +1/Y +1; V8: R +/−0, Y −1; V10: R +/−0/Y −2).

Example 8

Investigation on the Effect of Mucilage on the Homogenizability of Lipid Phases

For the tests, safflower oil that had the following key parameters was used: phosphorus 25 ppm (mg/kg), calcium 32 ppm (mg/kg), magnesium 12 ppm (mg/kg), iron 3 ppm (mg/kg), acid number 0.8 wt %, chlorophyll 16 ppm (mg/kg). The investigation for the presence of mucilages (according to example 1) exhibited an emulsion phase having a volume fraction of 8.2 vol %. One kilogram samples of each of the raw oils were used for conduction of various pre-purification processes. The pre-purification steps were directed to a reduction of mainly phosphorus-containing compounds or phosphorus-containing mucilage or to remove both from the oil. Determination of contents of phosphate and free fatty acid and conduction of the investigation for the presence of mucilages were performed as in Example 1; droplet sizes formed in the emulsions (1 minute after finishing of mixing) as well as their durability (15 minutes after finishing of mixing) were determined by means of DLS (see measure methods). Determination of the chlorophyll content of the refined oil phases was performed after drying of the lipid phases (see measure methods). Pre-purifications were performed according to the following schemes: trial 1: sodium hydroxide (1 molar, volume addition 2 vol %), trial 2: sodium hydrogen carbonate (10 wt %, volume addition 1.5 vol %), trial 3: sodium carbonate (20 wt %, volume addition 2 vol %), trial 4: phosphoric acid (85 wt %, amount 0.2 wt %) and after phase separation sodium carbonate (10 wt %, volume addition 2vol %), trial 5: sodium metasilicate (10 wt %, volume addition 1 vol %), trial 6: citric acid (25 wt %, volume addition 1.0 vol %) and after phase separation sodium carbonate (15 wt %, volume addition 3 vol %), trial 7: phosphoric acid (85 wt %, volume addition 0.3 vol %) and after phase separation sodium carbonate (15 wt %, volume addition 2 vol %).

The mixing process was performed with an Ultraturrax (T18, 24,000 rpm) for 5 minutes. Then phase separation was carried out with a beaker centrifuge (3,800 rpm, 10 minutes) and samples were taken for analyses. Thereafter, a 0.3 molar arginine solution (volume addition 2 vol %) was added to the pre-purified oil phases and homogenized by the Ultraturrax (24,000 rpm, 5 minutes). Subsequently, phase separation, as previously described, was performed. Samples were taken for analyses and chlorophyll determination, which was carried out after drying of the oil sample.

Results:

The oil tested had phosphorus levels and a mucilage load that were higher than the set limits of the process indicators. When trying to homogenize the oil with an arginine solution, a solid emulsion formed. Various pre-purifications were applied, whereby reduction of mucilages or phosphorus compounds, respectively, from the oil phases was achieved. A reduction of phosphorus-containing compounds alone that complied with the process specification was not sufficient to enable good separability of phases when mixing with an arginine solution via an intensive mixing process; thus trial 1 could not be finished. For oils, in which the phosphorus content and/or the amount of mucilage was only slightly above the set limits of the process indicators, the reactive mixtures produced with the arginine solutions were separable. However, droplet dimensions in the reactive mixture were significantly greater in those oils, as this was the case in oils where the achieved reductions of phosphorus-containing compounds and mucilages accorded to the process indicators. Due to the staged purification approach with a nano-emulsifying refining process, considerable reductions of phosphorus-containing compounds, the acid value, and chlorophyll concentrations could be achieved in all the oils. However, depletion was much more efficient when contents of mucilage and phosphorous-containing compounds were within the limits of the process specification, after performance of a pre-purification step.

TABLE 8

| Trial No. | AWT (Vol-%) | Phosphorus 1 (ppm) | Acid value 1 (wt %) | Phosphorus 2 (ppm) | Acid value 2 (wt %) | Droplet size (µm) 1 min. | Droplet size (µm) 15 min. | Chlorophyll (ppm) |
|---|---|---|---|---|---|---|---|---|
| 1 | 6.6 | 18.8 | 0.25 | n. a. | n. a. | n. a. | n. a. | n. a. |
| 2 | 3.5 | 18.1 | 0.48 | 5.3 | 0.23 | 1.3 | 4.6 | 2.32 |
| 3 | 2.8 | 9.5 | 0.32 | 3.1 | 0.18 | 0.89 | 1.56 | 2.11 |
| 4 | 1.8 | 4.6 | 0.88 | 1.8 | 0.21 | 0.65 | 0.98 | 1.62 |
| 5 | 1.1 | 16.6 | 0.61 | 2.9 | 0.15 | 0.68 | 1.23 | 3.2 |
| 6 | <1.0 | 3.2 | 0.32 | 1.4 | 0.01 | 0.39 | 0.48 | 0.06 |
| 7 | <1.0 | 2.8 | 0.21 | 0.5 | 0.01 | 0.25 | 0.34 | 0.01 | n. a. = not applicable because phase separation not obtainable
AWT = Volume fraction of an emulsion layer observed in an investigation for the presence of mucilages
Acid number 1 = Number of titrable acid equivalents in the pre-cleaned oil
Phosphor 1 = phosphorus content of the oil after pre-purification
Acid number 2 = Number of titrable acid equivalents in the oil after nano-emulsifying refining with an arginine solution
Phosphor 2 = Phosphorus content of the oil after nano-emulsifying refining with an arginine solution Example 9

Investigation for Use of Nano-Emulsions for Deodorization and Bleaching of Animal Fats A hexane extraction fraction of animal fat (K1) with a dark brown color and a pungent-putrid and rancid odor had the following oil characteristics: phosphorus 5.2 ppm (mg/kg), calcium 12.4 ppm (mg/kg), magnesium 4.3 ppm (mg/kg), iron 3.1 ppm (mg/kg), acid value 0.4 wt %. The investigation for the presence of mucilages (implementation in accordance with Example 1) showed a complete emulsion of the water phase (9.0 vol %). A 3 kg sample of the animal fat was heated to 45° C. and a mixture of sulfuric/phosphoric acid (v:v, 20:80, 95 wt %/85 wt %) was admixed (volume addition 1 vol %) by homogenization with an Ultraturrax T25 (25,000 rpm) for 8 minutes. After standing for 30 minutes, phase separation was carried out with a separator (OTC 350, MKR, Germany, flow rate 10 l/h, 10,000 rpm). This gave a clear oil, as well as a dark-brown viscous water phase. The oil still had a dark brown color, the smell was only slightly reduced, while additional odors were a sulfur and an acid smell. In the investigation for the presence of mucilages, there was an emulsion layer with a volume fraction of 4.3 vol %. Therefore, a further pre-purification was conducted with an aqueous solution of sodium meta-silicate (20 wt %, volume addition 3 vol %), which was homogenized with the Ultraturrax for 5 minutes. Then phase separation was performed with the above-described separator and process conditions. The lipid phase separated was moderately turbid, the color character has not changed, and the initial burden of off-flavors still remained. The key characteristics of that oil were: phosphorus 3 ppm (mg/kg), calcium 0.2 ppm (mg/kg), magnesium 0.05 ppm (mg/kg), iron 0.02 ppm (mg/kg), acid number 0.15 wt %. The investigation for the presence of mucilages was negative (<1.0 vol %). In order to improve the extraction of dyes or odorants, 200 g samples of the precpurified oil were treated with the following nano-emulsions, which were composed of an aqueous arginine solution (0.6 molar), in which the following carboxylic acids had been dissolved by stirring over a period of 12 h at 35° C.: 1) oleic acid (0.2 molar) and naphthenic acid (0.05 molar); 2) palmetoleinic acid (0.1 molar) and caprylic acid (0.2 molar); 3) capric acid (0.1 molar) and benzene-1,2,4,5-tetracarboxylic acid (0.05 molar) and embonic acid (0.1 molar); 4) hydroxy-phenyl-propionic acid (0.2 molar) and syringic acid (0.2 molar). For comparison, analogous trials were conducted with the following: 5) an aqueous arginine solution (0.6 molar), 6) an aqueous solution of sodium hydroxide (1 molar), and 7) a water phase without additives.

The nano-emulsions and the comparison solutions were added to prepurified oil phases in a volume ratio of 5 vol % and then were homogenized with an Ultraturrax T18 (24000 rpm) for 8 minutes. Then phase separation was performed with a centrifuge (4,000 rpm/10 minutes). From the resulting oil phase, samples were taken for analyses as well as for a tasting and color analysis. For the latter, the oils were first subjected to vacuum drying according to Example 1. Tastings of raw material deviated from the previous protocol in that only an in-depth examination of the odor accompanied by evaluation of sensory effect of a drop that was given to the tongue was performed. For the characterization of off-flavors, other attributes (Table 9.2) were selected. Otherwise the tastings were carried out as outlined in Ex. 4. The color of the lipid phase was evaluated by the EBC color scaling spectrometry with a Lovibond ColorPod (range 2-27). The color scale of the animal body fat was 24$^{th}$.

TABLE 9.1

| Trial No. | Phosphorus (ppm) | Acid value (wt %) | Calcium (ppm) | Lovibond EBC |
| --- | --- | --- | --- | --- |
| 1) | 0.8 | 0.02 | <0.02 | 6 |
| 2) | 0.6 | 0.04 | <0.02 | 6 |
| 3) | 0.9 | 0.06 | <0.02 | 7 |
| 4) | 0.6 | 0.04 | <0.02 | 6 |
| 5) | 0.7 | 0.01 | <0.02 | 7 |
| 6) | 2.5 | 0.12 | 0.2 | 8 |
| 7) | 3.1 | 0.15 | 0.2 | 8 |

TABLE 9.2

| | Raw material | V1) | V2) | V3) | V4) | V5) | V6) | V7) |
| --- | --- | --- | --- | --- | --- | --- | --- | --- |
| chemical | 4 | 0 | 0 | 0 | 0 | 0 | 3 | 3 |
| fishy | 7 | 1 | 0 | 0 | 1 | 2 | 4 | 5 |
| sour | 2 | 0 | 0 | 0 | 0 | 0 | 0 | 1 |
| rancid | 7 | 0 | 1 | 0 | 0 | 0 | 3 | 3 |
| soapy | 2 | 0 | 0 | 0 | 0 | 0 | 4 | 2 |
| fusty | 5 | 1 | 0 | 0 | 0 | 1 | 0 | 0 |
| musty | 6 | 0 | 1 | 0 | 0 | 1 | 2 | 0 |
| astringent | 6 | 0 | 0 | 0 | 1 | 1 | 2 | 3 |

Results (Numerical Results are Summarized in Tables 9.1 and 9.2):

In the solvent-extracted animal fat phase, relevant amounts of mucilage and a moderate amount of phosphorus-containing compounds were present. By pre-purification processes, the contents of mucilages and phosphorus-containing compounds could be lowered to the required level according to the set process limits. The content of fatty acids was <0.2 wt %; thus, nano-emulsions were provided to improve nano-emulsifying refining with an arginine solution by means of an intensive mixer. Phase separation was possible without significant emulsions of the separated phases. The separated water fractions were very turbid and had a brownish color and an intense and unpleasant odor. The key characteristics of the oils obtained are given in Table 9.1.

The aqueous nano-emulsifying refining procedure by means of an arginine solution of the prepurified oils resulted in a very good reduction of contents of phosphorus and compounds with acidic groups as compared to the other aqueous extractions. Furthermore, a superior reduction of dyes and odorants could be achieved. However, more superior reductions of unpleasant odorants flavors and of dyes were obtained in pre-purified lipid phases by means of nano-emulsion admixed by an intensive mixing procedure, Example 10

Large-Scale Application of an Aqueous Refining Process.

A sample of 2000 kg soy screw-pressed oil with key oil parameter: phosphorus 37 ppm (mg/kg), calcium 5.2 ppm (mg/kg), magnesium 2.9 ppm (mg/kg), iron 1.4 ppm (mg/kg), acid value 0.85 wt %, chlorophyll 8.2 ppm (mg/kg) was prepurified because the phosphate content was >15mg/kg by the use of a citric acid solution (8 wt %, volume addition 3 vol %). The raw oil and the aqueous refining liquid were heated to 28° C. The mixing was carried out with an in-line rotor-stator shear mixer (Fluco DMS 2.2/26-10, Fluid Kotthoff, Germany); rotation frequency was set to 2,500 rpm. The raw oil (tank 1) and the aqueous phase (tank 2) were each conducted through a line at a constant flow provided by eccentric screw pumps (PCM EcoMioneau C, type MM25C6S and type MM1C12S, Germany) which was adjusted according to the preset ratio of admixture. The throughput volume of the oil phase was 2.5 m$^3$/h. The lines merged in front of the dispersing tool to which they were connected to and the metering was obtained in the according doses volumes. After in-line intensive mixing, the reaction solution was pumped through a line into tank 3, which served as a volume buffer. From there it was pumped to a plate separator (AC 1500-430 FO, Flottweg, Germany; 6600 rpm, centrifugal acceleration 10,000×g).

The separated oil phase, which had a temperature of 32-35° C. was pumped through a pipe into tank 4. From a sample taken there, investigation for the presence of mucilages was carried out as outlined in Example 1, showing a semisolid emulsion layer of 0.3 ml (3.4 vol %). A further pre-purification procedure was performed with sodium hydrogen carbonate (20 wt %, volume addition 4 vol %) carried out with the above sequence of inline homogenization (hereinafter introduction into tank 5) and subsequent phase separation with a separator at the same settings and conditions as previously used. The separated oil phase was pumped into the tank 6 (temperature 35° C.). Analyzes of samples taken from there revealed: phosphorus 1.8 ppm (mg/kg), calcium 0.09 ppm (mg/kg), magnesium 0.05 ppm (mg/kg), iron 0.02 ppm (mg/kg), acid number 0.23 wt %; investigation for the presence of mucilages showed only a thin membrane at the phase boundary (<1.0 vol %).

For the nano-emulsifying refining an aqueous (low ion water) arginine solution (0.4 molar) was prepared and admixed with a volume fraction of 2 vol % homogenized with the in-inline mixer. The reaction mixture was fed into tank 7) and from there to the separator by which phase separation was obtained using identical settings and conditions as before. The refined oil was pumped into the tank 8 and had a temperature of 37° C.

For process control intensity of emulsification was monitored by continuous measurement of the turbidity of the reaction mixture in tank 7 by turbidimetry (InPro 8200, Mettler Toledo, Germany) in a continuous fashion. Intermittently, samples were taken to measure droplet sizes present in the reaction mixture. These samples were measured after 1 minute and 15 minutes with a DLS method according to Example 7. Determination of oil characteristics, the chlorophyll content and the investigation for the presence of mucilages were carried out according to examples 1, 2, and 5. A tasting of the refined oil was performed by 4 trained examiners according to Example 4, and test results were summarized according to example 7. Determination of 3-MCPD esters and tocopherols was carried out as stated in the measurement methods section.

Results:

The raw oil had a content of phosphorus compounds and mucilages that were outside the set limit of process indicators. By means of two pre-purification process steps, executed as a continuously performed production process utilizing intensive mixing of the process liquids, an oil phase suitable for nano-emulsifiying refining was achieved. Nano-emulsifying refining with an aqueous arginine solution was possible and a highly efficient and durable emulsification was achieved. The turbidity of the homogenized solution with an arginine oil emulsion was 3600-3900 FTU. The DLS measurements documented particle sizes between 0.25 and 0.31 pm after one minute and between 0.35 and 0.41 pm after a 15 minute standing time. This water-in-oil emulsion was separated with a separator into an oil and a water phase. The oil phase was largely depleted from impurities and had the following oil characteristics:

phosphorus 0.7 ppm (mg/kg), calcium <0.02 ppm (mg/kg), magnesium <0.02 ppm (mg/kg), iron <0.02 ppm (mg/kg), acid number of 0.05 wt %, chlorophyll 0.02 ppm (mg/kg). The sum of intensities of off-odors or an unpleasant taste for the raw oil was 18. After pre-purification, the sum was 12, wherein a new off-taste characteristic (soapy) was realized (intensity level 3). After nano-emulsifying refining with the arginine solution, the sum of off-flavors and unpleasant smell characteristics was 0. The characteristics counted as typical, namely seed-like and nuttiness, were found to be more intense than in the raw oil (sum crude oil 4, sum refined oil 8). The oil was of good visual and sensory quality and suitable for consumption. 3-MCPD esters were not detected; the content of tocopherols in crude oil was 522 mg/kg and in nano-emulsive refined oil 463 mg/kg.

The invention claimed is:

1. A method for reducing odorants and/or dyes from a lipid phase comprising the steps of:
    a) determining a phosphorus content of the lipid phase, testing for the presence of mucilages in the lipid phase, and
    b) performing a pre-purification step until the investigation of the presence of mucilages is negative and/or a phosphorus value is smaller or equal to 15 mg/kg, and
    c) adding an aqueous phase containing a compound having at least one amidino group or at least one guanidino group that have a partition coefficient (Kow) between n-octanol and water of <6.3, and
    d) preparing an intensive mixture of the lipid phase and the aqueous phase, and, wherein a intensive mixture is present when the water droplets in the lipid phase have an average diameter of 0.01 to 20 μm,
    e) carrying out a centrifugal phase separation and removal of the aqueous phase containing the detached odorants and/or dyes;
wherein the lipid phase are oils, fat or biodiesel; and
wherein the compound having at least one amidino or at least guanidine group is arginine, or one of the following compounds

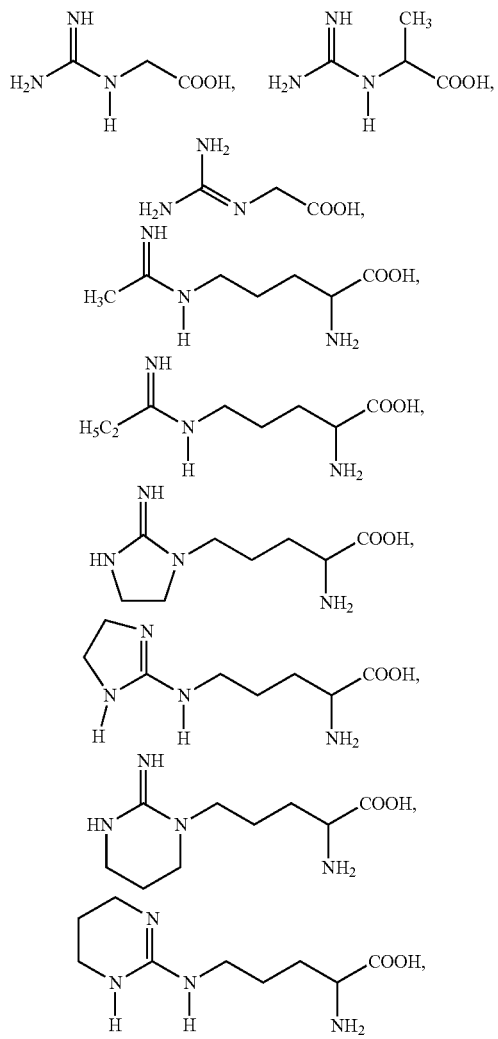

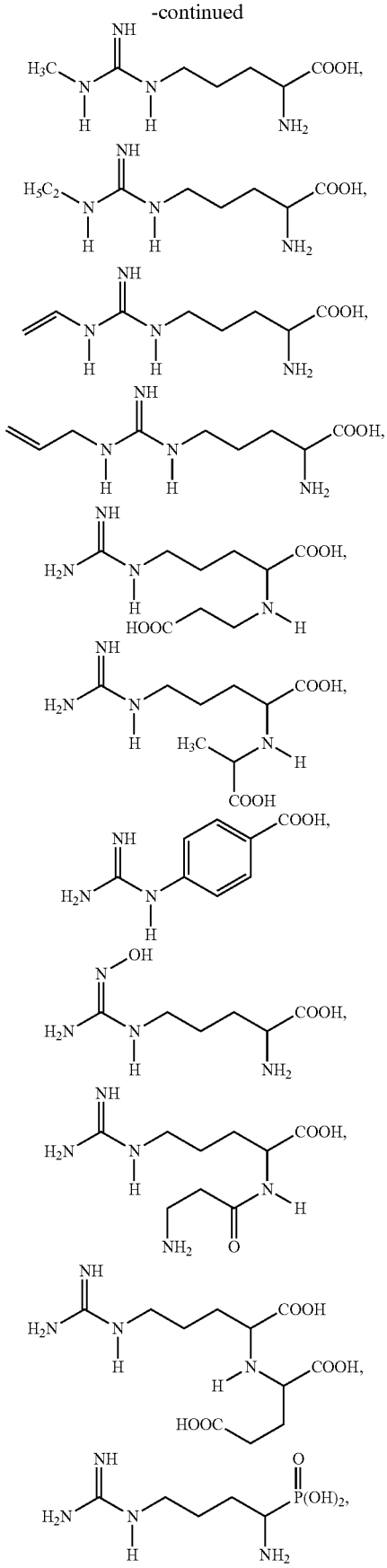

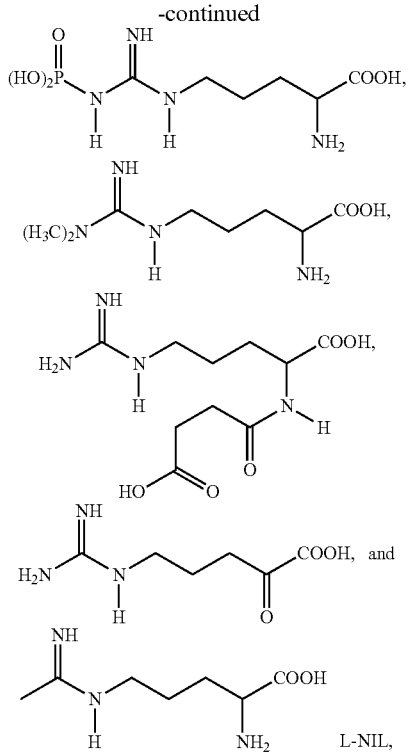

or a compound of the general formula (II)

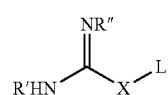

wherein
R', R", R''' and R'''' are independently of each other: —H, —OH, —CH=CH$_2$, —CH$_2$—CH=CH$_2$, —C(CH$_3$)=CH$_2$, —CH=CH—CH$_3$, —C$_2$H$_4$—CH=CH$_2$, —CH$_3$, —C$_2$H$_5$, —C$_3$H$_7$, —CH(CH$_3$)$_2$, —C$_4$H$_9$, —CH$_2$—CH(CH$_3$)$_2$, —CH(CH$_3$)—C$_2$H$_5$, —C(CH$_3$)$_3$, —C$_5$H$_{11}$, —CH(CH$_3$)—C$_3$H$_7$, —CH$_2$—CH(CH$_3$)—C$_2$H$_5$, —CH(CH$_3$)—CH(CH$_3$)$_2$, —C(CH$_3$)$_2$—C$_2$H$_5$, —CH$_2$—C(CH$_3$)$_3$, —CH(C$_2$H$_5$)$_2$, —C$_2$H$_4$—CH(CH$_3$)$_2$, —C$_6$H$_{13}$, —C$_7$H$_{15}$, cyclo-C$_3$H$_5$, cyclo-C$_4$H$_7$, cyclo-C$_5$H$_9$, cyclo-C$_6$H$_{11}$, —PO$_3$H$_2$, —PO$_3$H$^-$, —PO$_3^{2-}$, —NO$_2$, —C≡CH, —C≡C—CH$_3$, —CH$_2$—C≡CH, —C$_2$H$_4$—C≡CH, —CH$_2$—C≡C—CH$_3$, or R' and R" together forms one of the following groups: —CH$_2$—CH$_2$—, —CO—CH$_2$—, —CH$_2$—CO—, —CH=CH—, —CO—CH=CH—, —CH=CH—CO—, —CO—CH$_2$—CH$_2$—, —CH$_2$—CH$_2$—CO—, —CH$_2$—CO—CH$_2$— or —CH$_2$—CH$_2$—CH$_2$—;

X represents —NH—, —NR''''—, —O—, —S—, —CH$_2$—, —C$_2$H$_4$—, —C$_3$H$_6$—, —C$_4$H$_8$— or —C$_5$H$_{10}$— or a C1 to C5 carbon chain, which can be substituted with one or more of the following residues —F, —Cl, —OH, —OCH$_3$, —OC$_2$H$_5$, —NH$_2$, —NHCH$_3$, —NH(C$_2$H$_5$), —N(CH$_3$)$_2$, —N(C$_2$H$_5$)$_2$, —SH, —NO$_2$, —PO$_3$H$_2$, —PO$_3$H$^-$, —PO$_3^{2-}$, —CH$_3$, —C$_2$H$_5$, —CH=CH$_2$, —C≡CH, —COOH, —COOCH$_3$, —COOC$_2$H$_5$, —COCH$_3$, —COC$_2$H$_5$, —O—COCH$_3$, —O—COC$_2$H$_5$, —CN, —CF$_3$, —C$_2$F$_5$, —OCF$_3$, —OC$_2$F$_5$;

L is a hydrophilic substituent selected from the group consisting of —NH$_2$, —OH, —PO$_3$H$_2$, —PO$_3$H$^-$, —PO$_3^{2-}$, —OPO$_3$H$_2$, —OPO$_3$H$^-$, —OPO$_3^{2-}$, —COOH, —COO$^-$, —CO—NH$_2$, —NH$_3^+$, —NH—CO—NH$_2$, —N(CH$_3$)$_3^+$, —N(C$_2$H$_5$)$_3^+$, —N(C$_3$H$_7$)$_3^+$, —NH(CH$_3$)$_2^+$, —NH(C$_2$H$_5$)$_2^+$, —NH(C$_3$H$_7$)$_2^+$, —NHCH$_3$, —NHC$_2$H$_5$, —NHC$_3$H$_7$, —NH$_2$CH$_3^+$, —NH$_2$C$_2$H$_5^+$, —NH$_2$C$_3$H$_7^+$, —SO$_3$H, —SO$_3^-$, —SO$_2$NH$_2$, —CO—COOH, —O—CO—NH$_2$, —C(NH)—NH$_2$, —NH—C(NH)—NH$_2$, —NH—CS—NH$_2$, —NH—COOH,

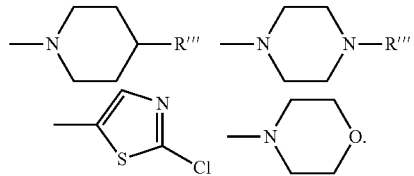

2. The method according to claim 1, wherein mucilages include waxes, wax acids, lingins, hydroxy acids, mycolic acids, fatty acids with cyclic hydrocarbon structures including shikimic acid or 2-hydroxy-11-cyclo-heptyl undecanoic acid, mannosterylerythritol lipids, carotenes, carotenoids, chlorophylls, and their degradation products, phenols, phytosterols, beta-sitosterol, campesterol, sigmasterol, sterols, sinapine, squalene, phytoestrogens, steroids, saponins, glycolipids, glyceroglycolipids, glycerosphingolipids, rhamnolipids, sophrolipids, trehalose lipids, mannosterylerythritol lipids, polysaccharides, pectins, rhamnogalacturonans, polygalacturon acid ester, arabinans, galactans, arabinogalactans, pectic acids, amidopectines, phospholipids, phosphatidylinositol, phosphatids, phosphoinositol, long-chain or cyclic carbon compounds, fatty alcohols, hydroxy fatty acids, epoxy fatty acids, glycosides, lipoproteins, lignins, phytate, phytic acid, glucoinosilates, proteins, albumins, globulins, oleosins, vitamin A, vitamin B2, vitamin B5, vitamin B7, vitamin B9, vitamin B12, vitamin D, vitamin E, vitamin K, menaquinone, tannins, terpenoids, curcumanoides, xanthones, sugar compounds, amino acids, peptides, polypeptides, carbohydrates, and glucogen.

3. the method according to claim 1, wherein mucilages include waxes, wax acids, fatty alcohols, phenols, glycosides, lipoproteins, free sugars, lingines, phytate and phytic acid, hydroxy and epoxy fatty acids, mycolic acids, fatty acids with cyclic hydrocarbon structures including shikimic acid, or 2-hydroxy-11-cyclo-heptyl undecanoic acid, rhamnolipids, sophrolipids, trehalose lipids, mannosterylerythritol lipid, squalene, sterols, sinapines, vitamin A, vitamin B2, vitamin B5, vitamin B7, vitamin B9, vitamin B12, vitamin D, vitamin E and vitamin K.

4. The method according to claim 1, wherein in addition to the odorants and dyes, flavors are also removed.

5. The method according to claim 1, wherein the pre-purification is carried out in step b) by admixing water or an aqueous solution which has a pH in the range of 7.5 to 14.0, and then a phase separation is carried out.

6. The method according to claim 5, characterized in that the aqueous solution for pre-purification contains a base which is different from the substance of step c).

7. The method according to claim 1, wherein step b) is carried out at a maximum temperature of 45° C.

8. The method according to claim 1, wherein the concentration of the at least one substance in the aqueous phase in step c) is in a molar range of 0.001 to 0.8.

9. The method according to claim 1, wherein step d) is performed at a temperature of maximum 60° C.

10. The method according to claim 1, wherein step d) indicates the production of an intensive mixing.

11. The method according to claim 10, wherein the emulsions produced in step d) contain water droplets with diameters of <1 μm.

12. The method according to claim 1, wherein the testing for the presence of mucilages in step a) is carried out by mixing an aqueous solution having a pH value in the range 8 to 13 with a sample of the lipid phase, wherein the volume ratio of the lipid phase to aqueous solution is 9:1 and wherein said test is positive when after mixing by shaking and phase separation, the formation of a layer has taken place.

13. The method according to claim 1, wherein before performing the method step c) a method step b1) determining the content of free fatty acids is carried out and performing process step b2) of adding one or more carboxylic acid(s) to the lipid phase and mixing is carried out until the content of the free carboxylic acids is at least 0.2 wt %.

14. The method according to claim 13, wherein the added carboxylic acid in step b2) is in the form of a nano-emulsion.

15. The method according to claim 1, wherein the lipid phase is a vegetable oil or animal fat for the food industry.

16. A lipid phase having a high storage stability obtainable by a method according to claim 1, wherein the lipid phase contains less than 0.2 wt % free fatty acids, less than 0.5 ppm of Na, K, Mg, Ca and/or Fe ions and/or less than 10% odorants based on the starting value of odorous substances.

17. Method according to claim 6, wherein the base which is different from the substance of step c) is selected from sodium hydroxide, potassium hydroxide, ammonium hydroxide, sodium carbonate, potassium carbonate, and potassium bicarbonate.

* * * * *